(12) United States Patent
You et al.

(10) Patent No.: US 12,471,168 B2
(45) Date of Patent: Nov. 11, 2025

(54) COMMUNICATION METHOD AND APPARATUS

(71) Applicant: HUAWEI TECHNOLOGIES CO., LTD., Guangdong (CN)

(72) Inventors: Chunhua You, Shanghai (CN); Xiaoying Xu, Shenzhen (CN); Qinghai Zeng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 547 days.

(21) Appl. No.: 17/961,104

(22) Filed: Oct. 6, 2022

(65) Prior Publication Data

US 2023/0041246 A1 Feb. 9, 2023

Related U.S. Application Data

(63) Continuation of application No. PCT/CN2021/086272, filed on Apr. 9, 2021.

(30) Foreign Application Priority Data

Apr. 10, 2020 (CN) .......................... 202010281627.4

(51) Int. Cl.
*H04W 76/19* (2018.01)
*H04W 72/23* (2023.01)
(Continued)

(52) U.S. Cl.
CPC .......... *H04W 76/19* (2018.02); *H04W 72/23* (2023.01); *H04W 76/12* (2018.02); *H04W 76/30* (2018.02)

(58) Field of Classification Search
CPC ..... H04W 76/19; H04W 72/23; H04W 76/12; H04W 76/30; H04W 8/00; H04W 60/04; H04W 92/20; H04W 76/27; H04W 76/10
See application file for complete search history.

(56) References Cited

U.S. PATENT DOCUMENTS

2018/0092156 A1\* 3/2018 Kim ..................... H04W 12/03
2019/0320476 A1\* 10/2019 Wang .................... H04W 76/15
(Continued)

FOREIGN PATENT DOCUMENTS

CN 107318176 A 11/2017
CN 108307452 A 7/2018
(Continued)

OTHER PUBLICATIONS

LG Electronics Inc., "(TP for NR BL CR for TS 38.300): Stage 2 TP on RRC State Transition without Context Relocation," 3GPP TSG-RAN WG3 NR AdHoc 1807, Montreal, Canada, R3-184197, Jul. 2-6, 2018, 10 pages.

(Continued)

*Primary Examiner* — Will W Lin
(74) *Attorney, Agent, or Firm* — Fish & Richardson P.C.

(57) ABSTRACT

Embodiments of this application provide example communication methods and apparatuses. One example method includes receiving, by a first network device, a first request message and uplink data from a terminal, where the first request message is for requesting to resume a suspended radio resource control (RRC) connection. The first network device can then send a second request message to a second network device based on the first request message and the uplink data, where the second network device is a network device previously serving the terminal, and the second request message includes information about the uplink data, where the second request message is for requesting the second network device to release a first data channel between the second network device and a core network device, or the second request message is for requesting the second network device to send a context of the terminal to the first network device.

20 Claims, 11 Drawing Sheets

(51) Int. Cl.
    *H04W 76/12*     (2018.01)
    *H04W 76/30*     (2018.01)

(56) References Cited

U.S. PATENT DOCUMENTS

| | | | |
|---|---|---|---|
| 2019/0387568 A1* | 12/2019 | Teyeb | H04W 76/30 |
| 2021/0307100 A1* | 9/2021 | Talebi Fard | H04W 76/18 |
| 2022/0070945 A1* | 3/2022 | Wang | H04L 47/30 |
| 2022/0124859 A1* | 4/2022 | Wang | H04W 76/12 |
| 2022/0225191 A1* | 7/2022 | Shi | H04W 36/00838 |
| 2022/0287137 A1* | 9/2022 | Futaki | H04W 48/20 |
| 2023/0014211 A1* | 1/2023 | Li | H04W 48/20 |

FOREIGN PATENT DOCUMENTS

| | | |
|---|---|---|
| CN | 109699050 A | 4/2019 |
| CN | 110140409 A | 8/2019 |
| CN | 110312296 A | 10/2019 |
| WO | 2018214903 A1 | 11/2018 |
| WO | 2019159095 A1 | 8/2019 |

OTHER PUBLICATIONS

International Search Report and Written Opinion in International Appln. No. PCT/CN2021/086272, mailed on Jul. 8, 2021, 14 pages (with English translation).

Intel Corporation, "Introduction of Rel-16 eMTC additional enhancements," 3GPP TSG-WG2 Meeting #109e, R2-2001868, E-Meeting, Feb. 24-Mar. 6, 2020, 48 pages.

Extended European Search Report in European Appln No. 21784430.7, dated Jul. 24, 2023, 8 pages.

* cited by examiner

COMMUNICATION METHOD AND APPARATUS

CROSS-REFERENCE TO RELATED APPLICATIONS

This application is a continuation of International Application No. PCT/CN2021/086272, filed on Apr. 9, 2021, which claims priority to Chinese Patent Application No. 202010281627.4, filed on Apr. 10, 2020. The disclosures of the aforementioned applications are hereby incorporated by reference in their entireties.

TECHNICAL FIELD

This application relates to the field of wireless communication, and in particular, to a communication method and apparatus.

BACKGROUND

In a communication system, when a terminal needs to transmit data, a radio resource control (RRC) connection may be established between the terminal and a network device, and a data channel may be established between the network device and a core network device. In this case, the terminal is in a radio resource control connected (RRC-connected) state. The terminal sends the data to the network device via an RRC message. After receiving the data, the network device sends the data to the core network device through the data channel. After communication ends, the terminal in the RRC-connected state may switch from the RRC-connected state to a radio resource control inactive (RRC-inactive) state by receiving an RRC connection release message from the network device.

Subsequently, if the terminal needs to transmit data again when the terminal moves from coverage of the network device to coverage of another network device, the terminal sends the data to the another network device. After receiving the data, the another network device requests the core network device to establish a data channel with the another network device, and requests the core network device to release the data channel with the network device. In other words, after receiving the data, the another network device requests the core network device to switch the data channel. However, because the terminal moves randomly, when the terminal needs to transmit data next time, there is a low probability that the terminal is still in coverage of a network device with which the terminal performs current data transmission. As a result, each time the terminal moves to coverage of a new network device and needs to transmit data, it is unnecessary for the new network device to request the core network device each time to switch a data channel.

SUMMARY

Embodiments of this application provide a communication method and apparatus, to enable a network device to determine, when a terminal moves from coverage of the network device to coverage of another network device and needs to transmit data, whether to request a core network device to switch a data channel, to improve data processing flexibility.

To achieve the foregoing objective, the following technical solutions are used in embodiments of this application.

According to a first aspect, an embodiment of this application provides a communication method. The method includes: a first network device receives a first request message and uplink data from a terminal, where the first request message is for requesting to resume a suspended radio resource control RRC connection. The first network device sends a second request message to a second network device based on the first request message and the uplink data, where the second network device is a network device previously serving the terminal, the second request message includes information about the uplink data, and the second request message is for requesting the second network device to release a first data channel between the second network device and a core network device, or the second request message is for requesting the second network device to send a context of the terminal to the first network device.

In the method provided in the first aspect, after receiving the first request message from the terminal, the first network device may send the second request message to the second network device based on the first request message, so that the second network device determines, based on the second request message, whether to release the first data channel or whether to send the context of the terminal to the first network device. In this way, the second network device may determine, based on the second request message, whether to release the first data channel or whether to send the context of the terminal to the first network device, to improve flexibility of processing the uplink data by the first network device and the second network device.

With reference to the first aspect, in a first possible implementation, the second request message is for requesting the second network device to release the first data channel between the second network device and the core network device, and the information about the uplink data is used by the second network device to determine whether to release the first data channel. Alternatively, the second request message is for requesting the second network device to send the context of the terminal to the first network device, and the information about the uplink data is used by the second network device to determine whether to send the context of the terminal to the first network device. Based on the foregoing method, the information about the uplink data is used by the second network device to determine whether to release the first data channel, and the second network device may determine, based on the information about the uplink data, whether to release the first data channel. The information about the uplink data is used by the second network device to determine whether to send the context of the terminal to the first network device, and the second network device may determine, based on the information about the uplink data, whether to send the context of the terminal to the first network device. In this way, the flexibility of processing the uplink data by the first network device and the second network device is improved.

With reference to the first aspect and the first possible implementation of the first aspect, in a second possible implementation, the information about the uplink data includes at least one of the following: first indication information, second indication information, a data amount of the uplink data, or a source logical channel identifier corresponding to the uplink data, where the first indication information indicates that the uplink data arrives at the first network device, and the second indication information indicates that the uplink data is not included in the first request message. Based on the foregoing method, the second network device may determine, based on a plurality of types of information, whether to release the first data channel or whether to send the context of the terminal to the first network device.

With reference to the first aspect and the possible implementations of the first aspect, in a third possible implementation, the method further includes: the first network device receives a buffer status report from the terminal, where the buffer status report indicates a data amount of remaining uplink data, and the second request message further includes information about the data amount of the remaining uplink data. Based on the foregoing method, the first network device may further send the information about the data amount of the remaining uplink data to the second network device, so that the second network device determines, based on the information about the data amount of the remaining uplink data, whether to release the first data channel or whether to send the context of the terminal to the first network device.

With reference to the first aspect and the possible implementations of the first aspect, in a fourth possible implementation, the second request message further includes third indication information, and the third indication information indicates that the first network device has a capability of configuring a grant for the terminal. Based on the foregoing method, the first network device may further send the third indication information to the second network device, so that the second network device determines, based on the third indication information, whether to release the first data channel or whether to send the context of the terminal to the first network device.

With reference to the first aspect and the first possible implementation and the second possible implementation of the first aspect, in a fifth possible implementation, the second request message is for requesting the second network device to release the first data channel between the second network device and the core network device, and the method further includes: the first network device receives a first response message from the second network device, where if the data amount of the uplink data is greater than or equal to a first threshold, the first response message indicates that the second network device releases the first data channel; or if the data amount of the uplink data is less than or equal to a first threshold, the first response message indicates that the second network device keeps the first data channel. Based on the foregoing method, the second network device releases the first data channel when the data amount of the uplink data is greater than or equal to the first threshold, or keeps the first data channel when the data amount of the uplink data is less than or equal to the first threshold.

With reference to the third possible implementation and the fourth possible implementation of the first aspect, in a sixth possible implementation, the second request message is for requesting the second network device to release the first data channel between the second network device and the core network device, and the method further includes: the first network device receives a first response message from the second network device, where if the data amount of the remaining uplink data is greater than or equal to a second threshold, the first response message indicates that the second network device releases the first data channel; or if the data amount of the remaining uplink data is less than or equal to a second threshold, the first response message indicates that the second network device keeps the first data channel. Based on the foregoing method, the second network device releases the first data channel when the data amount of the remaining uplink data is greater than or equal to the second threshold, or keeps the first data channel when the data amount of the remaining uplink data is less than or equal to the second threshold.

With reference to the fourth possible implementation of the first aspect, in a seventh possible implementation, the second request message is for requesting the second network device to release the first data channel between the second network device and the core network device, and the method further includes: the first network device receives a first response message from the second network device, where the first response message indicates that the second network device releases the first data channel, or the first response message indicates that the second network device keeps the first data channel. Based on the foregoing method, when the second request message includes the third indication information, the second network device may release the first data channel or may keep the first data channel.

With reference to the fifth possible implementation, the sixth possible implementation, and the seventh possible implementation of the first aspect, in an eighth possible implementation, the first request message includes a configured grant capability of the terminal, or the first response message includes a configured grant capability of the terminal. Based on the foregoing method, the first network device may obtain the configured grant capability of the terminal in two manners: reporting by the terminal or sending by the second network device, so that the first network device determines whether to configure the grant for the terminal.

With reference to the eighth possible implementation of the first aspect, in a ninth possible implementation, the first response message further includes traffic model information, and the traffic model information indicates at least one of the following parameters: a data arrival periodicity that is of the terminal and that is evaluated by the second network device, a transport block size that is of the uplink data and that is evaluated by the second network device, or an arrival timing that is of the terminal and that is evaluated by the second network device. Based on the foregoing method, the first response message may further include the traffic model information, so that the first network device configures the grant for the terminal based on the traffic model information.

With reference to the fifth possible implementation to the ninth possible implementation of the first aspect, in a tenth possible implementation, the first response message is further for establishing a communication tunnel between the first network device and the second network device, the communication tunnel is for transmitting the uplink data, and there is a correspondence between the communication tunnel and the source logical channel identifier. Based on the foregoing method, the second network device may further establish the communication tunnel between the second network device and the first network device by using the first response message, so that the first network device subsequently sends the uplink data to the second network device through the communication tunnel.

With reference to the third possible implementation and the sixth possible implementation of the first aspect, in an eleventh possible implementation, if the data amount of the remaining uplink data is greater than or equal to the second threshold, the method further includes: the first network device establishes an RRC connection to the terminal. Based on the foregoing method, when the data amount of the remaining uplink data is greater than or equal to the second threshold, the first network device may further establish the RRC connection to the terminal, to receive the remaining uplink data from the terminal.

With reference to the first aspect and the first possible implementation to the fourth possible implementation of the first aspect, in a twelfth possible implementation, the second request message is for requesting the second network device to send the context of the terminal to the first network device, and the method further includes: the first network device receives a second response message from the second network device, where the second response message includes a source packet data convergence protocol configuration and a source radio link control configuration. Based on the foregoing method, the second network device may send the context of the terminal to the first network device, so that the first network device processes, based on the context of the terminal, the received uplink data that is processed by the terminal, to obtain uplink data not processed by the terminal.

With reference to the twelfth possible implementation of the first aspect, in a thirteenth possible implementation, the first request message includes a configured grant capability of the terminal, or the second response message further includes a configured grant capability of the terminal. Based on the foregoing method, the first network device may obtain the configured grant capability of the terminal in two manners: reporting by the terminal or sending by the second network device, so that the first network device determines whether to configure the grant for the terminal.

With reference to the twelfth possible implementation and the thirteenth possible implementation of the first aspect, in a fourteenth possible implementation, the second response message further includes traffic model information, and the traffic model information indicates at least one of the following parameters: a data arrival periodicity that is of the terminal and that is evaluated by the second network device, a transport block size that is of the uplink data and that is evaluated by the second network device, or an arrival timing that is of the terminal and that is evaluated by the second network device. Based on the foregoing method, the second response message may further include the traffic model information, so that the first network device configures the grant for the terminal based on the traffic model information.

With reference to the twelfth possible implementation to the fourteenth possible implementation of the first aspect, in a fifteenth possible implementation, the second response message further indicates to establish a communication tunnel between the first network device and the second network device, the communication tunnel is for transmitting the uplink data, and there is a correspondence between an identifier of the communication tunnel and the source logical channel identifier. Based on the foregoing method, the second network device may further establish the communication tunnel between the second network device and the first network device by using the second response message, so that the first network device subsequently sends the uplink data to the second network device through the communication tunnel.

With reference to the first aspect and the possible implementations of the first aspect, in a sixteenth possible implementation, the first request message and the uplink data are multiplexed in one message. Based on the foregoing method, the first network device may simultaneously receive the first request message and the uplink data, to reduce signaling overheads.

According to a second aspect, an embodiment of this application provides a communication method. The method includes: a second network device receives a second request message from a first network device, where the second request message includes information about uplink data, the second request message is for requesting the second network device to release a first data channel between the second network device and a core network device, and the second network device is a network device previously serving a terminal; and the second network device releases the first data channel based on the second request message. Alternatively, a second network device receives a second request message from a first network device, where the second request message includes information about uplink data, the second request message is for requesting the second network device to send a context of a terminal to the first network device, and the second network device is a network device previously serving the terminal; and the second network device sends the context of the terminal to the first network device based on the second request message.

In the method provided in the second aspect, after receiving the second request message, the second network device may release the first data channel based on the second request message, or send the context of the terminal to the first network device based on the second request message. In this way, the second network device may determine, based on the second request message, whether to release the first data channel or whether to send the context of the terminal to the first network device, to improve flexibility of processing the uplink data by the first network device and the second network device.

With reference to the second aspect, in a first possible implementation, the information about the uplink data includes at least one of the following: first indication information, second indication information, a data amount of the uplink data, or a source logical channel identifier corresponding to the uplink data, where the first indication information indicates that the uplink data arrives at the first network device, the second indication information indicates that the uplink data is not included in a first request message, and the first request message is used by the terminal to request the first network device to resume a suspended RRC connection. Based on the foregoing method, the second network device may determine, based on a plurality of types of information, whether to release the first data channel or whether to send the context of the terminal to the first network device.

With reference to the second aspect and the first possible implementation of the second aspect, in a second possible implementation, the second request message further includes information about a data amount of remaining uplink data. Based on the foregoing method, the second network device may alternatively determine, based on the information about the data amount of the remaining uplink data, whether to release the first data channel or whether to send the context of the terminal to the first network device.

With reference to the second aspect and the possible implementations of the second aspect, in a third possible implementation, the second request message further includes third indication information, and the third indication information indicates that the first network device has a capability of configuring a grant for the terminal. Based on the foregoing method, the second network device may alternatively determine, based on the third indication information, whether to release the first data channel or whether to send the context of the terminal to the first network device.

With reference to the second aspect and the possible implementations of the second aspect, in a fourth possible implementation, the second request message is for requesting the second network device to release the first data channel between the second network device and the core network device, and the method further includes: the second network device sends a first response message to the first network device, where if the data amount of the uplink data is greater than or equal to a first threshold, the first response message indicates that the second network device releases the first data channel; or if the data amount of the uplink data is less than or equal to a first threshold, the first response message indicates that the second network device keeps the first data channel. Based on the foregoing method, the second network device releases the first data channel when the data amount of the uplink data is greater than or equal to the first threshold, or keeps the first data channel when the data amount of the uplink data is less than or equal to the first threshold.

With reference to the second possible implementation and the third possible implementation of the second aspect, in a fifth possible implementation, the second request message is for requesting the second network device to release the first data channel between the second network device and the core network device, and the method further includes: the second network device sends a first response message to the first network device, where if the data amount of the remaining uplink data is greater than or equal to a second threshold, the first response message indicates that the second network device releases the first data channel; or if the data amount of the remaining uplink data is less than or equal to a second threshold, the first response message indicates that the second network device keeps the first data channel. Based on the foregoing method, the second network device releases the first data channel when the data amount of the remaining uplink data is greater than or equal to the second threshold, or keeps the first data channel when the data amount of the remaining uplink data is less than or equal to the second threshold.

With reference to the third possible implementation of the second aspect, in a sixth possible implementation, the second request message is for requesting the second network device to release the first data channel between the second network device and the core network device, and the method further includes: the second network device sends a first response message to the first network device, where the first response message indicates that the second network device releases the first data channel, or the first response message indicates that the second network device keeps the first data channel. Based on the foregoing method, when the second request message includes the third indication information, the second network device may release the first data channel or may keep the first data channel.

With reference to the fourth possible implementation to the sixth possible implementation of the second aspect, in a seventh possible implementation, the first request message includes a configured grant capability of the terminal, or the first response message includes a configured grant capability of the terminal. Based on the foregoing method, the first network device may obtain the configured grant capability of the terminal in two manners: reporting by the terminal or sending by the second network device, so that the first network device determines whether to configure the grant for the terminal.

With reference to the seventh possible implementation of the second aspect, in an eighth possible implementation, the first response message further includes traffic model information, and the traffic model information indicates at least one of the following parameters: a data arrival periodicity that is of the terminal and that is evaluated by the second network device, a transport block size that is of the uplink data and that is evaluated by the second network device, or an arrival timing that is of the terminal and that is evaluated by the second network device. Based on the foregoing method, the first response message may further include the traffic model information, so that the first network device configures the grant for the terminal based on the traffic model information.

With reference to the fourth possible implementation to the eighth possible implementation of the second aspect, in a ninth possible implementation, the first response message is further for establishing a communication tunnel between the first network device and the second network device, the communication tunnel is for transmitting the uplink data, and there is a correspondence between an identifier of the communication tunnel and the source logical channel identifier. Based on the foregoing method, the second network device may further establish the communication tunnel between the second network device and the first network device by using the first response message, so that the first network device subsequently sends the uplink data to the second network device through the communication tunnel.

With reference to the second aspect and the first possible implementation to the third possible implementation of the second aspect, in a tenth possible implementation, the second request message is for requesting the second network device to send the context of the terminal to the first network device, and the method further includes: the second network device sends a second response message to the first network device, where the second response message includes a source packet data convergence protocol configuration and a source radio link control configuration. Based on the foregoing method, the second network device may send the context of the terminal to the first network device, so that the first network device processes, based on the context of the terminal, the received uplink data that is processed by the terminal, to obtain uplink data not processed by the terminal.

With reference to the tenth possible implementation of the second aspect, in an eleventh possible implementation, the first request message includes a configured grant capability of the terminal, or the second response message further includes a configured grant capability of the terminal. Based on the foregoing method, the first network device may obtain the configured grant capability of the terminal in two manners: reporting by the terminal or sending by the second network device, so that the first network device determines whether to configure the grant for the terminal.

With reference to the tenth possible implementation and the eleventh possible implementation of the second aspect, in a twelfth possible implementation, the second response message further includes traffic model information, and the traffic model information indicates at least one of the following parameters: a data arrival periodicity that is of the terminal and that is evaluated by the second network device, a transport block size that is of the uplink data and that is evaluated by the second network device, or an arrival timing that is of the terminal and that is evaluated by the second network device. Based on the foregoing method, the second response message may further include the traffic model information, so that the first network device configures the grant for the terminal based on the traffic model information.

With reference to the tenth possible implementation to the twelfth possible implementation of the second aspect, in a thirteenth possible implementation, the second response message is further for establishing a communication tunnel between the first network device and the second network device, the communication tunnel is for transmitting the uplink data, and there is a correspondence between an identifier of the communication tunnel and the source logical channel identifier. Based on the foregoing method, the second network device may further establish the communication tunnel between the second network device and the first network device by using the second response message, so that the first network device subsequently sends the uplink data to the second network device through the communication tunnel.

With reference to the second aspect and the possible implementations of the second aspect, in a fourteenth possible implementation, the first request message and the uplink data are multiplexed in one message. Based on the foregoing method, the first network device may simultaneously receive the first request message and the uplink data, to reduce signaling overheads.

According to a third aspect, an embodiment of this application provides a communication apparatus, where the communication apparatus can implement the method according to any one of the first aspect or the possible implementations of the first aspect. The apparatus includes a corresponding unit or component configured to perform the foregoing method. The unit included in the apparatus may be implemented by software and/or hardware. The apparatus may be, for example, a terminal, or a chip, a chip system, or a processor that can support the terminal to implement the foregoing method.

According to a fourth aspect, an embodiment of this application provides a communication apparatus, where the communication apparatus can implement the method according to any one of the second aspect or the possible implementations of the second aspect. The apparatus includes a corresponding unit or component configured to perform the foregoing method. The unit included in the apparatus may be implemented by software and/or hardware. The apparatus may be, for example, a network device, or a chip, a chip system, or a processor that can support the network device to implement the foregoing method.

According to a fifth aspect, an embodiment of this application provides a communication apparatus, including a processor. The processor is coupled to a memory, and the memory is configured to store a program or instructions; and when the program or the instructions is/are executed by the processor, the apparatus is enabled to implement the method according to any one of the first aspect or the possible implementations of the first aspect.

According to a sixth aspect, an embodiment of this application provides a communication apparatus, including a processor. The processor is coupled to a memory, and the memory is configured to store a program or instructions; and when the program or the instructions is/are executed by the processor, the apparatus is enabled to implement the method according to any one of the second aspect or the possible implementations of the second aspect.

According to a seventh aspect, an embodiment of this application provides a communication apparatus. The apparatus is configured to implement the method according to any one of the first aspect or the possible implementations of the first aspect.

According to an eighth aspect, an embodiment of this application provides a communication apparatus. The apparatus is configured to implement the method according to any one of the second aspect or the possible implementations of the second aspect.

According to a ninth aspect, an embodiment of this application provides a computer-readable medium, where the computer-readable medium stores a computer program or instructions. When the computer program or the instructions is/are executed, a computer is enabled to perform the method according to any one of the first aspect or the possible implementations of the first aspect.

According to a tenth aspect, an embodiment of this application provides a computer-readable medium, where the computer-readable medium stores a computer program or instructions. When the computer program or the instructions is/are executed, a computer is enabled to perform the method according to any one of the second aspect or the possible implementations of the second aspect.

According to an eleventh aspect, an embodiment of this application provides a computer program product, where the computer program product includes computer program code. When the computer program code is run on a computer, the computer is enabled to perform the method according to any one of the first aspect or the possible implementations of the first aspect.

According to a twelfth aspect, an embodiment of this application provides a computer program product, where the computer program product includes computer program code. When the computer program code is run on a computer, the computer is enabled to perform the method according to any one of the second aspect or the possible implementations of the second aspect.

According to a thirteenth aspect, an embodiment of this application provides a chip, including a processor. The processor is coupled to a memory, and the memory is configured to store a program or instructions; and when the program or the instructions is/are executed by the processor, the chip is enabled to implement the method according to any one of the first aspect or the possible implementations of the first aspect.

According to a fourteenth aspect, an embodiment of this application provides a chip, including a processor. The processor is coupled to a memory, and the memory is configured to store a program or instructions; and when the program or the instructions is/are executed by the processor, the chip is enabled to implement the method according to any one of the second aspect or the possible implementations of the second aspect.

According to a fifteenth aspect, an embodiment of this application provides a communication system. The system includes the apparatus according to the third aspect and/or the apparatus according to the fourth aspect, the system includes the apparatus according to the fifth aspect and/or the apparatus according to the sixth aspect, or the system includes the apparatus according to the seventh aspect and/or the apparatus according to the eighth aspect.

It may be understood that any communication apparatus, chip, computer-readable medium, computer program product, or communication system, or the like provided above is configured to perform a corresponding method provided above. Therefore, for beneficial effects that can be achieved by the communication apparatus, the chip, the computer-readable medium, the computer program product, the communication system, or the like, refer to the beneficial effects in the corresponding method. Details are not described herein again.

According to a sixteenth aspect, an embodiment of this application provides a communication method. The method includes: a first network element receives a first request message and uplink data from a terminal, where the first request message is for requesting to resume a suspended radio resource control (RRC) connection. The first network element sends the first request message and information about the uplink data to a second network element based on the first request message and the uplink data.

In the method provided in the sixteenth aspect, the first network element receives the first request message and the uplink data from the terminal, and may send the first request message and the information about the uplink data to the second network element based on the first request message and the uplink data, so that the second network element obtains a context of the terminal based on the information about the uplink data. The second network element can process the uplink data only after obtaining the context of the terminal. Compared with a case in which the second network element can only send the uplink data to a second network device for processing, this method improves flexibility of processing the uplink data by the first network element and the second network element.

With reference to the sixteenth aspect, in a first possible implementation, the information about the uplink data includes at least one of the following: first indication information, second indication information, a data amount of the uplink data, or a source logical channel identifier corresponding to the uplink data, where the first indication information indicates that the uplink data arrives at the first network element, and the second indication information indicates that the uplink data is not included in the first request message. Based on the foregoing method, the second network element may determine, based on a plurality of types of information, whether to request the context of the terminal from the second network device.

With reference to the sixteenth aspect and the first possible implementation of the sixteenth aspect, in a second possible implementation, the method further includes: the first network element receives a buffer status report from the terminal, where the buffer status report indicates a data amount of remaining uplink data. The first network element sends information about the data amount of the remaining uplink data to the second network element. Based on the foregoing method, the first network element may further send the information about the data amount of the remaining uplink data to the second network element, so that the second network element determines, based on the information about the data amount of the remaining uplink data, whether to request the context of the terminal from the second network device.

With reference to the second possible implementation of the sixteenth aspect, in a third possible implementation, the method further includes: if the data amount of the remaining uplink data is greater than or equal to a threshold, the first network element receives a first message from the second network element, where the first message indicates the first network element to establish an RRC connection to the terminal. Based on the foregoing method, when the data amount of the remaining uplink data is greater than or equal to the threshold, the second network element may further indicate the first network element to establish the RRC connection to the terminal, so that the first network element receives the remaining uplink data from the terminal.

With reference to the sixteenth aspect and the possible implementations of the sixteenth aspect, in a fourth possible implementation, the method further includes: the first network element receives a second message from the second network element, where the second message includes a source radio link control configuration. Based on the foregoing method, the first network element may further receive the source radio link control configuration from the second network element, so that the first network element processes the received uplink data based on the source radio link control configuration.

With reference to the fourth possible implementation of the sixteenth aspect, in a fifth possible implementation, the second message further includes indication information indicating a communication tunnel between the second network element and the first network element, and the communication tunnel is for transmitting the uplink data. Based on the foregoing method, the second network element may further indicate, to the first network element, the communication tunnel that is between the first network element and the second network element and that is for transmitting the uplink data, so that the first network element sends the uplink data to the second network element through the communication tunnel.

With reference to the sixteenth aspect and the possible implementations of the sixteenth aspect, in a sixth possible implementation, the method further includes: the first network element receives a third message from the second network element, where the third message indicates the first network element to delete the uplink data. The first network element deletes the uplink data based on the third message. Based on the foregoing method, the second network element may further indicate the first network element to delete the uplink data. In this way, the first network element may delete the uplink data when the uplink data cannot be parsed, thereby saving storage resources of the first network element.

With reference to the sixteenth aspect and the possible implementations of the sixteenth aspect, in a seventh possible implementation, the first request message and the uplink data are multiplexed in one message. Based on the foregoing method, the first network element may simultaneously receive the first request message and the uplink data, to reduce signaling overheads.

According to a seventeenth aspect, an embodiment of this application provides a communication method. The method includes: a second network element receives a first request message and information about uplink data from a first network element. The second network element obtains a context of a terminal based on the first request message and the information about the uplink data.

In the method in the seventeenth aspect, the second network element may receive the first request message and the information about the uplink data from the first network element, and obtain the context of the terminal based on the first request message and the information about the uplink data. The second network element can process the uplink data only after obtaining the context of the terminal. Compared with a case in which the second network element can only send the uplink data to a second network device for processing, this method improves flexibility of processing the uplink data by the first network element and the second network element.

With reference to the seventeenth aspect, in a first possible implementation, the information about the uplink data includes at least one of the following: first indication information, second indication information, a data amount of the uplink data, or a source logical channel identifier corresponding to the uplink data, where the first indication information indicates that the uplink data arrives at the first network element, and the second indication information indicates that the uplink data is not included in the first request message. Based on the foregoing method, the second network element may determine, based on a plurality of types of information, whether to request the context of the terminal from the second network device.

With reference to the seventeenth aspect and the first possible implementation of the seventeenth aspect, in a second possible implementation, the method further includes: the second network element receives information about a data amount of remaining uplink data from the first network element, where the information about the data amount of the remaining uplink data indicates the data amount of the remaining uplink data. Based on the foregoing method, the second network element may further receive the information about the data amount of the remaining uplink data from the first network element, so that the second network element determines, based on the information about the data amount of the remaining uplink data, whether to request the context of the terminal from the second network device.

With reference to the second possible implementation of the seventeenth aspect, in a third possible implementation, the method further includes: if the data amount of the remaining uplink data is greater than or equal to a threshold, the second network element sends a first message to the first network element, where the first message indicates the first network element to establish a radio resource control (RRC) connection to the terminal. Based on the foregoing method, when the data amount of the remaining uplink data is greater than or equal to the threshold, the second network element may further indicate the first network element to establish the RRC connection to the terminal, so that the first network element receives the remaining uplink data from the terminal.

With reference to the seventeenth aspect and the possible implementations of the seventeenth aspect, in a fourth possible implementation, the context of the terminal includes a source packet data convergence protocol configuration and a source radio link control configuration. Based on the foregoing method, the second network element may obtain the source packet data convergence protocol configuration and the source radio link control configuration. In this way, the second network element may process the uplink data based on the source packet data convergence protocol configuration and the source radio link control configuration, to improve the flexibility of processing the uplink data by the first network element and the second network element.

With reference to the fourth possible implementation of the seventeenth aspect, in a fifth possible implementation, the method further includes: the second network element sends a second message to the first network element, where the second message includes the source radio link control configuration in the context of the terminal. Based on the foregoing method, the second network element may further send the source radio link control configuration in the context of the terminal to the first network element, so that the first network element processes, based on the source radio link control configuration, the uplink data received from the terminal.

With reference to the fifth possible implementation of the seventeenth aspect, in a sixth possible implementation, the second message further includes indication information indicating a communication tunnel between the second network element and the first network element, and the communication tunnel is for transmitting the uplink data. Based on the foregoing method, the second network element may further indicate, to the first network element, the communication tunnel that is between the first network element and the second network element and that is for transmitting the uplink data, so that the first network element sends the uplink data to the second network element through the communication tunnel.

With reference to the seventeenth aspect and the possible implementations of the seventeenth aspect, in a seventh possible implementation, the second network element does not obtain the context of the terminal, and the method further includes: the second network element sends a third message to the first network element, where the third message indicates the first network element to delete the uplink data. Based on the foregoing method, when not obtaining the context of the terminal, the second network element may further indicate the first network element to delete the uplink data. A reason is as follows: the second network element does not obtain the context of the terminal, and cannot send the source radio link control configuration to the first network element; consequently, the first network element cannot parse the uplink data. As a result, the second network element indicates the first network element to delete the uplink data, to save storage resources of the first network element.

With reference to the seventeenth aspect and the possible implementations of the seventeenth aspect, in an eighth possible implementation, the first request message and the uplink data are multiplexed in one message. Based on the foregoing method, the first network element may simultaneously receive the first request message and the uplink data, to reduce signaling overheads.

According to an eighteenth aspect, an embodiment of this application provides a communication apparatus. The communication apparatus includes a receiving unit and a sending unit. The receiving unit is configured to receive a first request message and uplink data from a terminal, where the first request message is for requesting to resume a suspended radio resource control (RRC) connection. The sending unit is configured to send the first request message and information about the uplink data to a second network element based on the first request message and the uplink data.

With reference to the eighteenth aspect, in a first possible implementation, the information about the uplink data includes at least one of the following: first indication information, second indication information, a data amount of the uplink data, or a source logical channel identifier corresponding to the uplink data, where the first indication information indicates that the uplink data arrives at the communication apparatus, and the second indication information indicates that the uplink data is not included in the first request message.

With reference to the eighteenth aspect and the first possible implementation of the eighteenth aspect, in a second possible implementation, the receiving unit is further configured to receive a buffer status report from the terminal, where the buffer status report indicates a data amount of remaining uplink data. The sending unit is further configured to send information about the data amount of the remaining uplink data to the second network element.

With reference to the second possible implementation of the eighteenth aspect, in a third possible implementation, if the data amount of the remaining uplink data is greater than or equal to a threshold, the receiving unit is further configured to receive a first message from the second network element, where the first message indicates the communication apparatus to establish an RRC connection to the terminal.

With reference to the eighteenth aspect and the possible implementations of the eighteenth aspect, in a fourth possible implementation, the receiving unit is further configured to receive a second message from the second network element, where the second message includes a source radio link control configuration.

With reference to the fourth possible implementation of the eighteenth aspect, in a fifth possible implementation, the second message further includes indication information indicating a communication tunnel between the second network element and the communication apparatus, and the communication tunnel is for transmitting the uplink data.

With reference to the eighteenth aspect and the possible implementations of the eighteenth aspect, in a sixth possible implementation, the communication apparatus further includes a processing unit. The receiving unit is further configured to receive a third message from the second network element, where the third message indicates the communication apparatus to delete the uplink data. The processing unit is configured to delete the uplink data based on the third message.

With reference to the eighteenth aspect and the possible implementations of the eighteenth aspect, in a seventh possible implementation, the first request message and the uplink data are multiplexed in one message.

According to a nineteenth aspect, an embodiment of this application provides a communication apparatus. The communication apparatus includes a receiving unit and a processing unit. The receiving unit is configured to receive a first request message and information about uplink data from a first network element. The processing unit is configured to obtain a context of a terminal based on the first request message and the information about the uplink data.

With reference to the nineteenth aspect, in a first possible implementation, the information about the uplink data includes at least one of the following: first indication information, second indication information, a data amount of the uplink data, or a source logical channel identifier corresponding to the uplink data, where the first indication information indicates that the uplink data arrives at the first network element, and the second indication information indicates that the uplink data is not included in the first request message.

With reference to the nineteenth aspect and the first possible implementation of the nineteenth aspect, in a second possible implementation, the receiving unit is further configured to receive information about a data amount of remaining uplink data from the first network element, where the information about the data amount of the remaining uplink data indicates the data amount of the remaining uplink data.

With reference to the second possible implementation of the nineteenth aspect, in a third possible implementation, the communication apparatus further includes a sending unit, where the sending unit is configured to: if the data amount of the remaining uplink data is greater than or equal to a threshold, send a first message to the first network element, where the first message indicates the first network element to establish a radio resource control (RRC) connection to the terminal.

With reference to the nineteenth aspect and the possible implementations of the nineteenth aspect, in a fourth possible implementation, the context of the terminal includes a source packet data convergence protocol configuration and a source radio link control configuration.

With reference to the fourth possible implementation of the nineteenth aspect, in a fifth possible implementation, the communication apparatus further includes a sending unit, where the sending unit is configured to send a second message to the first network element, where the second message includes the source radio link control configuration in the context of the terminal.

With reference to the fifth possible implementation of the nineteenth aspect, in a sixth possible implementation, the second message further includes indication information indicating a communication tunnel between the communication apparatus and the first network element, and the communication tunnel is for transmitting the uplink data.

With reference to the nineteenth aspect and the possible implementations of the nineteenth aspect, in a seventh possible implementation, the communication apparatus does not obtain the context of the terminal, and the communication apparatus further includes a sending unit, where the sending unit is configured to send a third message to the first network element, where the third message indicates the first network element to delete the uplink data.

With reference to the nineteenth aspect and the possible implementations of the nineteenth aspect, in an eighth possible implementation, the first request message and the uplink data are multiplexed in one message.

According to a twentieth aspect, an embodiment of this application provides a communication apparatus, including a processor. The processor is coupled to a memory, and the memory is configured to store a program or instructions; and when the program or the instructions is/are executed by the processor, the apparatus is enabled to implement the method according to any one of the sixteenth aspect or the possible implementations of the sixteenth aspect.

According to a twenty-first aspect, an embodiment of this application provides a communication apparatus, including a processor. The processor is coupled to a memory, and the memory is configured to store a program or instructions; and when the program or the instructions is/are executed by the processor, the apparatus is enabled to implement the method according to any one of the seventeenth aspect or the possible implementations of the seventeenth aspect.

According to a twenty-second aspect, an embodiment of this application provides a communication apparatus. The apparatus is configured to implement the method according to any one of the sixteenth aspect or the possible implementations of the sixteenth aspect.

According to a twenty-third aspect, an embodiment of this application provides a communication apparatus. The apparatus is configured to implement the method according to any one of the seventeenth aspect or the possible implementations of the seventeenth aspect.

According to a twenty-fourth aspect, an embodiment of this application provides a computer-readable medium, where the computer-readable medium stores a computer program or instructions. When the computer program or the instructions is/are executed, a computer is enabled to perform the method according to any one of the sixteenth aspect or the possible implementations of the sixteenth aspect.

According to a twenty-fifth aspect, an embodiment of this application provides a computer-readable medium, where the computer-readable medium stores a computer program or instructions. When the computer program or the instructions is/are executed, a computer is enabled to perform the method according to any one of the seventeenth aspect or the possible implementations of the seventeenth aspect.

According to a twenty-sixth aspect, an embodiment of this application provides a computer program product, where the computer program product includes computer program code. When the computer program code is run on a computer, the computer is enabled to perform the method according to any one of the sixteenth aspect or the possible implementations of the sixteenth aspect.

According to a twenty-seventh aspect, an embodiment of this application provides a computer program product, where the computer program product includes computer program code. When the computer program code is run on a computer, the computer is enabled to perform the method according to any one of the seventeenth aspect or the possible implementations of the seventeenth aspect.

According to a twenty-eighth aspect, an embodiment of this application provides a chip, including a processor. The processor is coupled to a memory, and the memory is configured to store a program or instructions; and when the program or the instructions is/are executed by the processor, the chip is enabled to implement the method according to any one of the sixteenth aspect or the possible implementations of the sixteenth aspect.

According to a twenty-ninth aspect, an embodiment of this application provides a chip, including a processor. The processor is coupled to a memory, and the memory is configured to store a program or instructions; and when the program or the instructions is/are executed by the processor, the chip is enabled to implement the method according to any one of the seventeenth aspect or the possible implementations of the seventeenth aspect.

According to a thirtieth aspect, an embodiment of this application provides a communication system. The system includes the apparatus according to the eighteenth aspect and/or the apparatus according to the nineteenth aspect, the system includes the apparatus according to the twentieth aspect and/or the apparatus according to the twenty-first aspect, or the system includes the apparatus according to the twenty-second aspect and/or the apparatus according to the twenty-third aspect.

It may be understood that any communication apparatus, chip, computer-readable medium, computer program product, or communication system, or the like provided above is configured to perform a corresponding method provided above. Therefore, for beneficial effects that can be achieved by the communication apparatus, the chip, the computer-readable medium, the computer program product, the communication system, or the like, refer to the beneficial effects in the corresponding method. Details are not described herein again.

DESCRIPTION OF EMBODIMENTS

The following describes implementations of embodiments of this application in detail with reference to the accompanying drawings.

Figure 1A:
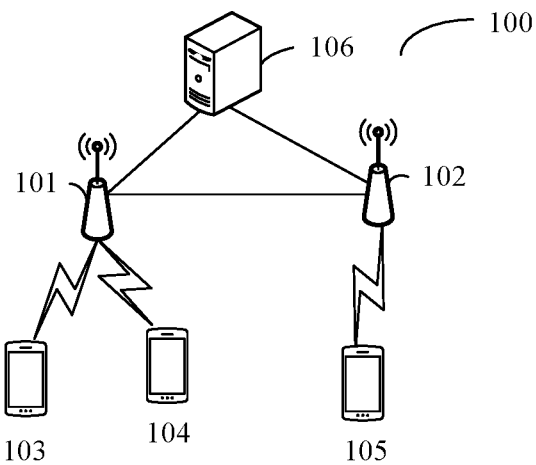
FIG. 1A is a schematic diagram of an architecture of a communication system according to an embodiment of this application.

FIG. 1A is a schematic diagram of an architecture of a communication system 100 according to an embodiment of this application. In FIG. 1A, the communication system 100 includes a network device 101, a network device 102, a terminal 103 to a terminal 105, and a core network device 106.

The network device 101 is connected to the network device 102, and data transmission may be performed between the network device 101 and the network device 102. The network device 101 may further provide a wireless access service for the terminal 103 and the terminal 104, and the network device 102 may further provide a wireless access service for the terminal 105. Specifically, each network device corresponds to one service coverage area. A terminal that enters the area may communicate with the network device through a Uu interface, to receive a wireless access service provided by the network device. For example, the terminal 103 may send uplink data to the network device 101, and the network device 101 may send downlink data to the terminal 103.

The network device 101 establishes a data channel 1 with the core network device 106 for the terminal 103. Through the data channel 1, the network device 101 sends, to the core network device 106, data that is from the terminal 103, or receives data from the core network 106. The network device 101 is referred to as an anchor node of the terminal 103. The network device 101 establishes a data channel 2 with the core network device 106 for the terminal 104. Through the data channel 2, the network device 101 sends, to the core network device 106, data that is from the terminal 104, or receives data from the core network 106. The network device 101 is referred to as an anchor node of the terminal 104. The network device 102 establishes a data channel 3 with the core network device 106 for the terminal 105. Through the data channel 3, the network device 102 sends, to the core network device 106, data that is from the terminal 105, or receives data from the core network 106. The network device 102 is referred to as an anchor node of the terminal 105.

The network device 101 or the network device 102 may be any device having a wireless transceiver function, and includes but is not limited to: an evolved NodeB (eNB, or eNodeB, evolved NodeB) in long term evolution (LTE), a gNodeB (or gNB) or a transmission reception point (TRP) in new radio (NR), a base station that subsequently evolves in the 3rd generation partnership project (3GPP), an access node in a wireless fidelity (Wi-Fi) system, a wireless relay node, a wireless backhaul node, or the like. A base station may be a macro base station, a micro base station, a pico base station, a small cell, a relay station, a balloon station, or the like. A plurality of base stations may support a network using a same technology above, or may support networks using different technologies above. The base station may include one or more co-site or non-co-site TRPs. The network device may alternatively be a radio controller, a centralized unit (CU), and/or a distributed unit (DU) in a cloud radio access network (CRAN) scenario. The following provides descriptions by using an example in which the network device 101 or the network device 102 is a base station. The network device 101 and the network device 102 may be base stations of a same type or base stations of different types. The base station may communicate with a terminal, or may communicate with the terminal through a relay station. The terminal may communicate with a plurality of base stations using different technologies. For example, the terminal may communicate with a base station supporting an LTE network, communicate with a base station supporting a 5G network, or support dual connections to a base station in an LTE network and a base station in a 5G network.

The terminal 103 to the terminal 105 are devices having a wireless transceiver function, and may be deployed on land, including indoor or outdoor devices, handheld devices, wearable devices, or vehicle-mounted devices, may be deployed on water (for example, on a ship), or may be deployed in air (for example, on an airplane, a balloon, and a satellite). The terminal may be a mobile phone, a tablet computer (Pad), a computer having a wireless transceiver function, a virtual reality (VR) terminal device, an augmented reality (AR) terminal device, a terminal in industrial control, a vehicle-mounted terminal device, a terminal in self-driving, a terminal in assisted driving, a terminal in telemedicine, a terminal in a smart grid, a terminal in transportation safety, a terminal in a smart city, a terminal in a smart home, or the like. An application scenario is not limited in embodiments of this application. Sometimes, the terminal may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a wireless communication device, a machine terminal, a UE agent, a UE apparatus, or the like. The terminal may be fixed or movable.

By way of example and not limitation, the terminal in this application may be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, such as smart watches or smart glasses, and devices that focus on only one type of application and need to work with other devices such as smartphones, such as various smart bands or smart jewelry for monitoring physical signs.

The core network device 106 may be a user plane function (UPF) entity. The UPF is mainly responsible for forwarding and receiving user data. The UPF may receive downlink data from a data network (DN), and then transmit the downlink data to the terminal through a radio access network (RAN). The UPF may further receive uplink data from the terminal through the RAN, and then forward the uplink data to the DN.

It should be noted that the communication system 100 shown in FIG. 1A is merely used as an example, and is not intended to limit technical solutions of this application. A person skilled in the art should understand that in a specific implementation process, the communication system 100 may further include another device, and a quantity of network devices, a quantity of terminals, and a quantity of core network devices may alternatively be determined based on a specific requirement.

Figure 1B:
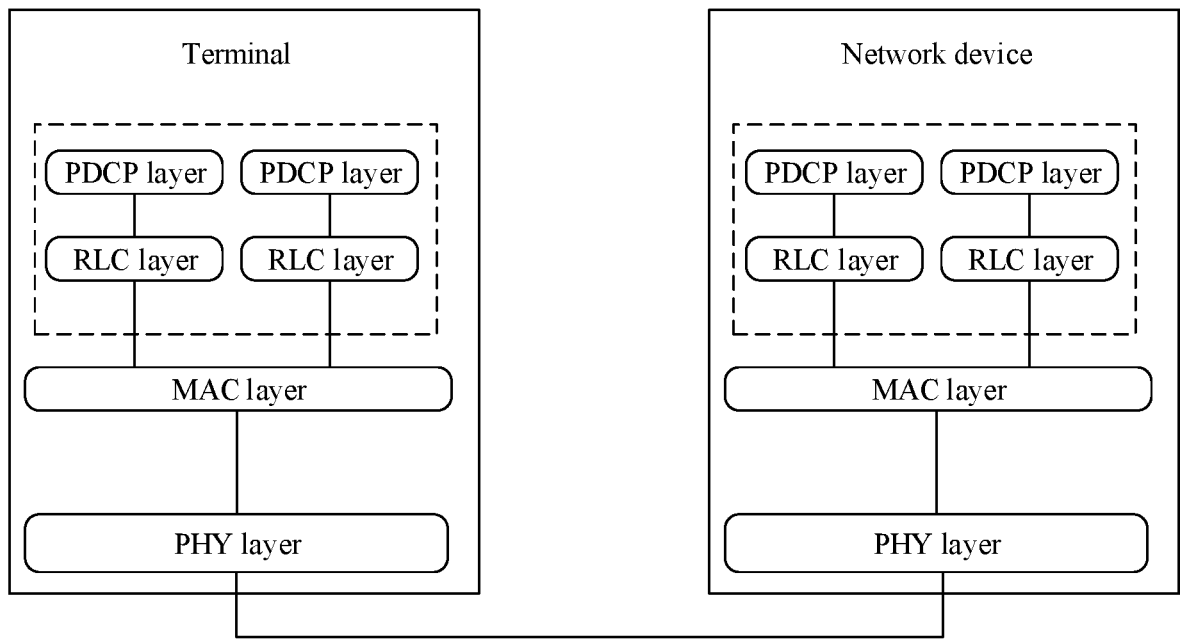
FIG. 1B is a first schematic diagram of a process of transmitting data between a terminal and a network device according to an embodiment of this application.

In some embodiments, a process of transmitting data between a terminal and a network device may be as shown in FIG. 1B. In FIG. 1B, the terminal includes a packet data convergence protocol (PDCP) layer entity, a radio link control (RLC) layer entity, a media access control (MAC) layer entity, and a physical layer (PHY) entity. The network device includes a PDCP layer entity, an RLC layer entity, a MAC layer entity, and a PHY layer entity. For example, the terminal 103 sends user-plane uplink data to the network device 101. When the user-plane uplink data arrives at the terminal 103, the PDCP layer entity in the terminal 103 processes the uplink data by using a PDCP configuration, and delivers processed uplink data to the RLC layer entity in the terminal 103. The RLC layer entity in the terminal 103 processes, by using an RLC configuration, the uplink data processed by the PDCP layer entity, and delivers processed uplink data to the MAC layer entity in the terminal 103. The MAC layer entity in the terminal 103 processes, by using a MAC configuration, the uplink data processed by the PDCP layer entity and the RLC layer entity, to generate a MAC protocol data unit (PDU) including a logical channel identifier (LCID), and delivers the MAC PDU to the PHY entity in the terminal 103. The PHY entity in the terminal 103 processes the MAC PDU by using a PHY configuration, and sends a processed MAC PDU to the network device 101. That the PDCP layer entity in the terminal 103 processes the uplink data based on a PDCP configuration means: the PDCP layer entity in the terminal 103 performs operations such as adding a PDCP serial number (SN) length to a PDCP header corresponding to the uplink data and an encryption operation. That the RLC layer entity in the terminal 103 processes, based on an RLC configuration, the uplink data processed by the PDCP layer entity means: the RLC layer entity in the terminal 103 performs operations such as adding an RLC SN length to an RLC header corresponding to the uplink data processed by the PDCP layer entity.

After receiving the processed MAC PDU, the PHY entity in the network device 101 processes the processed MAC PDU by using the PHY configuration, to obtain the MAC PDU, and delivers the MAC PDU to the MAC layer entity in the network device 101. The MAC layer entity in the network device 101 processes the MAC PDU by using the MAC configuration, to obtain the uplink data processed by the PDCP layer entity and the RLC layer entity in the terminal 103, and delivers, to the RLC layer entity in the network device 101, the uplink data processed by the PDCP layer entity and the RLC layer entity in the terminal 103. The RLC layer entity in the network device 101 processes, by using the RLC configuration, the uplink data processed by the PDCP layer entity and the RLC layer entity in the terminal 103, to obtain the uplink data processed by the PDCP layer entity in the terminal 103, and delivers, to the PDCP layer entity in the network device 101, the uplink data processed by the PDCP layer entity in the terminal 103. The PDCP layer entity in the network device 101 processes, by using the PDCP configuration, the uplink data processed by the PDCP layer entity in the terminal 103, to obtain the user-plane uplink data. Subsequently, the network device 101 sends the uplink data to the core network device 106. That the RLC layer entity in the network device 101 processes, based on the RLC configuration, the uplink data processed by the PDCP layer entity and the RLC layer entity in the terminal 103 means: the RLC layer entity in the network device 101 performs operations such as stripping the RLC SN length from the header corresponding to the uplink data processed by the PDCP layer entity and the RLC layer entity in the terminal 103. That the PDCP layer entity in the network device 101 processes, based on the PDCP configuration, the uplink data processed by the PDCP layer entity in the terminal 103 means: the PDCP layer entity in the network device 101 performs operations such as stripping the PDCP SN length from the header corresponding to the uplink data processed by the PDCP layer entity in the terminal 103 and a decryption operation.

In some embodiments, the network device 101 and/or the network device 102 may be in a CU-DU split architecture. To be specific, the network device 101 and/or the network device 102 may include one CU and one or more DUs. The CU is mainly responsible for centralized management and control of radio resources and connections, and has a wireless higher layer protocol stack function, for example, a PDCP layer function. The DU has a distributed user plane processing function, and mainly has a physical layer function and a layer 2 function with a high requirement on real-time performance. For example, the DU has a PHY function, a MAC layer function, and an RLC layer function.

Figure 1C:
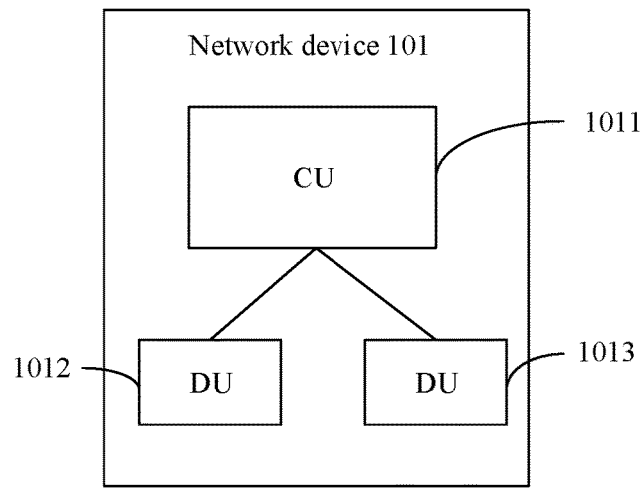
FIG. 1C is a schematic diagram of an architecture of a network device according to an embodiment of this application.

For example, the network device 101 is in the CU-DU split architecture. The architecture of the network device 101 may be as shown in FIG. 1C. In FIG. 1C, the network device 101 includes a CU 1011, a DU 1012, and a DU 1013. The DU 1012 and the DU 1013 may be connected to a terminal. For example, the DU 1012 is connected to the terminal 103, and the DU 1013 is connected to the terminal 104. The CU 1011 may be connected to another network device. For example, the CU 1011 is connected to the network device 102. The CU 1011 may be further connected to a core network device. For example, the CU 1011 may be further connected to the core network device 106.

Optionally, a general packet radio service (GPRS) tunneling protocol (GTP) tunnel is established between each DU and the CU, and the GTP tunnel is for transmitting user-plane data between the DU and the CU. For example, a GTP tunnel 1 is established between the CU 1011 and the DU 1012, and the GTP tunnel 1 is for transmitting user-plane data between the CU 1011 and the DU 1012. A GTP tunnel 2 is established between the CU 1011 and the DU 1013, and the GTP tunnel 2 is for transmitting user-plane data between the CU 1011 and the DU 1013.

It should be understood that the CU-DU architecture shown in FIG. 1C is merely used as an example, and is not intended to limit the technical solutions of this application. A person skilled in the art should understand that, in a specific implementation process, a quantity of CUs and a quantity of DUs in the CU-DU architecture may be determined based on a specific requirement. In addition, the CU 1011, the DU 1012, and the DU 1013 may be deployed in a same device, or may be deployed in different devices. This is not limited.

Figure 1D:
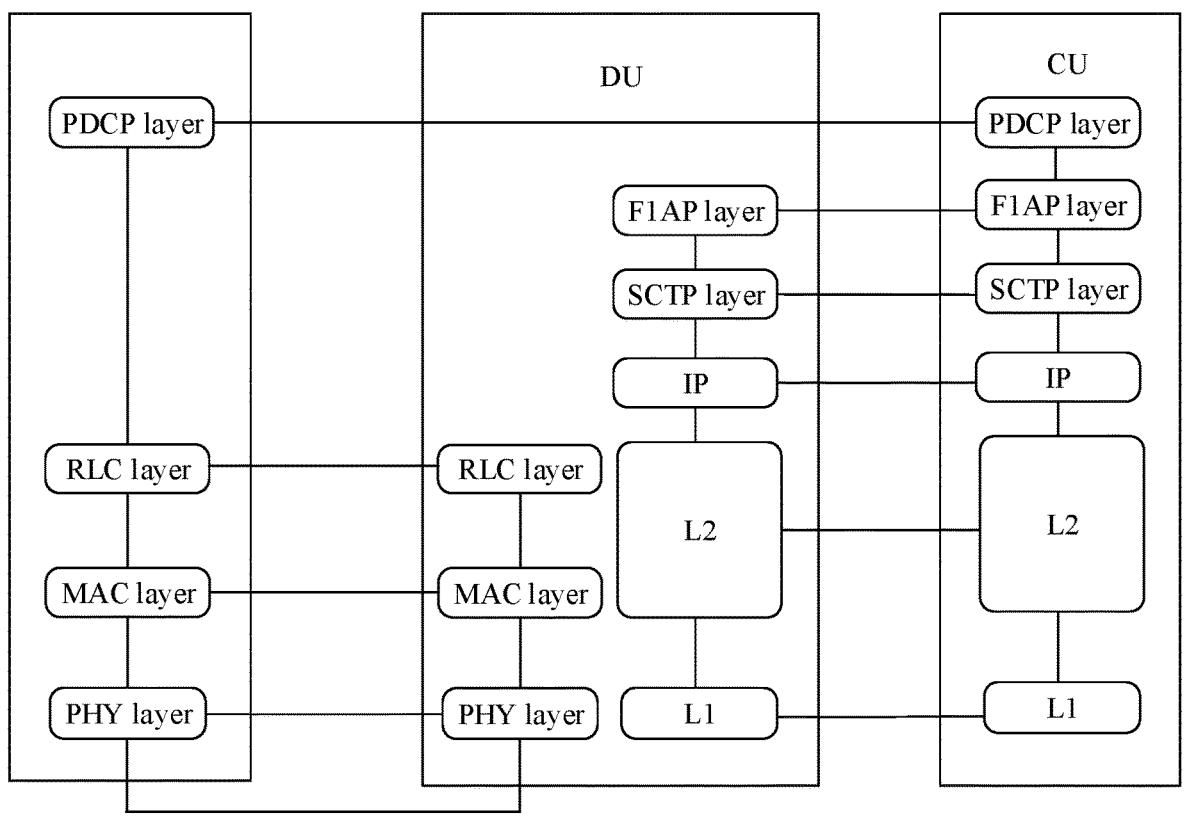
FIG. 1D is a second schematic diagram of a process of transmitting data between a terminal and a network device according to an embodiment of this application.

If the network device 101 and/or the network device 102 are/is in the CU-DU split architecture, a process of transmitting user-plane data between a terminal and a network device may be as shown in FIG. 1D. In FIG. 1D, the terminal includes a PDCP layer entity, an RLC layer entity, a MAC layer entity, and a PHY entity. When being terminal-oriented, a DU includes an RLC layer entity, a MAC layer entity, and a PHY entity. When being CU-oriented, the DU includes an F1 application protocol (F1AP) layer entity, a stream control transmission protocol (SCTP) layer entity, an Internet protocol (IP) layer entity, an L2 (layer 2) entity, and an L1 (layer 1) entity. A CU includes an F1AP layer entity, an SCTP layer entity, an IP layer entity, an L2 entity, and an L1 entity. For example, the terminal 103 sends user-plane uplink data to the CU 1011 through the DU 1012. When the user-plane uplink data arrives at the terminal 103, the terminal 103 may send a processed MAC PDU to the DU 1012 according to the foregoing method used by the terminal 103 to send the user-plane uplink data to the network device 101. After receiving the processed MAC PDU, the PHY entity in the DU 1012 may process the received processed MAC PDU according to the foregoing data processing method used by the PHY entity, the MAC layer entity, and the RLC layer entity in the network device 101, to obtain uplink data processed by the PDCP layer entity in the terminal 103, and send, to the CU 1011 through the GTP tunnel between the DU 1012 and the CU 1011, the uplink data processed by the PDCP layer entity in the terminal 103. After receiving the uplink data processed by the PDCP layer entity in the terminal 103, the CU 1011 may process the received data according to the foregoing data processing method used by the PDCP layer entity in the network device 101, to obtain the user-plane uplink data. Subsequently, the CU 1011 sends the uplink data to the core network device 106.

It should be noted that a terminal may send uplink data to a network device through a random access procedure.

For example, the random access procedure may include a four-step random access procedure and a two-step random access procedure. The terminal may send the uplink data to the network device by using a message 3 (Msg3) in the four-step random access procedure. Alternatively, the terminal may send the uplink data to the network device by using a message A (MsgA) in the two-step random access procedure.

Figure 1E:
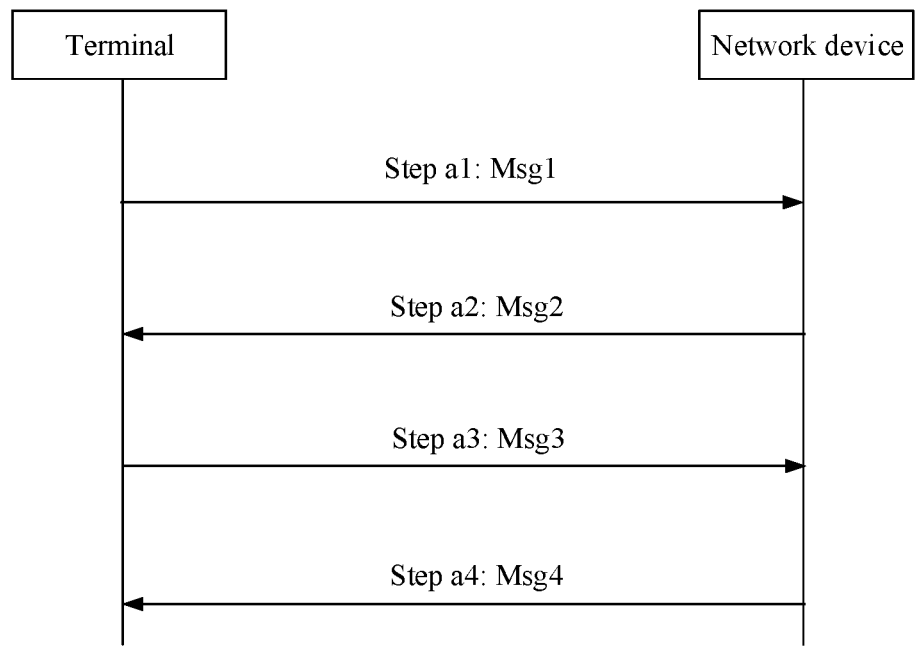
FIG. 1E is a schematic diagram of a four-step random access procedure according to an embodiment of this application.

The four-step random access procedure may be as shown in FIG. 1E, and may include the following steps.

Step a1: The terminal sends a random access request to the network device. The random access request may include a random access preamble. The random access request is also referred to as a message 1 (Msg1) in the random access procedure.

Step a2: After detecting the random access preamble sent by the terminal, the network device sends a random access response (RAR) to the terminal. The random access response is also referred to as a message 2 (Msg2) in the random access procedure.

Step a3: The terminal receives the RAR from the network device, and sends uplink signaling to the network device. The uplink signaling is also referred to as the message 3 (Msg3) in the random access procedure. The Msg3 may include the uplink data.

Step a4: The network device receives the Msg3, and sends a contention resolution message to the terminal. Correspondingly, the terminal receives the contention resolution message from the network device. If the terminal determines, based on the contention resolution message, that the terminal wins a current random access collision, the terminal may determine that random access succeeds; otherwise, the terminal determines that random access fails, and may perform a random access procedure again. The contention resolution message is also referred to as a message 4 (Msg4).

Figure 1F:
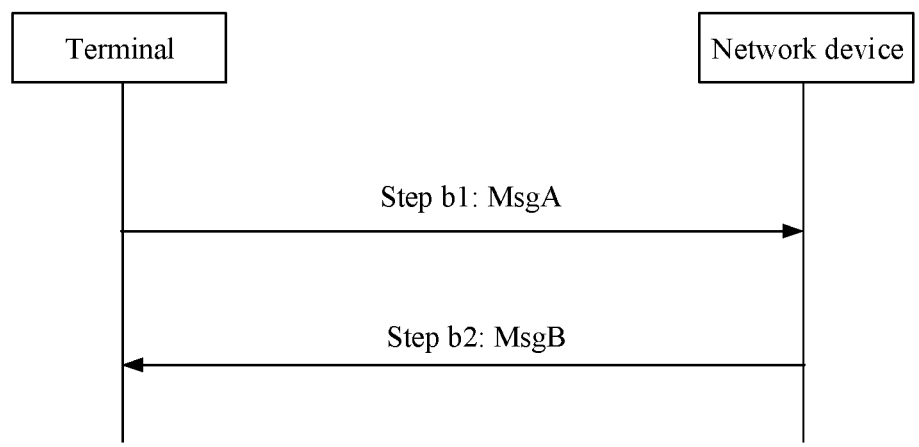
FIG. 1F is a schematic diagram of a two-step random access procedure according to an embodiment of this application.

The two-step random access procedure may be as shown in FIG. 1F, and may include the following steps.

Step b1: The terminal sends a random access request to the network device.

Herein, the random access request may also be referred to as the message A (MsgA). The random access request includes a random access preamble and uplink signaling, and is equivalent to the Msg1 and the Msg3 in FIG. 1E. This may also be understood as that the Msg1 and the Msg3 are "sent together".

Step b2: The network device receives the random access request from the terminal, and sends a message B (MsgB) to the terminal.

Herein, the MsgB is response information for the random access request, may also be referred to as a message B, and includes at least one of response information for the random access preamble and response information for the uplink signaling.

Optionally, each network element in FIG. 1A in embodiments of this application, for example, the network device 102 or the terminal 103, may be a functional module in a device. It may be understood that the function may be a network component in a hardware device, for example, a communication chip in a mobile phone, or may be a software function running on dedicated hardware, or a virtualized function instantiated on a platform (for example, a cloud platform).

Figure 2:
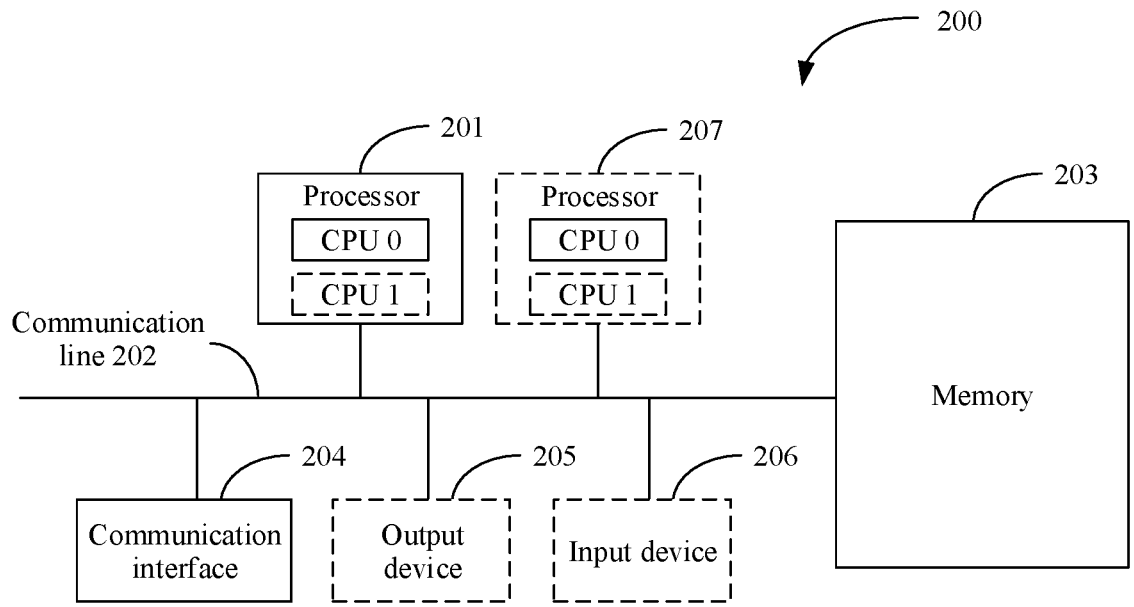
FIG. 2 is a schematic diagram of a hardware structure of a communication apparatus according to an embodiment of this application.

For example, each network element in FIG. 1A may be implemented by a communication apparatus 200 in FIG. 2. FIG. 2 is a schematic diagram of a hardware structure of a communication apparatus that may be used in an embodiment of this application. The communication apparatus 200 includes at least one processor 201, a communication line 202, a memory 203, and at least one communication interface 204.

The processor 201 may be a general-purpose central processing unit (CPU), a microprocessor, an application-specific integrated circuit (ASIC), or one or more integrated circuits configured to control execution of a program in the solutions in this application.

The communication line 202 may include a path, for example, a bus, for transmitting information between the foregoing components.

The communication interface 204 is configured to communicate with another device or communication network by using any transceiver-type apparatus, and is, for example, an Ethernet interface, a RAN interface, or a wireless local area network (WLAN) interface.

The memory 203 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction structure or a data structure and that is accessible to a computer, but is not limited thereto. The memory may exist independently, and is connected to the processor through the communication line 202. The memory may alternatively be integrated with the processor. The memory provided in embodiments of this application may be usually non-volatile. The memory 203 is configured to store computer-executable instructions for executing the solutions in this application, and execution is controlled by the processor 201. The processor 201 is configured to execute the computer-executable instructions stored in the memory 203, to implement a method provided in embodiments of this application.

Optionally, the computer-executable instructions in embodiments of this application may also be referred to as application program code. This is not specifically limited in embodiments of this application.

During specific implementation, in an embodiment, the processor 201 may include one or more CPUs, for example, a CPU 0 and a CPU 1 in FIG. 2.

During specific implementation, in an embodiment, the communication apparatus 200 may include a plurality of processors, for example, the processor 201 and a processor 207 in FIG. 2. Each of the processors may be a single-core (single-CPU) processor or a multi-core (multi-CPU) processor. The processor herein may be one or more devices, circuits, and/or processing cores configured to process data (for example, computer program instructions).

During specific implementation, in an embodiment, the communication apparatus 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive an input from a user in a plurality of manners. For example, the input device 206 may be a mouse, a keyboard, a touchscreen device, or a sensor device.

The foregoing communication apparatus 200 may be a general-purpose device or a special-purpose device. During specific implementation, the communication apparatus 200 may be a portable computer, a network server, a personal digital assistant (PDA), a mobile phone, a tablet computer, a wireless terminal, an embedded device, or a device having a structure similar to that in FIG. 2. A type of the communication apparatus 200 is not limited in this embodiment of this application.

The following describes in detail a communication method provided in embodiments of this application.

It should be noted that names of messages between network elements, names of parameters in the messages, or the like in the following embodiments of this application are merely examples, and there may be other names during specific implementation. This is not specifically limited in embodiments of this application.

It should be noted that, in descriptions of this application, words such as "first" or "second" are merely used for distinction and description, and shall not be understood as an indication or implication of relative importance or an indication or implication of an order. In this application, for network devices with different numbers, such as "a first network device", the numbers are merely used for context description convenience, and different sequence numbers do not have specific technical meanings. For example, the first network device or a second network device may be understood as one or any one of a series of network devices. It may be understood that, during specific implementation, network devices with different numbers may alternatively be network devices of a same type. This is not limited in this application.

It may be understood that, in embodiments of this application, the first network device, the second network device, a first network element, or a second network element may perform a part or all of steps in embodiments of this application. The steps are merely examples. In embodiments of this application, other steps or variants of various steps may alternatively be performed. In addition, the steps may be performed in a sequence different from a sequence presented in embodiments of this application, and not all the steps in embodiments of this application need to be performed.

Figure 3:
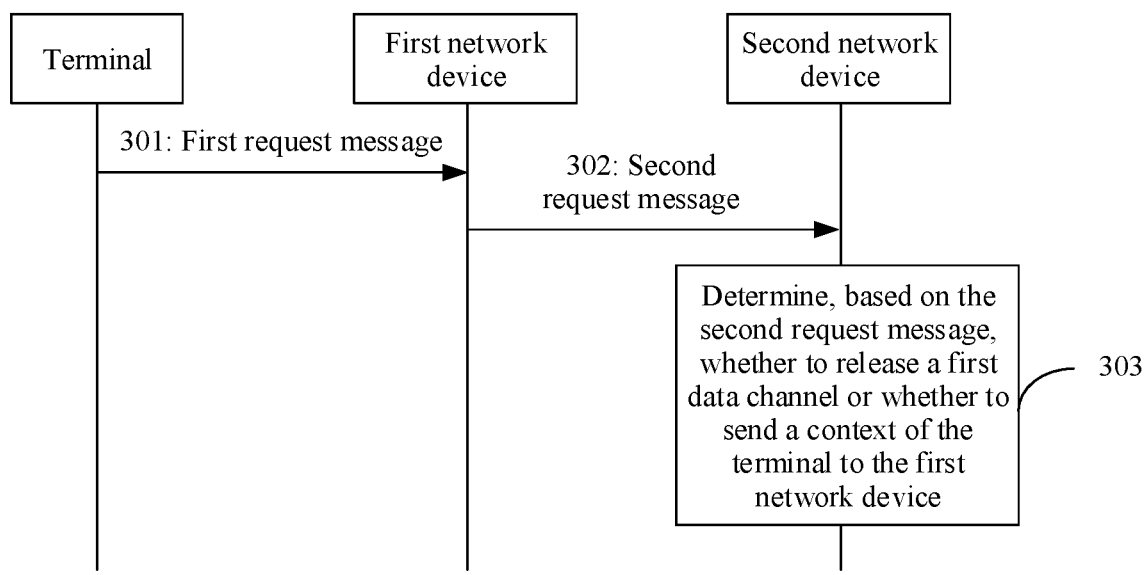
FIG. 3 is a first schematic flowchart of a communication method according to an embodiment of this application.

FIG. 3 shows a communication method according to an embodiment of this application. The communication method includes step 301 to step 303.

Step 301: A terminal sends a first request message to a first network device.

The terminal may be any one of the terminal 103 to the terminal 105 in FIG. 1A. When the terminal is the terminal 103 or the terminal 104 in FIG. 1A, the first network device is the network device 101 in FIG. 1A. When the terminal is the terminal 105 in FIG. 1A, the first network device is the network device 102 in FIG. 1A.

Optionally, the terminal is in an RRC-inactive state. A network device previously serving the terminal is a second network device. To be specific, the second network device stores a context of the terminal, or there is a data channel for the terminal between the second network device and a core network device. When the first network device is the network device 101 in FIG. 1A, the second network device may be the network device 102 in FIG. 1A. When the first network device is the network device 102 in FIG. 1A, the second network device may be the network device 101 in FIG. 1A.

During actual application, when the terminal is in an RRC-connected state, the terminal may receive an RRC release message from the second network device, and may suspend an RRC connection to the second network device based on the RRC release message, to enter the RRC-inactive state. The RRC release message includes a first identifier, and the first identifier is for identifying the context of the terminal. The first identifier may be allocated by the second network device when the terminal receives the RRC release message this time, or may be allocated by the second network device when the terminal previously receives an RRC release message from the second network device. The first identifier is a unique identifier in a plurality of cells served by different network devices. For example, the first identifier is a resume ID.

Optionally, the RRC release message further includes a source RRC reconfiguration. After receiving the RRC release message, the terminal stores the source RRC reconfiguration. The source RRC reconfiguration is allocated by the second network device to the terminal. The source RRC reconfiguration includes a source data radio bearer (DRB) configuration, a source PDCP configuration, and a source RLC configuration. The source DRB configuration includes a mapping relationship between a source DRB and a source PDCP and a mapping relationship between the source DRB and source RLC. The source PDCP configuration includes a length of a source PDCP SN. The source RLC configuration includes a length of a source RLC SN or a mode indication, for example, an acknowledged mode (AM) or an unacknowledged mode (UM). The source RRC reconfiguration is for processing uplink data when the terminal transmits the uplink data next time.

Optionally, the terminal is movable. When the terminal moves from a service coverage area of the second network device to a service coverage area of the first network device, and uplink data arrives at the terminal, the terminal sends the first request message to the first network device. The uplink data may be user-plane uplink data, and the first request message may be for requesting to resume the suspended RRC connection. The first request message may be an RRC resume request, and includes the first identifier. The terminal may further send the uplink data to the first network device. The terminal may simultaneously send the first request message and the uplink data, or the terminal may separately send the first request message and the uplink data. When the terminal simultaneously sends the first request message and the uplink data, the uplink data and the first request message are multiplexed in one message, or the uplink data is encapsulated in the first request message. For example, the terminal sends the first request message to the first network device, where the first request message includes the uplink data.

It may be understood that the first request message and the uplink data are sent to the first network device after being processed by a PDCP layer entity, an RLC layer entity, a MAC layer entity, and a PHY entity of the terminal.

In a possible implementation, the uplink data and the first request message are multiplexed in one message. The first request message is sent by the terminal to the first network device after being processed by the terminal based on a common PDCP configuration, a common RLC configuration, a common MAC configuration, and a common PHY configuration. The uplink data is processed by the terminal based on a source PDCP configuration and a source RLC configuration that are in the source RRC reconfiguration and that correspond to a DRB to which the uplink data belongs. Subsequently, data processed based on the source PDCP configuration and the source RLC configuration is sent to the first network device after being processed based on the common MAC configuration and the common PHY configuration. In this case, a MAC PDU sent to the first network device includes at least two MAC service data units (SDUs). The uplink data is encapsulated in one of the MAC SDUs, and the first request message is encapsulated in the other MAC SDU.

In another possible implementation, the uplink data is encapsulated in the first request message. After processing the uplink data based on a source PDCP configuration that is in the source RRC reconfiguration and that corresponds to a DRB to which the uplink data belongs, the terminal includes processed uplink data in the first request message. The terminal processes the first request message based on a common PDCP configuration, a common RLC configuration, a common MAC configuration, and a common PHY configuration, and sends a processed first request message to the first network device.

It should be noted that the common PDCP configuration, the common RLC configuration, the common MAC configuration, and the common PHY configuration in this embodiment of this application are configurations known by the terminal, the first network device, and the second network device. For example, the common PDCP configuration, the common RLC configuration, the common MAC configuration, and the common PHY configuration are preconfigured in the terminal, the first network device, or the second network device, are received by the terminal, the first network device, or the second network device by using a broadcast message, or are stipulated in a protocol. The source PDCP configuration and the source RLC configuration in this embodiment of this application are dedicated configurations of the terminal and the second network device. To be specific, before receiving the source PDCP configuration and the source RLC configuration, the first network device does not know the source PDCP configuration and the source RLC configuration.

Optionally, the first request message, or the first request message and the uplink data is/are sent to the first network device in a random procedure initiated by the terminal. For example, the first request message, or the first request message and the uplink data is/are sent to the first network device by using a message 3 in a four-step random access procedure. For another example, the first request message, or the first request message and the uplink data is/are sent to the first network device by using a message A in a two-step random access procedure.

Optionally, the first request message further includes the first identifier.

Optionally, the terminal may further send a buffer status report to the first network device. The buffer status report indicates a data amount of remaining uplink data. The data amount of the remaining uplink data indicates a size of the remaining uplink data and/or a quantity of data packets in the remaining uplink data.

In a possible implementation, the buffer status report includes a total data amount of the remaining uplink data. In another possible implementation, the buffer status report includes a data amount of remaining uplink data on each LCH in a logical channel group (LCG) corresponding to the remaining uplink data. Using an example in which the remaining uplink data corresponds to an LCG 1 and an LCG 2, the LCG 1 includes an LCH 1 and an LCH 2, and the LCG 2 includes an LCH 3, the buffer status report may be as shown in Table 1. In Table 1, a data amount of remaining uplink data on the LCH 1 is 20 bytes, a data amount of remaining uplink data on the LCH 2 is 80 bytes, and a data amount of remaining uplink data on the LCH 3 is 50 bytes. In this case, a data amount of remaining uplink data in the LCG 1 is 100 bytes (20 bytes+80 bytes), a data amount of remaining uplink data in the LCG 2 is 50 bytes, and the total data amount of the remaining uplink data is 150 bytes (100 bytes+50 bytes).

TABLE 1

| LCG | LCH | Data amount of remaining uplink data |
|---|---|---|
| LCG 1 | LCH 1 | 20 bytes |
|  | LCH 2 | 80 bytes |
| LCG 2 | LCH 3 | 50 bytes |

It should be noted that Table 1 is merely an example of the buffer status report, and the buffer status report may alternatively be in another form. This is not limited.

Optionally, the terminal may further send a configured grant (CG) capability of the terminal to the first network device. The CG capability of the terminal indicates whether the terminal supports a CG.

Step 302: The first network device receives the first request message from the terminal, and sends a second request message to the second network device based on the first request message.

The second request message may be for requesting the second network device to release a first data channel between the second network device and the core network device, or the second request message may be for requesting the second network device to send the context of the terminal to the first network device. The second request message includes information about the uplink data. The second request message may be carried in a retrieve UE context request message.

The core network device may be the core network device 106 in FIG. 1A. The first data channel is used by the second network device to forward, to the core network device, uplink data sent by the terminal, or the first data channel is used by the second network device to receive data that is from the core network device and that is to be sent to the terminal. In this case, the second network device is an anchor node of the terminal.

Optionally, the second request message is for requesting the second network device to release the first data channel between the second network device and the core network device, and the information about the uplink data is used by the second network device to determine whether to release the first data channel. Alternatively, the second request message is for requesting the second network device to send the context of the terminal to the first network device, and the information about the uplink data is used by the second network device to determine whether to send the context of the terminal to the first network device.

Optionally, the first network device may further receive the uplink data from the terminal. For descriptions of the uplink data and the first request message, refer to the descriptions in step 301. Details are not described again.

A process in which the first network device processes the received uplink data and the received first request message is as follows.

In a possible implementation, if the uplink data and the first request message are multiplexed in one message, the first network device may process, based on the common PDCP configuration, the common RLC configuration, the common MAC configuration, and the common PHY configuration, the received first request message processed based on the common PDCP configuration, the common RLC configuration, the common MAC configuration, and the common PHY configuration, to obtain the first request message. The first network device may process, based on the common MAC configuration and the common PHY configuration, the received uplink data processed based on the source PDCP configuration, the source RLC configuration, the common MAC configuration, and the common PHY configuration, to obtain the uplink data processed based on the source PDCP configuration and the source RLC configuration. Because the first network device does not know the source PDCP configuration and the source RLC configuration, the first network device cannot obtain the uplink data. To obtain the uplink data, the first network device needs to request the context of the terminal from the second network device.

In another possible implementation, if the uplink data is encapsulated in the first request message, the first network device may process, based on the common PDCP configuration, the common RLC configuration, the common MAC configuration, and the common PHY configuration, the received first request message processed based on the common PDCP configuration, the common RLC configuration, the common MAC configuration, and the common PHY configuration, to obtain the first request message. The first request message includes the uplink data processed based on the source PDCP configuration. Because the first network device does not know the source PDCP configuration, the first network device cannot obtain the uplink data. To obtain the uplink data, the first network device needs to request the context of the terminal from the second network device.

It may be understood that processes in which the first network device sends the second request message to the second network device based on the first request message and content included in the information about the uplink data are different when the first network device receives the uplink data from the terminal and the uplink data and the first request message are multiplexed in one message, when the first network device receives the uplink data from the terminal and the uplink data is encapsulated in the first request message, and when the first network device does not receive the uplink data. Specifically, the process in which the first network device sends the second request message to the second network device based on the first request message and the content included in the information about the uplink data may be as described in the following example 1 to example 3.

Example 1: When the uplink data and the first request message are multiplexed in one message, the first network device sends the second request message to the second network device based on the first request message and the uplink data. That the first network device sends the second request message to the second network device based on the first request message and the uplink data includes: the first network device determines the information about the uplink data based on the first request message and the uplink data. The first network device sends the second request message to the second network device, where the second request message includes the information about the uplink data.

The information about the uplink data may include at least one of the following: first indication information, second indication information, a data amount of the uplink data, and a source LCID corresponding to the uplink data.

The first indication information may indicate that the uplink data arrives at the first network device, the first indication information indicates that the uplink data is sent to the first network device by using the message 3 in the four-step random access procedure, the first indication information indicates that the uplink data is sent to the first network device by using the message A in the two-step random access procedure, or the first indication information indicates that the terminal initiates early data transmission (EDT), so that the second network device determines whether the first network device has received the uplink data. The EDT may indicate that the terminal includes the uplink data in the random procedure initiated to the first network device.

The second indication information may indicate that the uplink data is not included in the first request message, so that the second network device determines that the context of the terminal that is required by the first network device is to include the source PDCP configuration and the source RLC configuration.

The data amount of the uplink data may indicate a size of the uplink data and/or a quantity of data packets in the uplink data, so that the second network device determines the data amount of the uplink data. In a possible implementation, the data amount of the uplink data includes a total data amount of the uplink data. In another possible implementation, the data amount of the uplink data includes a data amount of uplink data on each LCH in an LCG corresponding to the uplink data. Using an example in which the uplink data corresponds to an LCG 1 and an LCG 2, the LCG 1 includes an LCH 1, and the LCG 2 includes an LCH 2 and an LCH 3, the data amount of the uplink data may be as shown in Table 2. In Table 2, a data amount of uplink data on the LCH 1 is 80 bytes, a data amount of uplink data on the LCH 2 is 30 bytes, and a data amount of uplink data on the LCH 3 is 50 bytes. In this case, a data amount of remaining uplink data in the LCG 1 is 80 bytes, a data amount of remaining uplink data in the LCG 2 is 80 bytes (30 bytes+50 bytes), and the total data amount of the uplink data is 160 bytes (80 bytes+80 bytes).

TABLE 2

| LCG | LCH | Data amount of uplink data |
| --- | --- | --- |
| LCG 1 | LCH 1 | 80 bytes |
| LCG 2 | LCH 2 | 30 bytes |
|  | LCH 3 | 50 bytes |

It should be noted that Table 2 is merely an example of the data amount of the uplink data, and the data amount of the uplink data may alternatively be in another form. This is not limited.

The source LCID corresponding to the uplink data is included in the MAC PDU corresponding to the uplink data. Therefore, the first network device may obtain the source LCID by processing, based on the common MAC configuration and the common PHY configuration, the uplink data that is received from the terminal and that is processed based on the source PDCP configuration, the source RLC configuration, the common MAC configuration, and the common PHY configuration. The source LCID corresponding to the uplink data may be used by the second network device to establish a communication tunnel between the second network device and the first network device.

Example 2: When the uplink data is encapsulated in the first request message, the first network device sends the second request message to the second network device based on the first request message. That the first network device sends the second request message to the second network device based on the first request message includes: the first network device determines the information about the uplink data based on the first request message. The first network device sends the second request message to the second network device, where the second request message includes the information about the uplink data.

The information about the uplink data may include at least one of the following: first indication information, fourth indication information, a data amount of the uplink data, and a source LCID corresponding to the uplink data.

For descriptions of the first indication information, the data amount of the uplink data, and the source LCID corresponding to the uplink data, refer to the descriptions in the example 1. Details are not described again.

The fourth indication information may indicate that the uplink data is included in the first request message, so that the second network device determines that the context of the terminal that is required by the first network device is to include the source PDCP configuration.

Example 3: When the first network device does not receive the uplink data, the first network device sends the second request message to the second network device based on the first request message. That the first network device sends the second request message to the second network device based on the first request message includes: the first network device determines the information about the uplink data based on the first request message. The first network device sends the second request message to the second network device, where the second request message includes the information about the uplink data.

The information about the uplink data includes fifth indication information. The fifth indication information may indicate that the uplink data does not arrive at the first network device, the fifth indication information indicates that the uplink data is not sent to the first network device by using the message 3 in the four-step random access procedure, the fifth indication information indicates that the uplink data is not sent to the first network device by using the message A in the two-step random access procedure, or the fifth indication information indicates that the terminal initiates non-EDT, so that the second network device determines whether the first network device has received the uplink data. The non-EDT may indicate that the terminal does not include the uplink data in the random procedure initiated to the first network device.

Optionally, the first network device further receives the buffer status report from the terminal. In this case, the second request message may further include information about the data amount of the remaining uplink data, and the information about the data amount of the remaining uplink data includes the data amount of the remaining uplink data. For descriptions of the buffer status report and the data amount of the remaining uplink data, refer to the descriptions in step 301. Details are not described again.

It should be noted that, if the buffer status includes the total data amount of the remaining uplink data, the information about the data amount of the remaining uplink data includes the total data amount of the remaining uplink data. If the buffer status report includes the data amount of the remaining uplink data on each LCH in the LCG corresponding to the remaining uplink data, the information about the data amount of the remaining uplink data includes the total data amount of the remaining uplink data or the data amount of the remaining uplink data on each LCH in the LCG corresponding to the remaining uplink data.

It should be noted that if the data amount of the remaining uplink data is greater than or equal to a second threshold, the first network device establishes an RRC connection to the terminal, so that the terminal sends the remaining uplink data to the first network device.

Optionally, the first network device further receives the CG capability of the terminal from the terminal. In this case, the first network device may determine, based on the CG capability of the terminal, whether to configure the CG for the terminal. In a possible implementation, if the CG capability of the terminal indicates that the terminal supports the CG, the first network device determines to configure the CG for the terminal.

Optionally, the first network device determines to configure the CG for the terminal, and the second request message may further include third indication information, where the third indication information indicates that the first network device has a capability of configuring the CG for the terminal.

Optionally, the second request message further includes the first identifier.

Step 303: The second network device receives the second request message from the first network device, and determines, based on the second request message, whether to release the first data channel between the second network device and the core network device or whether to send the context of the terminal to the first network device.

For descriptions of the second request message, refer to the descriptions in step 302. Details are not described again.

First, a specific process in which the second network device determines, based on the second request message, whether to release the first data channel is described.

In a possible implementation, for the foregoing example 1, there are the following two cases:

Case 1: The information about the uplink data includes at least one of the first indication information, the second indication information, or the source LCID corresponding to the uplink data, and the second network device determines to release the first data channel or determines to keep the first data channel. In this case, the second network device may determine, based on load of the second network device or the like, whether to release the first data channel. For example, if the load of the second network device is greater than or equal to a third threshold, the second network device determines to release the first data channel; or if the load of the second network device is less than or equal to a third threshold, the second network device determines to keep the first data channel.

Case 2: The information about the uplink data includes at least the data amount of the uplink data. If the data amount of the uplink data is greater than or equal to a first threshold, the second network device determines to release the first data channel; or if the data amount of the uplink data is less than or equal to a first threshold, the second network device determines to keep the first data channel.

In a possible implementation, for the foregoing example 2, there are the following two cases.

Case 3: The information about the uplink data includes at least one of the first indication information, the fourth indication information, or the source LCID corresponding to the uplink data, and the second network device determines to release the first data channel or determines to keep the first data channel. In this case, the second network device may determine, based on load of the second network device or the like, whether to release the first data channel. For example, if the load of the second network device is greater than or equal to a third threshold, the second network device determines to release the first data channel; or if the load of the second network device is less than or equal to a third threshold, the second network device determines to keep the first data channel.

Case 4: The information about the uplink data includes at least the data amount of the uplink data. If the data amount of the uplink data is greater than or equal to a first threshold, the second network device determines to release the first data channel; or if the data amount of the uplink data is less than or equal to a first threshold, the second network device determines to keep the first data channel.

In a possible implementation, for the foregoing example 3, the second network device determines to release the first data channel.

In a possible implementation, in addition to including the information about the uplink data described in the case 1 or the case 3, the second request message further includes the information about the data amount of the remaining uplink data, or includes the information about the data amount of the remaining uplink data and the third indication information. If the data amount of the remaining uplink data is greater than or equal to the second threshold, the second network device determines to release the first data channel; or if the data amount of the remaining uplink data is less than or equal to the second threshold, the second network device determines to keep the first data channel.

In a possible implementation, the second request message further includes the third indication information in addition to the information about the uplink data described in the case 1 or the case 3, and the second network device determines to release the first data channel or determines to keep the first data channel. In this case, the second network device may determine, based on the load of the second network device or the like, whether to release the first data channel. For example, if the load of the second network device is greater than or equal to the third threshold, the second network device determines to release the first data channel; or if the load of the second network device is less than or equal to the third threshold, the second network device determines to keep the first data channel.

In a possible implementation, in addition to including the information about the uplink data described in the case 2 or the case 4, the second request message further includes the information about the data amount of the remaining uplink data, or includes the information about the data amount of the remaining uplink data and the third indication information. If the data amount of the remaining uplink data is greater than or equal to the second threshold, the second network device determines to release the first data channel; or if the data amount of the remaining uplink data is less than or equal to the second threshold, the second network device determines to keep the first data channel.

In a possible implementation, in addition to including the information about the uplink data described in the case 2 or the case 4, the second request message further includes the information about the data amount of the remaining uplink data, or includes the information about the data amount of the remaining uplink data and the third indication information. If the data amount of the uplink data is greater than or equal to the first threshold, the second network device determines to release the first data channel; or if the data amount of the uplink data is less than or equal to the first threshold, the second network device determines to keep the first data channel.

In a possible implementation, the second request message further includes the third indication information in addition to the information about the uplink data described in the case 2 or the case 4. If the data amount of the uplink data is greater than or equal to the first threshold, the second network device determines to release the first data channel; or if the data amount of the uplink data is less than or equal to the first threshold, the second network device determines to keep the first data channel.

In a possible implementation, the second request message further includes the information about the data amount of the remaining uplink data and/or the third indication information in addition to the information about the uplink data described in the example 3, and the second network device determines to release the first data channel.

Optionally, after the second network device determines, based on the second request message, whether to release the first data channel, the second network device sends a first response message to the first network device. If the second network device determines to release the first data channel, the first response message indicates that the second network device releases the first data channel; or if the second network device determines to keep the first data channel, the first response message indicates that the second network device keeps the first data channel.

Optionally, the first response message includes at least one of the following information: the CG capability of the terminal, traffic model information, or CG configuration information that is of the terminal when the terminal is served by the second network device. The traffic model information indicates at least one of the following parameters: a data arrival periodicity that is of the terminal and that is evaluated by the second network device, a transport block size that is of the uplink data and that is evaluated by the second network device, or an arrival timing that is of the terminal and that is evaluated by the second network device. Subsequently, the first network device may determine, based on the CG capability of the terminal, whether to configure the CG for the terminal. When determining to configure the CG for the terminal, the first network device may configure the CG for the terminal with reference to the CG configuration information that is of the terminal when the terminal is served by the second network device. The first network device may determine a possible data arrival periodicity of the terminal, a possible transport block size of the uplink data of the terminal, or a possible arrival timing of the terminal based on the traffic model information.

In a possible implementation, when the second request message includes the third indication information, the first response message includes at least one of the following information: the CG capability of the terminal, the traffic model information, and the CG configuration information that is of the terminal when the terminal is served by the second network device, so that the first network device configures the CG for the terminal based on the foregoing information.

Optionally, the first response message is further for establishing the communication tunnel between the first network device and the second network device. The communication tunnel is for transmitting the uplink data. For example, the communication tunnel is an Xn GTP-U tunnel. There are one or more communication tunnels. There is a correspondence between the communication tunnel and the source LCID. When there is one communication tunnel, the communication tunnel corresponds to one or more source LCIDs. When there are a plurality of communication tunnels, each of the plurality of communication tunnels corresponds to one or more source LCIDs. Different communication tunnels may correspond to a same source LCID or different source LCIDs. The correspondence may be pre-configured in the second network device. It should be noted that, because there is the correspondence between the communication tunnel and the source LCID, the second network device can establish the communication tunnel only when knowing the source LCID. For example, when the information about the uplink data includes the source LCID corresponding to the uplink data, the first response message is further for establishing the communication tunnel.

In a possible implementation, the first response message further includes an identifier of the communication tunnel, and there is a correspondence between the identifier of the communication tunnel and the source LCID.

In another possible implementation, the first response message further includes an address of the communication tunnel, and there is a correspondence between the address of the communication tunnel and the source LCID.

It should be noted that if the second network device determines to release the first data channel, the first response message further includes the context of the terminal, and the context of the terminal includes the source PDCP configuration and the source RLC configuration, so that the first network device obtains the uplink data based on the source PDCP configuration and the source RLC configuration, and sends the uplink data to the core network device. Further optionally, after sending the context of the terminal to the first network device, the second network device releases the locally stored context of the terminal.

Correspondingly, the first network device receives the first response message from the second network device.

In a possible implementation, the first response message indicates that the second network device releases the first data channel, and the first network device establishes a second data channel between the first network device and the core network device. The second data channel is used by the first network device to forward, to the core network device, uplink data sent by the terminal, or the second data channel is used by the first network device to receive data that is from the core network device and that is to be sent to the terminal. The first network device establishes the second data channel between the first network device and the core network device, and the first network device is an anchor node of the terminal. Subsequently, the first network device may send the uplink data to the core network device through the second data channel. The first network device may further send an RRC release message to the terminal, to release the RRC connection between the first network device and the terminal.

In a possible implementation, the first response message indicates that the second network device keeps the first data channel, and the first network device sends the uplink data to the second network device. Further, the first network device sends the uplink data to the second network device through the communication tunnel. It may be understood that the uplink data sent by the first network device may be uplink data that is received from the terminal and that is not processed by the first network device. After receiving the uplink data, the second network device may process the uplink data based on the context of the terminal, and send processed uplink data to the core network device through the first data channel. Subsequently, the second network device may send the RRC release message to the terminal through the first network device, where the RRC release message is for notifying that the terminal is in the RRC-inactive state or an RRC-idle state.

It should be noted that the uplink data sent by the first network device may alternatively be data that is received from the terminal and that is processed based on the context of the terminal. After receiving the uplink data, the second network device may send the uplink data to the core network device through the first data channel.

The following describes a specific process in which the second network device determines, based on the second request message, whether to send the context of the terminal to the first network device.

In a possible implementation, for the foregoing example 1 and the case in which the second request message further includes the information about the data amount of the remaining uplink data in addition to the information about the uplink data described in the example 1, the second network device determines to send the context of the terminal to the first network device, where the context of the terminal includes the source PDCP configuration and the source RLC configuration; or the second network device determines not to send the context of the terminal to the first network device. In this case, the second network device may determine, based on a remaining storage resource of the second network device or the like, whether to send the context of the terminal to the first network device. For example, if the remaining storage resource of the second network device is greater than or equal to a fourth threshold, the second network device determines not to send the context of the terminal to the first network device; or if the remaining storage resource of the second network device is less than or equal to a fourth threshold, the second network device determines to send the context of the terminal to the first network device, where the context of the terminal includes the source PDCP configuration and the source RLC configuration. After sending the context of the terminal to the first network device, the second network device releases the context of the terminal.

In a possible implementation, for the foregoing example 2 and the case in which the second request message further includes the information about the data amount of the remaining uplink data in addition to the information about the uplink data described in the example 2, the second network device determines to send the context of the terminal to the first network device, where the context of the terminal includes the source PDCP configuration; or the second network device determines not to send the context of the terminal to the first network device. In this case, the second network device may determine, based on a remaining storage resource of the second network device or the like, whether to send the context of the terminal to the first network device. For example, if the remaining storage resource of the second network device is greater than or equal to a fourth threshold, the second network device determines not to send the context of the terminal to the first network device; or if the remaining storage resource of the second network device is less than or equal to a fourth threshold, the second network device determines to send the context of the terminal to the first network device, where the context of the terminal includes the source PDCP configuration and the source RLC configuration. After sending the context of the terminal to the first network device, the second network device releases the context of the terminal.

In a possible implementation, for the foregoing example 3 and the case in which the second request message further includes the information about the data amount of the remaining uplink data and/or the third indication information in addition to the information about the uplink data described in the example 3, the second network device determines to send the context of the terminal to the first network device, where the context of the terminal includes the source PDCP configuration and the source RLC configuration.

In a possible implementation, the second request message further includes the third indication information in addition to the information about the uplink data described in the example 1 or the example 2, and the second network device determines to send the context of the terminal to the first network device, where the context of the terminal includes the source PDCP configuration and the source RLC configuration.

In a possible implementation, the second request message further includes the information about the data amount of the remaining uplink data and the third indication information in addition to the information about the uplink data described in the example 1 or the example 2, and the second network device determines to send the context of the terminal to the first network device, where the context of the terminal includes the source PDCP configuration and the source RLC configuration.

It should be noted that if the second network device determines to send the context of the terminal to the first network device, the second network device determines the context of the terminal based on the first identifier included in the second request message, and sends the context of the terminal to the first network device.

It should be noted that the first threshold, the second threshold, the third threshold, or the fourth threshold may be preset, or may be set by a user based on a requirement. This is not limited.

Optionally, after the second network device determines, based on the second request message, whether to send the context of the terminal to the first network device, the second network device sends a second response message to the first network device. If the second network device determines to send the context of the terminal to the first network device, the second response message includes the context of the terminal; or if the second network device determines not to send the context of the terminal to the first network device, the second response message indicates that the second network device does not send the context of the terminal to the first network device.

Optionally, the second response message includes at least one of the following information: the CG capability of the terminal, traffic model information, or CG configuration information that is of the terminal when the terminal is served by the second network device.

Optionally, the second response message is further for establishing the communication tunnel between the first network device and the second network device.

It should be noted that for a case in which the second response message includes at least one of the CG capability of the terminal, the traffic model information, or the CG configuration information that is of the terminal when the terminal is served by the second network device, and a case in which the second response message is further for establishing the communication tunnel between the first network device and the second network device, refer to the descriptions of the first response message. Details are not described again.

Optionally, the second response message is a retrieve UE context response message.

It may be understood that, if the second response message includes the context of the terminal, the second network device may release the first data channel; or if the second response message indicates that the second network device does not send the context of the terminal to the first network device, the second network device may keep the first data channel.

Correspondingly, the first network device receives the second response message from the second network device.

In a possible implementation, the second response message includes the source PDCP configuration, and the first network device obtains the uplink data based on the source PDCP configuration. Subsequently, the first network device may establish the second data channel with a core network, and send the uplink data to the core network device through the second data channel. Alternatively, the first network device sends the uplink data to the second network device, and the second network device sends the uplink data to the core network device through the first data channel after receiving the uplink data. For descriptions of the second data channel, refer to the descriptions of the first response message. Details are not described again.

In a possible implementation, the second response message includes the source PDCP configuration and the source RLC configuration, and the first network device obtains the uplink data based on the source PDCP configuration and the source RLC configuration. Subsequently, the first network device may establish the second data channel with a core network, and send the uplink data to the core network device through the second data channel. Alternatively, the first network device sends the uplink data to the second network device, and the second network device sends the uplink data to the core network device through the first data channel after receiving the uplink data.

In a possible implementation, if the second response message indicates that the second network device determines not to send the context of the terminal to the first network device, the first network device deletes the locally stored uplink data; the first network device sends, to the terminal, indication information indicating to send the uplink data again; or the first network device sends the uplink data to the second network device, where further, the first network device sends the uplink data to the second network device through the communication tunnel. It may be understood that the uplink data sent by the first network device may be uplink data that is received from the terminal and that is not processed by the first network device. After receiving the uplink data, the second network device may process the uplink data based on the context of the terminal, and send processed uplink data to the core network device through the first data channel. Subsequently, the second network device may send the RRC release message to the terminal through the first network device, where the RRC release message is for notifying that the terminal is in the RRC-inactive state or an RRC-idle state.

In a possible implementation, if the first network device does not receive the second response message within a preset time period, the first network device deletes the locally stored uplink data; the first network device sends, to the terminal, indication information indicating to send the uplink data again; or the first network device sends the uplink data to the second network device, where further, the first network device sends the uplink data to the second network device through the communication tunnel. It may be understood that the uplink data sent by the first network device may be uplink data that is received from the terminal and that is not processed by the first network device. After receiving the uplink data, the second network device may process the uplink data based on the context of the terminal, and send processed uplink data to the core network device through the first data channel. Subsequently, the second network device may send the RRC release message to the terminal through the first network device, where the RRC release message is for notifying that the terminal is in the RRC-inactive state or an RRC-idle state.

It should be noted that the second request message may alternatively be for requesting the second network device to release the first data channel and send the context of the terminal to the first network device. In this case, for a specific process in which the second network device determines, based on the second request message, whether to release the first data channel and whether to send the context of the terminal to the first network device, refer to the descriptions in the foregoing case in which the second request message is for requesting the second network device to release the first data channel and the foregoing case in which the second request message is for requesting the second network device to send the context of the terminal to the first network device. Details are not described again.

Based on the method shown in FIG. 3, after receiving the first request message from the terminal, the first network device may send the second request message to the second network device based on the first request message, so that the second network device determines, based on the second request message, whether to release the first data channel or whether to send the context of the terminal to the first network device. In this way, the second network device may determine, based on the second request message, whether to release the first data channel or whether to send the context of the terminal to the first network device, to improve flexibility of processing the uplink data by the first network device and the second network device.

Figure 4:
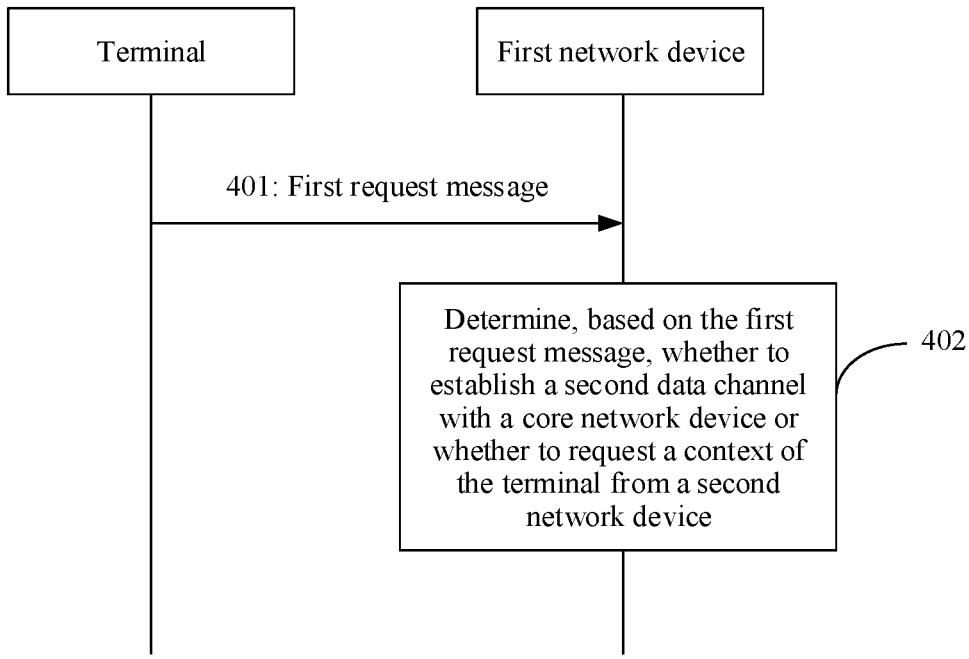
FIG. 4 is a second schematic flowchart of a communication method according to an embodiment of this application.

In the method shown in FIG. 3, the second network device determines whether to release the first data channel or whether to send the context of the terminal to the first network device. In addition, the first network device may alternatively determine whether to release the first data channel or whether to send the context of the terminal to the first network device. Specifically, FIG. 4 shows another communication method according to an embodiment of this application. The communication method includes step 401 and step 402.

Step 401: A terminal sends a first request message to a first network device.

For descriptions of step 401, refer to the descriptions of step 301. Details are not described again.

Step 402: The first network device receives the first request message from the terminal, and determines, based on the first request message, whether to establish a second data channel with a core network device or whether to request a context of the terminal from a second network device.

The core network device may be the core network device 106 in FIG. 1A. The second data channel is used by the first network device to forward, to the core network device, uplink data sent by the terminal, or the second data channel is used by the first network device to receive data that is from the core network device and that is to be sent to the terminal. If the second data channel is established between the first network device and the core network device, the first network device is an anchor node of the terminal.

Optionally, the first network device further receives uplink data from the terminal. For descriptions of the uplink data and the first request message, refer to the descriptions in step 301. Details are not described again. For a process in which the first network device processes the first request message and the uplink data that are received from the terminal, refer to the descriptions in step 302. Details are not described again.

Optionally, the first network device further receives a buffer status report from the terminal. The buffer status report indicates a data amount of remaining uplink data. For descriptions of the buffer status report and the data amount of the remaining uplink data, refer to the descriptions in step 302. Details are not described again.

It should be noted that if the data amount of the remaining uplink data is greater than or equal to a second threshold, the first network device establishes an RRC connection to the terminal, so that the terminal sends the remaining uplink data to the first network device.

Optionally, the first network device further receives a CG capability of the terminal from the terminal. In this case, the first network device may determine, based on the CG capability of the terminal, whether to configure a CG for the terminal. In a possible implementation, if the CG capability of the terminal indicates that the terminal supports the CG, the first network device determines to configure the CG for the terminal.

Optionally, the first network device determines to configure the CG for the terminal, and the first network device sends third indication information to the second network device, where the third indication information indicates that the first network device has a capability of configuring the CG for the terminal.

It may be understood that processes in which the first network device determines, based on the first request message, whether to establish the second data channel with the core network device and processes in which the first network device determines, based on the first request message, whether to request the context of the terminal from the second network device are different when the first network device receives the uplink data from the terminal and the uplink data and the first request message are multiplexed in one message, when the first network device receives the uplink data from the terminal and the uplink data is encapsulated in the first request message, when the first network device does not receive the uplink data, when the first network device receives the buffer status report from the terminal, and when the first network device receives the CG capability of the terminal from the terminal.

First, a specific process in which the first network device determines, based on the first request message, whether to establish the second data channel with the core network device is described.

In a possible implementation, when the uplink data and the first request message are multiplexed in one message, the first network device determines, based on the first request message and the uplink data, whether to establish the second data channel with the core network device. That the first network device determines, based on the first request message and the uplink data, whether to establish the second data channel with the core network device includes: the first network device determines information about the uplink data based on the first request message and the uplink data. The first network device determines, based on the information about the uplink data, whether to establish the second data channel with the core network device.

The information about the uplink data may include at least one of the following: first indication information, second indication information, a data amount of the uplink data, and a source LCID corresponding to the uplink data. For descriptions of the first indication information, the second indication information, the data amount of the uplink data, and the source LCID corresponding to the uplink data, refer to the descriptions in step 302. Details are not described again.

There are the following two cases in which the first network device determines, based on the information about the uplink data, whether to establish the second data channel with the core network device:

Case 5: The information about the uplink data includes at least one of the first indication information, the second indication information, or the source LCID corresponding to the uplink data, and the first network device determines to establish the second data channel with the core network device, or the first network device determines not to establish the second data channel with the core network device. In this case, the first network device may determine, based on load of the first network device or the like, whether to establish the second data channel with the core network device. For example, if the load of the first network device is greater than or equal to a third threshold, the first network device determines not to establish the second data channel with the core network device; or if the load of the first network device is less than or equal to a third threshold, the first network device determines to establish the second data channel with the core network device.

Case 6: The information about the uplink data includes at least the data amount of the uplink data. If the data amount of the uplink data is greater than or equal to a first threshold, the first network device determines to establish the second data channel with the core network device; or if the data amount of the uplink data is less than or equal to a first threshold, the second network device determines not to establish the second data channel with the core network device.

In a possible implementation, when the uplink data is encapsulated in the first request message, the first network device determines, based on the first request message, whether to establish the second data channel with the core network device. That the first network device determines, based on the first request message, whether to establish the second data channel with the core network device includes: the first network device determines information about the uplink data based on the first request message. The first network device determines, based on the information about the uplink data, whether to establish the second data channel with the core network device.

The information about the uplink data may include at least one of the following: first indication information, fourth indication information, a data amount of the uplink data, and a source LCID corresponding to the uplink data. For descriptions of the first indication information, the fourth indication information, the data amount of the uplink data, and the source LCID corresponding to the uplink data, refer to the descriptions in step 302. Details are not described again.

There are the following two cases in which the first network device determines, based on the information about the uplink data, whether to establish the second data channel with the core network device.

Case 7: The information about the uplink data includes at least one of the first indication information, the fourth indication information, or the source LCID corresponding to the uplink data, and the first network device determines not to establish the second data channel with the core network device, or the first network device determines to establish the second data channel with the core network device. In this case, the first network device may determine, based on load of the first network device or the like, whether to establish the second data channel with the core network device. For example, if the load of the first network device is greater than or equal to a third threshold, the first network device determines not to establish the second data channel with the core network device; or if the load of the first network device is less than or equal to a third threshold, the first network device determines to establish the second data channel with the core network device.

Case 8: The information about the uplink data includes at least the data amount of the uplink data. If the data amount of the uplink data is greater than or equal to a first threshold, the first network device determines to establish the second data channel with the core network device; or if the data amount of the uplink data is less than or equal to a first threshold, the first network device does not establish the second data channel with the core network device.

In a possible implementation, when the first network device does not receive the uplink data, the first network device determines, based on the first request message, whether to establish the second data channel with the core network device. That the first network device determines, based on the first request message, whether to establish the second data channel with the core network device includes: the first network device determines information about the uplink data based on the first request message. The first network device determines, based on the information about the uplink data, whether to establish the second data channel with the core network device.

The information about the uplink data includes fifth indication information. For descriptions of the fifth indication information, refer to the descriptions in step 302. Details are not described again. In this case, the first network device determines to establish the second data channel with the core network device.

In a possible implementation, the first network device determines, further based on the buffer status report in addition to the information about the uplink data described in the case 5 or the case 7, whether to establish the second data channel with the core network device. In this case, if the data amount of the remaining uplink data is greater than or equal to the second threshold, the first network device determines to establish the second data channel with the core network device; or if the data amount of the remaining uplink data is less than or equal to the second threshold, the first network device determines not to establish the second data channel with the core network device.

In a possible implementation, the first network device determines, further based on the CG capability of the terminal in addition to the information about the uplink data described in the case 5 or the case 7, whether to establish the second data channel with the core network device. In this case, the first network device determines to establish the second data channel with the core network device, or the first network device determines not to establish the second data channel with the core network device. In this case, the first network device may determine, based on the load of the first network device or the like, whether to establish the second data channel with the core network device. For example, if the load of the first network device is greater than or equal to the third threshold, the first network device determines not to establish the second data channel with the core network device; or if the load of the first network device is less than or equal to the third threshold, the first network device determines to establish the second data channel with the core network device.

In a possible implementation, the first network device determines, further based on the buffer status report and the CG capability of the terminal in addition to the information about the uplink data described in the case 5 or the case 7, whether to establish the second data channel with the core network device. In this case, if the data amount of the remaining uplink data is greater than or equal to the second threshold, the first network device determines to establish the second data channel with the core network device; or if the data amount of the remaining uplink data is less than or equal to the second threshold, the first network device determines not to establish the second data channel with the core network device.

In a possible implementation, the first network device determines, based on the received buffer status report in addition to the information about the uplink data described in the case 6 or the case 8, whether to establish the second data channel with the core network device. In this case, if the data amount of the remaining uplink data is greater than or equal to the second threshold, the first network device determines to establish the second data channel with the core network device; or if the data amount of the remaining uplink data is less than or equal to the second threshold, the first network device determines not to establish the second data channel with the core network device.

In a possible implementation, the first network device determines, further based on the buffer status report in addition to the information about the uplink data described in the case 6 or the case 8, whether to establish the second data channel with the core network device. In this case, if the data amount of the uplink data is greater than or equal to the first threshold, the first network device determines to establish the second data channel with the core network device; or if the data amount of the uplink data is less than or equal to the first threshold, the first network device does not establish the second data channel with the core network device.

In a possible implementation, the first network device determines, further based on the CG capability of the terminal in addition to the information about the uplink data described in the case 6 or the case 8, whether to establish the second data channel with the core network device. In this case, if the data amount of the uplink data is greater than or equal to the first threshold, the first network device determines to establish the second data channel with the core network device; or if the data amount of the uplink data is less than or equal to the first threshold, the first network device does not establish the second data channel with the core network device.

In a possible implementation, the first network device determines, further based on the buffer status report and the CG capability of the terminal in addition to the information about the uplink data described in the case 6 or the case 8, whether to establish the second data channel with the core network device. In this case, if the data amount of the remaining uplink data is greater than or equal to the second threshold, the first network device determines to establish the second data channel with the core network device; or if the data amount of the remaining uplink data is less than or equal to the second threshold, the first network device determines not to establish the second data channel with the core network device.

In a possible implementation, the first network device determines, further based on the buffer status report and the CG capability of the terminal in addition to the information about the uplink data described in the case 6 or the case 8, whether to establish the second data channel with the core network device. In this case, if the data amount of the uplink data is greater than or equal to the first threshold, the first network device determines to establish the second data channel with the core network device; or if the data amount of the uplink data is less than or equal to the first threshold, the first network device does not establish the second data channel with the core network device.

In a possible implementation, the first network device determines, further based on the buffer status report and/or the CG capability of the terminal in addition to the information about the uplink data described in the example 3, whether to establish the second data channel with the core network device. In this case, the first network device determines to establish the second data channel with the core network device.

The following describes a specific process in which the first network device determines, based on the first request message, whether to request the context of the terminal from the second network device.

In a possible implementation, when the uplink data and the first request message are multiplexed in one message, the first network device determines, based on the first request message and the uplink data, whether to request the context of the terminal from the second network device. That the first network device determines, based on the first request message and the uplink data, whether to request the context of the terminal from the second network device includes: the first network device determines information about the uplink data based on the first request message and the uplink data. The first network device determines, based on the information about the uplink data, whether to request the context of the terminal from the second network device.

The information about the uplink data may include at least one of the following: first indication information, second indication information, a data amount of the uplink data, and a source LCID corresponding to the uplink data. For descriptions of the first indication information, the second indication information, the data amount of the uplink data, and the source LCID corresponding to the uplink data, refer to the descriptions in step 302. Details are not described again.

In this case, the first network device determines to request the context of the terminal from the second network device, where the context of the terminal includes a source PDCP configuration and a source RLC configuration. Alternatively, the first network device determines not to request the context of the terminal from the second network device. In this case, the first network device may determine, based on a remaining storage resource of the first network device or the like, whether to request the context of the terminal from the second network device. For example, if the remaining storage resource of the first network device is greater than or equal to a fifth threshold, the first network device determines to request the context of the terminal from the second network device; or if the remaining storage resource of the first network device is less than or equal to a fifth threshold, the second network device determines not to request the context of the terminal from the second network device.

The first network device may determine, further based on the CG capability of the terminal in addition to the information about the uplink data, whether to request the context of the terminal from the second network device, or the first network device may determine, further based on the buffer status report and the CG capability of the terminal in addition to the information about the uplink data, whether to request the context of the terminal from the second network device. If the first network device determines, based on the CG capability of the terminal, to configure the CG for the terminal, the first network device determines to request the context of the terminal from the second network device, where the context of the terminal includes the source PDCP configuration and the source RLC configuration. If the first network device determines, based on the CG capability of the terminal, not to configure the CG for the terminal, the first network device determines to request the context of the terminal from the second network device, where the context of the terminal includes the source PDCP configuration and the source RLC configuration; or the first network device determines not to request the context of the terminal from the second network device.

In a possible implementation, when the uplink data is encapsulated in the first request message, the first network device determines, based on the first request message, whether to request the context of the terminal from the second network device. That the first network device determines, based on the first request message, whether to request the context of the terminal from the second network device includes: the first network device determines information about the uplink data based on the first request message. The first network device determines, based on the information about the uplink data, whether to request the context of the terminal from the second network device.

The information about the uplink data may include at least one of the following: first indication information, fourth indication information, a data amount of the uplink data, and a source LCID corresponding to the uplink data. For descriptions of the first indication information, the fourth indication information, the data amount of the uplink data, and the source LCID corresponding to the uplink data, refer to the descriptions in step 302. Details are not described again.

In this case, the first network device determines to request the context of the terminal from the second network device, where the context of the terminal includes a source PDCP configuration. Alternatively, the first network device determines not to request the context of the terminal from the second network device. In this case, the first network device may determine, based on a remaining storage resource of the first network device or the like, whether to request the context of the terminal from the second network device. For example, if the remaining storage resource of the first network device is greater than or equal to a fifth threshold, the first network device determines to request the context of the terminal from the second network device; or if the remaining storage resource of the first network device is less than or equal to a fifth threshold, the second network device determines not to request the context of the terminal from the second network device.

The first network device may determine, further based on the CG capability of the terminal in addition to the information about the uplink data, whether to request the context of the terminal from the second network device, or the first network device may determine, further based on the buffer status report and the CG capability of the terminal in addition to the information about the uplink data, whether to request the context of the terminal from the second network device. If the first network device determines, based on the CG capability of the terminal, to configure the CG for the terminal, the first network device determines to request the context of the terminal from the second network device, where the context of the terminal includes the source PDCP configuration. If the first network device determines, based on the CG capability of the terminal, not to configure the CG for the terminal, the first network device determines to request the context of the terminal from the second network device, where the context of the terminal includes the source PDCP configuration; or the first network device determines not to request the context of the terminal from the second network device.

In a possible implementation, when the first network device does not receive the uplink data, the first network device determines, based on the first request message, whether to request the context of the terminal from the second network device. That the first network device determines, based on the first request message, whether to request the context of the terminal from the second network device includes: the first network device determines information about the uplink data based on the first request message. The first network device determines, based on the information about the uplink data, whether to request the context of the terminal from the second network device.

The information about the uplink data includes fifth indication information. For descriptions of the fifth indication information, refer to the descriptions in step 302. Details are not described again. In this case, the first network device determines to request the context of the terminal from the second network device, where the context of the terminal includes a source PDCP configuration and a source RLC configuration.

It should be noted that the first threshold, the second threshold, the third threshold, or the fifth threshold may be preset, or may be set by a user based on a requirement. This is not limited.

Based on the method shown in FIG. 4, after receiving the first request message from the terminal, the first network device may determine, based on the first request message, whether to establish the second data channel with the core network device or whether to request the context of the terminal from the second network device. In this way, flexibility of processing the uplink data by the first network device and the second network device is improved.

Figure 5:
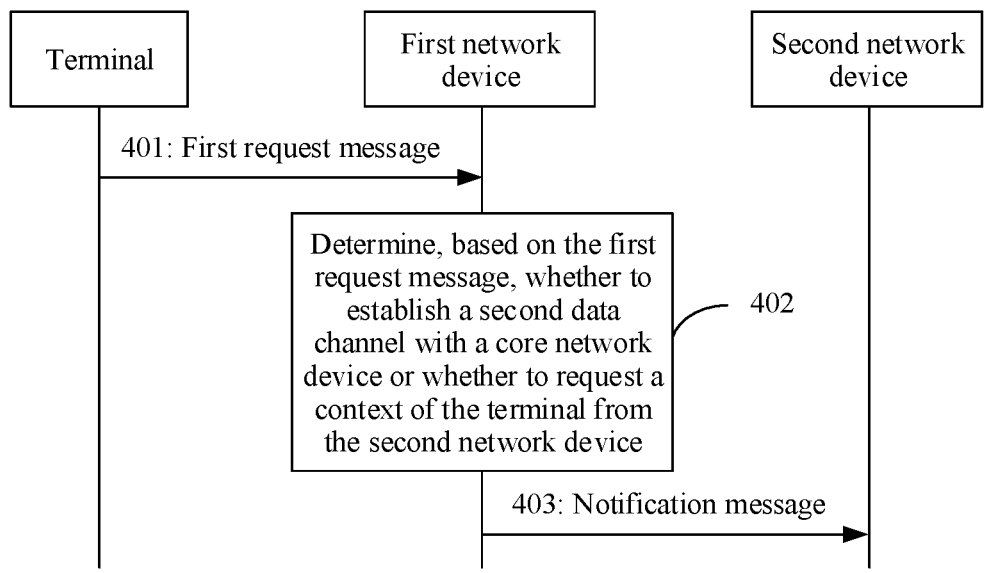
FIG. 5 is a third schematic flowchart of a communication method according to an embodiment of this application.

Further optionally, when the first network device determines to establish the second data channel with the core network device, when the first network device determines not to establish the second data channel with the core network device, or when the first network device determines to request the context of the terminal from the second network device, the first network device sends a communication message to the second network device. Specifically, as shown in FIG. 5, the method shown in FIG. 4 further includes step 403.

Step 403: The first network device sends a notification message to the second network device.

Functions of the notification message are different when the first network device determines to establish the second data channel with the core network device, when the first network device determines not to establish the second data channel with the core network device, and when the first network device determines to request the context of the terminal from the second network device. Specifically, the notification message is described as follows.

Case 9: The first network device determines to establish the second data channel with the core network device, and the notification message indicates the second network device to release a first data channel between the second network device and the core network device.

The first data channel is used by the second network device to forward, to the core network device, uplink data sent by the terminal, or the first data channel is used by the second network device to receive data that is from the core network device and that is to be sent to the terminal. In this case, the second network device is an anchor node of the terminal. Subsequently, the first network device may send the uplink data to the core network device through the second data channel. The first network device may further send an RRC release message to the terminal, to suspend the RRC connection between the first network device and the terminal.

In this case, the first network device may further receive a response message from the second network device, where the response message may indicate that the second network device successfully releases the first data channel. The response message may include the context of the terminal, and the context of the terminal includes the source PDCP configuration and the source RLC configuration, so that the first network device obtains the uplink data based on the source PDCP configuration and the source RLC configuration, and sends the uplink data to the core network device.

It may be understood that after sending the context of the terminal to the first network device, the second network device releases the locally stored context of the terminal.

Case 10: The first network device determines not to establish the second data channel with the core network device, and the notification message indicates the second network device to keep a first data channel between the second network device and the core network device.

The first data channel is used by the second network device to forward, to the core network device, uplink data sent by the terminal, or the first data channel is used by the second network device to receive data that is from the core network device and that is to be sent to the terminal. In this case, the second network device is an anchor node of the terminal.

In this case, the first network device may further receive a response message from the second network device, where the response message is for establishing a communication tunnel between the first network device and the second network device. For descriptions of the communication tunnel, refer to the descriptions in step 303. Details are not described again.

In this case, after the first network device receives the response message from the second network device, the first network device sends the uplink data to the second network device. Further, the first network device sends the uplink data to the second network device through the communication tunnel. It may be understood that the uplink data sent by the first network device may be uplink data that is received from the terminal and that is not processed by the first network device. After receiving the uplink data, the second network device may process the uplink data based on the context of the terminal, and send processed uplink data to the core network device through the first data channel. Subsequently, the second network device may send an RRC release message to the terminal through the first network device, where the RRC release message is for notifying that the terminal is in an RRC-inactive state or an RRC-idle state.

It should be noted that the uplink data sent by the first network device may alternatively be data that is received from the terminal and that is processed based on the context of the terminal. After receiving the uplink data, the second network device may send the uplink data to the core network device through the first data channel.

It may be understood that the uplink data may alternatively be sent to the second network device via the notification message.

Case 11: The first network device determines to request the context of the terminal from the second network device, and the notification message indicates the second network device to send the context of the terminal to the first network device. The notification message includes a first identifier, so that the second network device determines the context of the terminal based on the first identifier.

In this case, the first network device may further receive a response message from the second network device. The response message includes the context of the terminal. Subsequently, the first network device may obtain the uplink data based on the context of the terminal.

Optionally, the context of the terminal includes the source PDCP configuration, or includes the source PDCP configuration and the source RLC configuration.

In a possible implementation, the context of the terminal includes the source PDCP configuration, and the first network device obtains the uplink data based on the source PDCP configuration. Subsequently, the first network device may establish the second data channel with a core network, and send the uplink data to the core network device through the second data channel. Alternatively, the first network device sends the uplink data to the second network device, and the second network device sends the uplink data to the core network device through the first data channel after receiving the uplink data. For descriptions of the second data channel, refer to the descriptions in step 303. Details are not described again.

In another possible implementation, the context of the terminal includes the source PDCP configuration and the source RLC configuration, and the first network device obtains the uplink data based on the source PDCP configuration and the source RLC configuration. Subsequently, the first network device may establish the second data channel with a core network, and send the uplink data to the core network device through the second data channel. Alternatively, the first network device sends the uplink data to the second network device, and the second network device sends the uplink data to the core network device through the first data channel after receiving the uplink data.

Optionally, if the first network device does not receive the response message within a preset time period, the first network device may delete the locally stored uplink data; the first network device may send, to the terminal, indication information indicating to send the uplink data again; or the first network device sends the uplink data to the second network device, where further, the first network device sends the uplink data to the second network device through the communication tunnel. It may be understood that the uplink data sent by the first network device may be uplink data that is received from the terminal and that is not processed by the first network device. After receiving the uplink data, the second network device may process the uplink data based on the context of the terminal, and send processed uplink data to the core network device through the first data channel. Subsequently, the second network device may send an RRC release message to the terminal through the first network device, where the RRC release message is for notifying that the terminal is in an RRC-inactive state or an RRC-idle state.

It may be understood that if the notification message indicates the second network device to send the context of the terminal to the first network device, the second network device may release the first data channel.

Optionally, the response messages in the foregoing three cases further include at least one of the CG capability of the terminal, traffic model information, or CG configuration information that is of the terminal when the terminal is served by the second network device. For descriptions of the CG capability of the terminal, the traffic model information, or the CG configuration information that is of the terminal when the terminal is served by the second network device, refer to the descriptions in step 303. Details are not described again. Subsequently, the first network device may determine, based on the CG capability of the terminal, whether to configure the CG for the terminal. When determining to configure the CG for the terminal, the first network device may configure the CG for the terminal with reference to the CG configuration information that is of the terminal when the terminal is served by the second network device. The first network device may determine a possible data arrival periodicity of the terminal, a possible transport block size of the uplink data of the terminal, or a possible arrival timing of the terminal based on the traffic model information.

Based on the method shown in FIG. 5, when the first network device determines to establish the second data channel with the core network device, when the first network device determines not to establish the second data channel with the core network device, or when the first network device determines to request the context of the terminal from the second network device, the first network device sends the communication message to the second network device, to notify the second network device to release the first data channel, notify the second network device to keep the first data channel, or notify the second network device to send the context of the terminal to the first network device.

Figure 6:
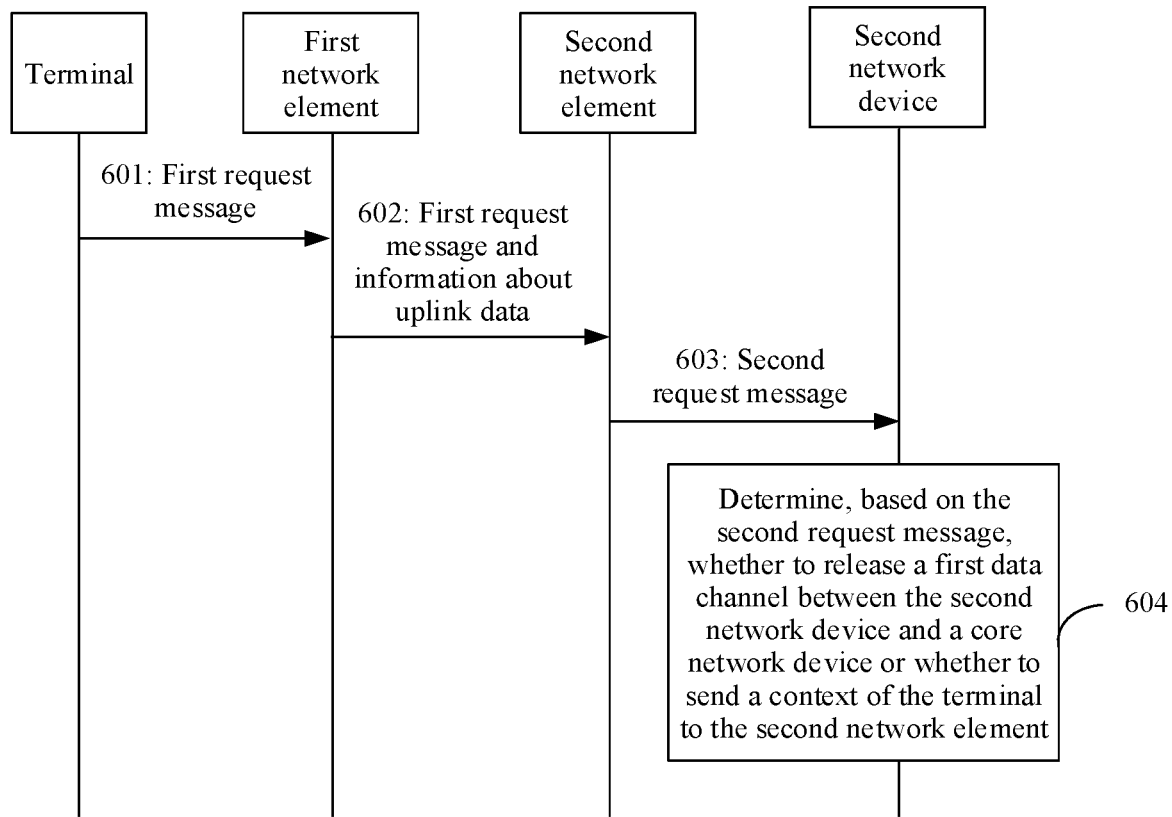
FIG. 6 is a fourth schematic flowchart of a communication method according to an embodiment of this application.

It may be understood that the first network device in the method shown in FIG. 3 may be in a CU-DU split architecture. When the first network device is in the CU-DU split architecture, an embodiment of this application provides a communication method, so that the second network device can determine whether to release a first data channel, or determine whether to send a context of the terminal to a CU of the first network device. Specifically, as shown in FIG. 6, the communication method includes step 601 to step 604.

Step 601: The terminal sends a first request message to a first network element.

The terminal may be either of the terminal 103 and the terminal 104 in FIG. 1A. The first network element is the DU 1012 or the DU 1013 in FIG. 1C.

Optionally, the terminal is in an RRC-inactive state. A network device previously serving the terminal is the second network device. To be specific, the second network device stores the context of the terminal, or there is a data channel for the terminal between the second network device and the core network device. The second network device may be the network device 102 in FIG. 1A.

During actual application, when the terminal is in an RRC-connected state, the terminal may receive an RRC release message from the second network device, and may suspend an RRC connection to the second network device based on the RRC release message, to enter the RRC-inactive state. The RRC release message includes a first identifier, and the first identifier is for identifying the context of the terminal. The first identifier may be allocated by the second network device when the terminal receives the RRC release message this time, or may be allocated by the second network device when the terminal previously receives an RRC release message from the second network device. The first identifier is a unique identifier in a plurality of cells served by different network devices. For example, the first identifier is a resume ID.

It should be noted that the second network device may be replaced with a second network element. The second network element may be the CU 1011 in FIG. 1C. When the second network device is replaced with the second network element, the terminal is in a service coverage area of a third network element before receiving the RRC release message. The third network element is different from the second network element. For example, if the second network element is the DU 1012 in FIG. 1C, the third network element is the DU 1013 in FIG. 1C; or if the second network element is the DU 1013 in FIG. 1C, the third network element is the DU 1012 in FIG. 1C. The method shown in FIG. 6 is described by using an example in which the network device previously serving the terminal is the second network device. For a case in which the terminal is in the service coverage area of the third network element before receiving the RRC release message, refer to the method shown in FIG. 6. Details are not described again.

Optionally, the RRC release message further includes a source RRC reconfiguration. After receiving the RRC release message, the terminal stores the source RRC reconfiguration. The source RRC reconfiguration is allocated by the second network device to the terminal. The source RRC reconfiguration includes a source DRB configuration, a source PDCP configuration, and a source RLC configuration. The source DRB configuration includes a mapping relationship between a source DRB and a source PDCP and a mapping relationship between the source DRB and source RLC. The source PDCP configuration includes a length of a source PDCP SN. The source RLC configuration includes a length of a source RLC SN or a mode indication, for example, an acknowledged mode (AM) or an unacknowledged mode (UM). The source RRC reconfiguration is for processing uplink data when the terminal transmits the uplink data next time.

Optionally, the terminal is movable. When the terminal moves from a service coverage area of the second network device to a service coverage area of the first network element, and uplink data arrives at the terminal, the terminal sends the first request message to the first network element. The uplink data may be user-plane uplink data, and the first request message may be for requesting to resume the suspended RRC connection. The first request message may be an RRC resume request, and includes the first identifier. The terminal may further send the uplink data to the first network element. The terminal may simultaneously send the first request message and the uplink data, or the terminal may separately send the first request message and the uplink data. When the terminal simultaneously sends the first request message and the uplink data, the uplink data and the first request message are multiplexed in one message, or the uplink data is encapsulated in the first request message. For example, the terminal sends the first request message to the first network element, where the first request message includes the uplink data.

It may be understood that the first request message and the uplink data are sent to the first network element after being processed by a PDCP layer entity, an RLC layer entity, a MAC layer entity, and a PHY entity of the terminal. For this process, refer to the descriptions, in step 301, that the first request message and the uplink data are sent to the first network device after being processed by the PDCP layer entity, the RLC layer entity, the MAC layer entity, and the PHY entity of the terminal. Details are not described again.

Optionally, the first request message, or the first request message and the uplink data is/are sent to the first network element in a random procedure initiated by the terminal. For example, the first request message, or the first request message and the uplink data is/are sent to the first network element by using a message 3 in a four-step random access procedure. For another example, the first request message, or the first request message and the uplink data is/are sent to the first network element by using a message A in a two-step random access procedure.

Optionally, the first request message further includes the first identifier.

Optionally, the terminal may further send a buffer status report to the first network element. For descriptions of the buffer status report, refer to the descriptions in step 301. Details are not described again.

Optionally, the terminal may further send a CG capability of the terminal to the first network element. The CG capability of the terminal indicates whether the terminal supports a CG.

Step 602: The first network element receives the first request message from the terminal, and sends the first request message and information about the uplink data to the second network element based on the first request message.

Optionally, the first network element may further receive the uplink data from the terminal. For descriptions of the uplink data and the first request message, refer to the descriptions in step 601. Details are not described again.

It should be noted that if the uplink data and the first request message are multiplexed in one message, the first network element may process, based on a common RLC configuration, a common MAC configuration, and a common PHY configuration, the received first request message processed based on a common PDCP configuration, the common RLC configuration, the common MAC configuration, and the common PHY configuration, to obtain a first request message processed based on the common PDCP configuration. The first network element may process, based on the common MAC configuration and the common PHY configuration, the received uplink data processed based on the source PDCP configuration, the source RLC configuration, the common MAC configuration, and the common PHY configuration, to obtain uplink data processed based on the source PDCP configuration and the source RLC configuration and a source LCID. Because the first network element does not know the source RLC configuration, the first network element cannot obtain the uplink data processed based on the source PDCP configuration. To obtain the uplink data processed based on the source PDCP configuration, the first network element needs to request the context of the terminal from the second network device through the second network element.

It should be noted that if the uplink data is encapsulated in the first request message, the first network element may process, based on a common RLC configuration, a common MAC configuration, and a common PHY configuration, the received first request message processed based on a common PDCP configuration, the common RLC configuration, the common MAC configuration, and the common PHY configuration, to obtain a first request message processed based on the common PDCP configuration. Subsequently, the first network element may send, to the second network element, the first request message processed based on the common PDCP configuration, so that the second network element processes, based on the common PDCP configuration, the first request message processed based on the common PDCP configuration, to obtain the first request message.

It may be understood that content included in the information about the uplink data is different when the first network element receives the uplink data from the terminal and the uplink data and the first request message are multiplexed in one message, when the first network element receives the uplink data from the terminal and the uplink data is encapsulated in the first request message, and when the first network element does not receive the uplink data. Specifically, the content may be as described in the following example 4 to example 6.

Example 4: When the uplink data and the first request message are multiplexed in one message, the first network element sends the first request message and the information about the uplink data to the second network element based on the first request message and the uplink data. That the first network element sends the first request message and the information about the uplink data to the second network element based on the first request message and the uplink data includes: the first network element determines the information about the uplink data based on the first request message and the uplink data. The first network element sends the first request message and the information about the uplink data to the second network element.

The information about the uplink data may include at least one of the following: first indication information, second indication information, a data amount of the uplink data, the source LCID corresponding to the uplink data, and information about a quantity of logical channels corresponding to the uplink data.

The first indication information may indicate that the uplink data arrives at the first network element, the first indication information indicates that the uplink data is sent to the first network element by using the message 3 in the four-step random access procedure, the first indication information indicates that the uplink data is sent to the first network element by using the message A in the two-step random access procedure, or the first indication information indicates that the terminal initiates EDT, so that the second network element determines whether the first network device has received the uplink data. The information about the quantity of logical channels corresponding to the uplink data indicates the quantity of logical channels corresponding to the uplink data.

For descriptions of the second indication information, the data amount of the uplink data, and the source LCID corresponding to the uplink data, refer to the descriptions in step 302. Details are not described again.

Example 5: When the uplink data is encapsulated in the first request message, the first network element sends the first request message to the second network element based on the first request message. That the first network element sends the first request message and the information about the uplink data to the second network element based on the first request message includes: the first network element determines the information about the uplink data based on the first request message. The first network element sends the first request message and the information about the uplink data to the second network element.

The information about the uplink data may include at least one of the following: first indication information, fourth indication information, a data amount of the uplink data, the source LCID corresponding to the uplink data, and information about a quantity of logical channels corresponding to the uplink data.

For descriptions of the first indication information, the data amount of the uplink data, the source LCID corresponding to the uplink data, and the information about the quantity of logical channels corresponding to the uplink data, refer to the descriptions in the example 4. Details are not described again.

The fourth indication information may indicate that the uplink data is included in the first request message, so that the second network element determines that the context of the terminal that is required by the second network element is to include the source PDCP configuration.

Example 6: When the first network element does not receive the uplink data, the first network element sends the first request message and the information about the uplink data to the second network element based on the first request message. That the first network element sends the first request message and the information about the uplink data to the second network element based on the first request message includes: the first network element determines the information about the uplink data based on the first request message. The first network element sends the first request message and the information about the uplink data to the second network element.

The information about the uplink data includes fifth indication information. The fifth indication information may indicate that the uplink data does not arrive at the first network element, the fifth indication information indicates that the uplink data is not sent to the first network element by using the message 3 in the four-step random access procedure, the fifth indication information indicates that the uplink data is not sent to the first network element by using the message A in the two-step random access procedure, or the fifth indication information indicates that the terminal initiates non-EDT, so that the second network element determines whether the first network element has received the uplink data.

Optionally, the first network element further receives the buffer status report from the terminal. The buffer status report indicates a data amount of remaining uplink data. Information about the data amount of the remaining uplink data may be sent to the second network element together with the first request message and the information about the uplink data, or may be separately sent. This is not limited. For descriptions of the buffer status report and the information about the data amount of the remaining uplink data, refer to the descriptions in step 302. Details are not described again.

It should be noted that if the data amount of the remaining uplink data is greater than or equal to a second threshold, the first network element establishes an RRC connection to the terminal, so that the terminal sends the remaining uplink data to the first network element. For example, if the data amount of the remaining uplink data is greater than or equal to the second threshold, the first network element receives a first message from the second network element. The first message indicates the first network element to establish the RRC connection to the terminal.

Optionally, the first network element further receives the CG capability of the terminal from the terminal. In this case, the first network element further sends the CG capability of the terminal to the second network element, so that the second network element may determine, based on the CG capability of the terminal, whether to configure the CG for the terminal.

Step 603: The second network element receives the first request message and the information about the uplink data from the first network element, and sends a second request message to the second network device based on the first request message and the information about the uplink data.

The second request message may be for requesting the second network device to release the first data channel between the second network device and the core network device, or the second request message may be for requesting the second network device to send the context of the terminal to the second network element. The second request message includes the information about the uplink data. The second request message may be carried in a retrieve UE context request message. The core network device may be the core network device 106 in FIG. 1A. The first data channel is used by the second network device to forward, to the core network device, uplink data sent by the terminal, or the first data channel is used by the second network device to receive data that is from the core network device and that is to be sent to the terminal. In this case, the second network device is an anchor node of the terminal.

Optionally, the second request message is for requesting the second network device to release the first data channel between the second network device and the core network device, and the information about the uplink data is used by the second network device to determine whether to release the first data channel. Alternatively, the second request message is for requesting the second network device to send the context of the terminal to the second network element, and the information about the uplink data is used by the second network device to determine whether to send the context of the terminal to the second network element.

Optionally, the second network element further receives the information about the data amount of the remaining uplink data from the first network element. In this case, the second request message may further include the information about the data amount of the remaining uplink data.

It should be noted that, if the data amount of the remaining uplink data is greater than or equal to the second threshold, the second network element may indicate the first network element to establish the RRC connection to the terminal. For example, if the data amount of the remaining uplink data is greater than or equal to the second threshold, the second network element sends the first message to the first network element, where the first message indicates the first network element to establish the RRC connection to the terminal.

Optionally, the second network element further receives the CG capability of the terminal from the first network element. In this case, the second network element may determine, based on the CG capability of the terminal, whether to configure the CG for the terminal. In a possible implementation, if the CG capability of the terminal indicates that the terminal supports the CG, the second network element determines to configure the CG for the terminal.

Optionally, the second network element determines to configure the CG for the terminal, and the second request message may further include third indication information, where the third indication information indicates that the second network element has a capability of configuring the CG for the terminal.

Optionally, the second request message further includes the first identifier.

Step 604: The second network device receives the second request message from the second network element, and determines, based on the second request message, whether to release the first data channel between the second network device and the core network device or whether to send the context of the terminal to the second network element.

For descriptions of the second request message, refer to the descriptions in step 603. Details are not described again.

For a specific process in which the second network device determines, based on the second request message, whether to release the first data channel and a specific process in which the second network device determines, based on the second request message, whether to send the context of the terminal to the second network element, refer to the corresponding descriptions in step 303. Details are not described again. A difference lies in: after the second network device determines, based on the second request message, whether to release the first data channel, the second network device sends a first response message to the second network element; and after the second network device determines, based on the second request message, whether to send the context of the terminal to the second network element, the second network device sends a second response message to the second network element. For descriptions of the first response message and the second response message, refer to the corresponding descriptions in step 303. Details are not described again.

Correspondingly, the second network element receives the first response message from the second network device, or the second network element receives the second response message from the second network device.

It may be understood that a processing manner used after the second network element receives the first response message/the second response message varies with a function of the first response message/the second response message. Specifically, the processing manner used after the second network element receives the first response message/the second response message may be as follows:

Manner 1: The first response message indicates that the second network device releases the first data channel, and the second network element establishes a second data channel between the second network element and the core network device.

The second data channel is used by the second network element to forward, to the core network device, uplink data sent by the terminal, or the second data channel is used by the second network element to receive data that is from the core network device and that is to be sent to the terminal.

Optionally, after the second network element receives the first response message from the second network device, the second network element sends, to the first network element, indication information indicating a communication tunnel between the second network element and the first network element. The communication tunnel is for transmitting the uplink data. For example, the communication tunnel is a GTP tunnel. The communication tunnel may be a newly established communication tunnel, or may be a previously established communication tunnel. The indication information may include an IP address of the second network element, a tunnel endpoint identifier (TEID) of the communication tunnel, and the source LCID. The indication information may further include a source DRB identifier. The indication information may indicate one communication tunnel, or may indicate a plurality of communication tunnels. When the indication information indicates a plurality of communication tunnels, the second network element may receive, through all or a part of the communication tunnels, the uplink data sent by the first network element. The second network element may further determine a quantity of communication tunnels based on the quantity of logical channels corresponding to the uplink data or a quantity of logical channels in the context of the terminal.

Optionally, when the first response message includes the context of the terminal, the second network element may further send the source RLC configuration to the first network element, so that the first network element obtains, based on the source RLC configuration, the uplink data processed based on the source PDCP configuration. The RLC configuration may be a source RLC configuration corresponding to the source LCID. Subsequently, the second network element may receive, from the first network element through the communication tunnel, the uplink data processed based on the source PDCP configuration. After receiving the uplink data processed based on the source PDCP configuration, the second network element may obtain the uplink data based on the source PDCP configuration, and send the uplink data to the core network device through the second data channel. The second network element may further send an RRC release message to the terminal through the first network element, to suspend an RRC connection between the second network element and the terminal.

Manner 2: The first response message indicates that the second network device keeps the first data channel, and the second network element sends the uplink data to the second network device.

In a possible implementation, the second network element obtains the uplink data from the first network element. For example, the second network element sends, to the first network element, indication information indicating a communication tunnel between the second network element and the first network element, where the communication tunnel is for transmitting uplink data. The second network element receives the uplink data from the first network element through the communication tunnel. For descriptions of the indication information and the communication tunnel, refer to the descriptions in the manner 1.

Optionally, when the first response message includes the context of the terminal, the second network element may further send the source RLC configuration to the first network element, so that the first network element obtains, based on the source RLC configuration, the uplink data processed based on the source PDCP configuration. The RLC configuration may be a source RLC configuration corresponding to the source LCID. Subsequently, the second network element may receive, from the first network element through the communication tunnel, the uplink data processed based on the source PDCP configuration. After receiving the uplink data processed based on the source PDCP configuration, the second network element may obtain the uplink data based on the source PDCP configuration, and send the uplink data to the second network device through a communication tunnel between the second network element and the second network device. After receiving the uplink data, the second network device sends the uplink data to the core network device through the first data channel. Subsequently, the second network device may send an RRC release message to the terminal through the second network element and the first network element, where the RRC release message is for notifying that the terminal is in the RRC-inactive state or an RRC-idle state.

It should be noted that the uplink data sent by the first network element to the second network element may be uplink data that is received from the terminal and that is not processed by the first network element. After receiving the uplink data, the second network element may send the uplink data to the second network device. After receiving the uplink data, the second network device may process the uplink data based on the context of the terminal, and send processed uplink data to the core network device through the first data channel.

Manner 3: The second response message includes the source PDCP configuration, and the second network element obtains the uplink data based on the source PDCP configuration.

In a possible implementation, the second network element obtains the uplink data from the first network element. For example, the second network element sends, to the first network element, indication information indicating a communication tunnel between the second network element and the first network element, where the communication tunnel is for transmitting the uplink data. For descriptions of the indication information and the communication tunnel, refer to the descriptions in the manner 1. The second network element may receive, from the first network element through the communication tunnel, the uplink data processed based on the source PDCP configuration. After receiving the uplink data processed based on the source PDCP configuration, the second network element may obtain the uplink data based on the source PDCP configuration. Subsequently, the second network element may establish a second data channel with a core network, and send the uplink data to the core network device through the second data channel. Alternatively, the second network element sends the uplink data to the second network device, and the second network device sends the uplink data to the core network device through the first data channel after receiving the uplink data.

Manner 4: The second response message includes the source PDCP configuration and the source RLC configuration, and the second network element sends a second message to the first network element, where the second message includes the source RLC configuration, so that the first network element obtains, based on the source RLC configuration, the uplink data processed based on the source PDCP configuration. The second message may further include indication information indicating a communication tunnel between the second network element and the first network element, and the communication tunnel is for transmitting the uplink data. For descriptions of the indication information and the communication tunnel, refer to the descriptions in the manner 1. The second network element may receive, from the first network element through the communication tunnel, the uplink data processed based on the source PDCP configuration. After receiving the uplink data processed based on the source PDCP configuration, the second network element may obtain the uplink data based on the source PDCP configuration. Subsequently, the second network element may establish a second data channel with a core network, and send the uplink data to the core network device through the second data channel. Alternatively, the second network element sends the uplink data to the second network device, and the second network device sends the uplink data to the core network device through the first data channel after receiving the uplink data.

Manner 5: The second response message indicates that the second network device determines not to send the context of the terminal to the second network element, and the second network element sends a third message to the first network element. The third message indicates the first network element to delete the locally stored uplink data, the third message indicates the first network element to send, to the terminal, indication information indicating to send the uplink data again, or the third message indicates the first network element to send, to the second network element, the uplink data that is received from the terminal and that is not processed by the first network element. After receiving the uplink data, the second network element sends the uplink data to the second network device. After receiving the uplink data, the second network device may process the uplink data based on the context of the terminal, and send processed uplink data to the core network device through the first data channel.

It may be understood that if the second network element does not receive the second response message within a preset time period, the second network element may also send the third message to the first network element.

It should be noted that the second request message may alternatively be for requesting the second network device to release the first data channel and send the context of the terminal to the second network element. In this case, for a specific process in which the second network device determines, based on the second request message, whether to release the first data channel and whether to send the context of the terminal to the second network element, refer to the descriptions in the foregoing case in which the second request message is for requesting the second network device to release the first data channel and the foregoing case in which the second request message is for requesting the second network device to send the context of the terminal to the second network element. Details are not described again.

Based on the method shown in FIG. 6, after receiving the first request message from the terminal, the first network element may send the first request message and the information about the uplink data to the second network element based on the first request message. After receiving the first request message and the information about the uplink data, the second network element may send the second request message to the second network device, so that the second network device determines, based on the second request message, whether to release the first data channel or whether to send the context of the terminal to the second network element. In this way, the second network device may determine, based on the second request message, whether to release the first data channel or whether to send the context of the terminal to the second network element, to improve flexibility of processing the uplink data by the second network element and the second network device.

Figure 7:
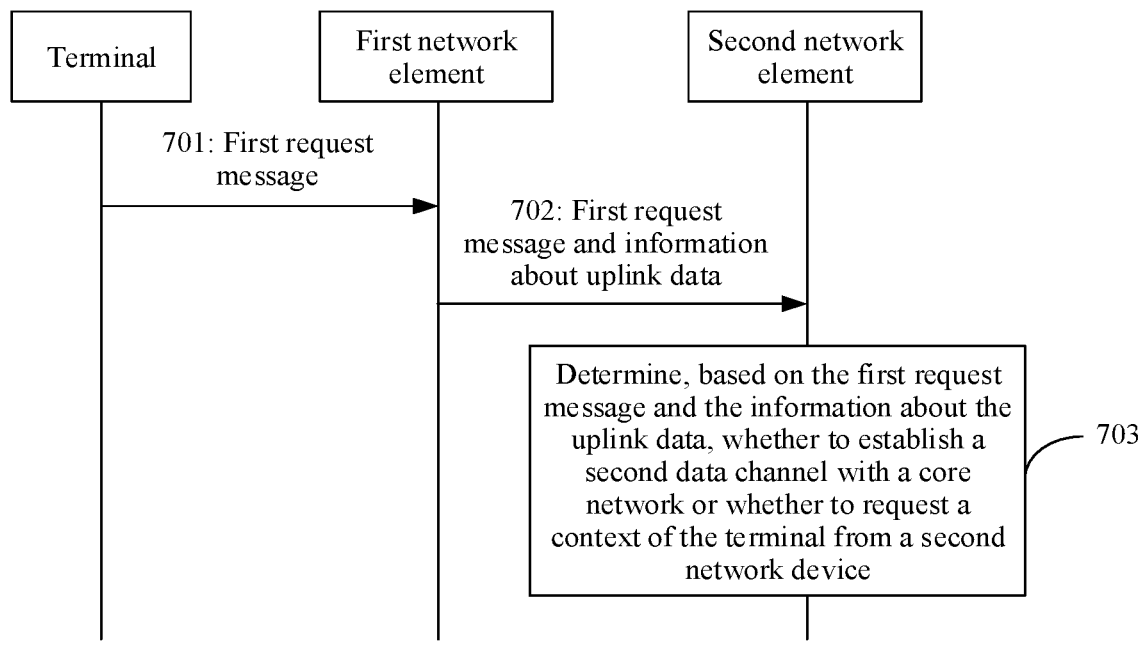
FIG. 7 is a fifth schematic flowchart of a communication method according to an embodiment of this application.

It may be understood that the first network device in the method shown in FIG. 4 or FIG. 5 may be in a CU-DU split architecture. When the first network device is in the CU-DU split architecture, an embodiment of this application provides a communication method, so that a CU of the first network device can determine whether to establish a second data channel with the core network device, or determine whether to request a context of the terminal from the second network device. Specifically, as shown in FIG. 7, the communication method includes step 701 to step 703.

Step 701: The terminal sends a first request message to a first network element.

Step 702: The first network element receives the first request message from the terminal, and sends the first request message and information about uplink data to a second network element based on the first request message.

For descriptions of step 701 and step 702, refer to the descriptions in step 601 and step 602. Details are not described again.

Step 703: The second network element receives the first request message and the information about the uplink data from the first network element, and determines, based on the first request message and the information about the uplink data, whether to establish the second data channel with a core network, or determines, based on the first request message and the information about the uplink data, whether to request the context of the terminal from the second network device.

The core network device may be the core network device 106 in FIG. 1A. The second data channel is used by the second network element to forward, to the core network device, uplink data sent by the terminal, or the second data channel is used by the second network element to receive data that is from the core network device and that is to be sent to the terminal.

Optionally, the second network element further receives information about a data amount of remaining uplink data from the first network element.

It should be noted that, if the data amount of the remaining uplink data is greater than or equal to a second threshold, the second network element may indicate the first network element to establish an RRC connection to the terminal. For example, if the data amount of the remaining uplink data is greater than or equal to the second threshold, the second network element sends a first message to the first network element, where the first message indicates the first network element to establish the RRC connection to the terminal.

Optionally, the second network element further receives a CG capability of the terminal from the first network element. In this case, the second network element may determine, based on the CG capability of the terminal, whether to configure a CG for the terminal. In a possible implementation, if the CG capability of the terminal indicates that the terminal supports the CG, the second network element determines to configure the CG for the terminal.

In conclusion, the second network element may determine, based on the first request message and the information about the uplink data, whether to establish the second data channel with the core network or whether to request the context of the terminal from the second network device. Alternatively, the second network element may determine, based on the first request message, the information about the uplink data, and the information about the data amount of the remaining uplink data, whether to establish the second data channel with the core network; or determine, based on the first request message, the information about the uplink data, and the data amount of the remaining uplink data, whether to request the context of the terminal from the second network device. Alternatively, the second network element may determine, based on the first request message, the information about the uplink data, and the CG capability of the terminal, whether to establish the second data channel with the core network or whether to request the context of the terminal from the second network device. Alternatively, the second network element may determine, based on the first request message, the information about the uplink data, the data amount of the remaining uplink data, and the CG capability of the terminal, whether to establish the second data channel with the core network or whether to request the context of the terminal from the second network device. Specifically, refer to the corresponding descriptions in step 402 in which the first network device determines whether to establish the second data channel with the core network device and the first network device determines whether to request the context of the terminal from the second network device. Details are not described again.

Based on the method shown in FIG. 7, after receiving the first request message from the terminal, the first network element may send the first request message and the information about the uplink data to the second network element based on the first request message. After receiving the first request message and the information about the uplink data, the second network element may determine, based on the first request message and the information about the uplink data, whether to establish the second data channel with the core network device or whether to request the context of the terminal from the second network device. In this way, flexibility of processing the uplink data by the second network element and the second network device is improved.

Figure 8:
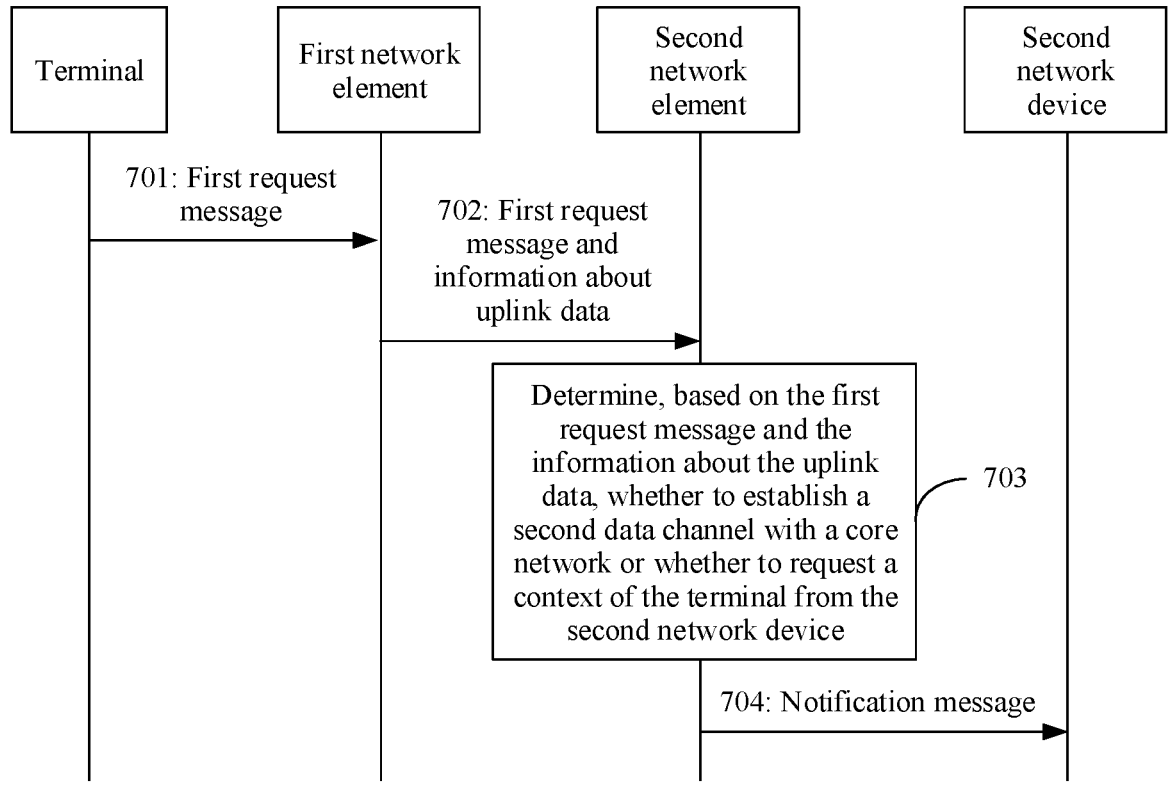
FIG. 8 is a sixth schematic flowchart of a communication method according to an embodiment of this application.

Further optionally, when the second network element determines to establish the second data channel with the core network device, when the second network element determines not to establish the second data channel with the core network device, or when the second network element determines to request the context of the terminal from the second network device, the second network element sends a communication message to the second network device. Specifically, as shown in FIG. 8, the method shown in FIG. 7 further includes step 704.

Step 704: The second network element sends a notification message to the second network device.

Functions of the notification message are different when the second network element determines to establish the second data channel with the core network device, when the second network element determines not to establish the second data channel with the core network device, and when the second network element determines to request the context of the terminal from the second network device. Specifically, the notification message is described as follows.

Case 12: The second network element determines to establish the second data channel with the core network device, and the notification message indicates the second network device to release a first data channel between the second network device and the core network device.

The first data channel is used by the second network device to forward, to the core network device, uplink data sent by the terminal, or the first data channel is used by the second network device to receive data that is from the core network device and that is to be sent to the terminal. In this case, the second network device is an anchor node of the terminal.

In this case, the second network element may further receive a response message from the second network device, where the response message may indicate that the second network device successfully releases the first data channel. The response message may include the context of the terminal, and the context of the terminal includes a source PDCP configuration and a source RLC configuration, so that the second network element obtains the uplink data and sends the uplink data to the core network device. It may be understood that after sending the context of the terminal to the second network element, the second network device releases the locally stored context of the terminal.

Optionally, the second network element further sends, to the first network element, indication information indicating a communication tunnel between the second network element and the first network element. The communication tunnel is for transmitting the uplink data. For example, the communication tunnel is a GTP tunnel. The communication tunnel may be a newly established communication tunnel, or may be a previously established communication tunnel. The indication information may include an IP address of the second network element, a TEID of the communication tunnel, and a source LCID. The indication information may further include a source DRB identifier. The indication information may indicate one communication tunnel, or may indicate a plurality of communication tunnels. When the indication information indicates a plurality of communication tunnels, the second network element may receive, through all or a part of the communication tunnels, the uplink data sent by the first network element. The second network element may further determine a quantity of communication tunnels based on a quantity of logical channels corresponding to the uplink data or a quantity of logical channels in the context of the terminal.

Optionally, when the response message may include the context of the terminal, the second network element may further send the source RLC configuration to the first network element, so that the first network element obtains, based on the source RLC configuration, uplink data processed based on the source PDCP configuration. The RLC configuration may be a source RLC configuration corresponding to the source LCID. Subsequently, the second network element may receive, from the first network element through the communication tunnel, the uplink data processed based on the source PDCP configuration. After receiving the uplink data processed based on the source PDCP configuration, the second network element may obtain the uplink data based on the source PDCP configuration, and send the uplink data to the core network device through the second data channel. The second network element may further send an RRC release message to the terminal through the first network element, to release an RRC connection between the second network element and the terminal.

Case 13: The second network element determines not to establish the second data channel with the core network device, and the notification message indicates the second network device to keep a first data channel between the second network device and the core network device.

The first data channel is used by the second network device to forward, to the core network device, uplink data sent by the terminal, or the first data channel is used by the second network device to receive data that is from the core network device and that is to be sent to the terminal. In this case, the second network device is an anchor node of the terminal.

In this case, the second network element may further receive a response message from the second network device, where the response message is for establishing a communication tunnel between the second network element and the second network device. The communication tunnel is for transmitting the uplink data. For example, the communication tunnel is an Xn GTP-U tunnel. There are one or more communication tunnels. There is a correspondence between the communication tunnel and a source LCID. When there is one communication tunnel, the communication tunnel corresponds to one or more source LCIDs. When there are a plurality of communication tunnels, each of the plurality of communication tunnels corresponds to one or more source LCIDs. Different communication tunnels may correspond to a same source LCID or different source LCIDs. The correspondence may be preconfigured in the second network device. It should be noted that, because there is the correspondence between the communication tunnel and the source LCID, the second network device can establish the communication tunnel only when knowing the source LCID. For example, when the information about the uplink data includes the source LCID corresponding to the uplink data, the response message is further for establishing the communication tunnel.

In a possible implementation, the response message includes an identifier of the communication tunnel, and there is a correspondence between the identifier of the communication tunnel and the source LCID.

In another possible implementation, the response message includes an address of the communication tunnel, and there is a correspondence between the address of the communication tunnel and the source LCID.

Optionally, the response message further includes the context of the terminal. The context of the terminal includes a source PDCP configuration and a source RLC configuration.

In this case, after the second network element receives the response message from the second network device, the second network element sends the uplink data to the second network device. Optionally, the second network element obtains the uplink data from the first network element. For example, the second network element sends, to the first network element, indication information indicating a communication tunnel between the second network element and the first network element, where the communication tunnel is for transmitting the uplink data. For descriptions of the indication information and the communication tunnel, refer to the descriptions in the case 12. When the response message includes the context of the terminal, the second network element may further send the source RLC configuration to the first network element, so that the first network element obtains, based on the source RLC configuration, uplink data processed based on the source PDCP configuration. The RLC configuration may be a source RLC configuration corresponding to the source LCID. Subsequently, the second network element may receive, from the first network element through the communication tunnel between the second network element and the first network element, uplink data processed based on the source PDCP configuration. After receiving the uplink data processed based on the source PDCP configuration, the second network element may obtain the uplink data based on the source PDCP configuration, and send the uplink data to the second network device through the communication tunnel between the second network element and the second network device. After receiving the uplink data, the second network device sends the uplink data to the core network device through the first data channel. Subsequently, the second network device may send an RRC release message to the terminal through the second network element and the first network element, where the RRC release message is for notifying that the terminal is in an RRC-inactive state or an RRC-idle state.

It should be noted that the uplink data sent by the first network element to the second network element may be uplink data that is received from the terminal and that is not processed by the first network element. After receiving the uplink data, the second network element may send the uplink data to the second network device. After receiving the uplink data, the second network device may process the uplink data based on the context of the terminal, and send processed uplink data to the core network device through the first data channel.

It may be understood that the uplink data may alternatively be sent to the second network device via the notification message.

Case 14: The second network element determines to request the context of the terminal from the second network device, and the notification message indicates the second network device to send the context of the terminal to the second network element. The notification message includes a first identifier, so that the second network device determines the context of the terminal based on the first identifier.

In this case, the second network element may further receive a response message from the second network device. The response message includes the context of the terminal. Subsequently, the second network element and the first network element may obtain the uplink data based on the context of the terminal.

Optionally, the context of the terminal includes a source PDCP configuration, or the context of the terminal includes a source PDCP configuration and a source RLC configuration.

In a possible implementation, the context of the terminal includes the source PDCP configuration, and the second network element obtains the uplink data from the first network element. For example, the second network element sends, to the first network element, indication information indicating a communication tunnel between the second network element and the first network element, where the communication tunnel is for transmitting the uplink data. For descriptions of the indication information and the communication tunnel, refer to the descriptions in the case 12. The second network element may receive, from the first network element through the communication tunnel, uplink data processed based on the source PDCP configuration. After receiving the uplink data processed based on the source PDCP configuration, the second network element may obtain the uplink data based on the source PDCP configuration.

In another possible implementation, the context of the terminal includes the source PDCP configuration and the source RLC configuration, and the second network element sends a second message to the first network element, where the second message includes the source RLC configuration, so that the first network element obtains, based on the source RLC configuration, uplink data processed based on the source PDCP configuration. The second message may further include indication information indicating a communication tunnel between the second network element and the first network element, and the communication tunnel is for transmitting the uplink data. For descriptions of the indication information and the communication tunnel, refer to the descriptions in the case 12. The second network element may receive, from the first network element through the communication tunnel, the uplink data processed based on the source PDCP configuration. After receiving the uplink data processed based on the source PDCP configuration, the second network element may obtain the uplink data based on the source PDCP configuration.

Optionally, if the second network element does not receive the response message within a preset time period or the response message received by the second network element does not include the context of the terminal, the second network element sends a third message to the first network element. The third message indicates the first network element to delete the locally stored uplink data, the third message indicates the first network element to send, to the terminal, indication information indicating to send the uplink data again, or the third message indicates the first network element to send, to the second network element, the uplink data that is received from the terminal and that is not processed by the first network element. After receiving the uplink data, the second network element sends the uplink data to the second network device. After receiving the uplink data, the second network device may process the uplink data based on the context of the terminal, and send processed uplink data to the core network device through the first data channel.

It may be understood that if the second network element determines not to request the context of the terminal from the second network device, the second network element may also send the third message to the first network element.

It may be understood that if the notification message indicates the second network device to send the context of the terminal to the second network element, the second network device may release the first data channel.

Optionally, the response messages in the foregoing three cases further include at least one of the CG capability of the terminal, traffic model information, or CG configuration information that is of the terminal when the terminal is served by the second network device. For descriptions of the CG capability of the terminal, the traffic model information, or the CG configuration information that is of the terminal when the terminal is served by the second network device, refer to the descriptions in step 303. Details are not described again. Subsequently, the second network element may determine, based on the CG capability of the terminal, whether to configure the CG for the terminal. When determining to configure the CG for the terminal, the second network element may configure the CG for the terminal with reference to the CG configuration information that is of the terminal when the terminal is served by the second network device. The second network element may determine a possible data arrival periodicity of the terminal, a possible transport block size of the uplink data of the terminal, or a possible arrival timing of the terminal based on the traffic model information.

Based on the method shown in FIG. 8, when the second network element determines to establish the second data channel with the core network device, when the second network element determines not to establish the second data channel with the core network device, or when the second network element determines to request the context of the terminal from the second network device, the second network element sends the communication message to the second network device, to notify the second network device to release the first data channel, notify the second network device to keep the first data channel, or notify the second network device to send the context of the terminal to the second network element.

The foregoing mainly describes, from the perspective of interaction between the network elements, the solutions provided in embodiments of this application. It may be understood that, to implement the foregoing functions, the first network device, the second network device, the first network element, or the second network element includes a hardware structure and/or a software module for performing a corresponding function. A person skilled in the art should be easily aware that, in combination with units and algorithm operations of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first network device, the second network device, the first network element, or the second network element may be divided into functional modules based on the foregoing method examples. For example, each functional module may be obtained through division based on a corresponding function, or two or more functions may be integrated into one processing module. The integrated module may be implemented by hardware, or may be implemented by a software functional module. It should be noted that, in embodiments of this application, division into modules is an example, and is merely a logical function division. During actual implementation, another division manner may be used.

Figure 9:
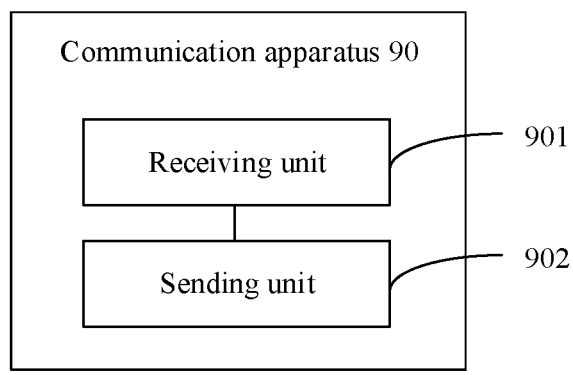
FIG. 9 is a first schematic diagram of a structure of a communication apparatus according to an embodiment of this application.

For example, when each functional module is obtained through division in an integrated manner, FIG. 9 is a schematic diagram of a structure of a communication apparatus 90. The communication apparatus 90 may be a first network device, a chip or a system-on-a-chip in the first network device, or another combined part, component, or the like that can implement a function of the first network device. The communication apparatus 90 may be configured to perform the function of the first network device in the foregoing embodiments.

In a possible implementation, the communication apparatus 90 shown in FIG. 9 includes a receiving unit 901 and a sending unit 902.

The receiving unit 901 is configured to receive a first request message and uplink data from a terminal, where the first request message is for requesting to resume a suspended radio resource control (RRC) connection.

The sending unit 902 is configured to send a second request message to a second network device based on the first request message and the uplink data, where the second network device is a network device previously serving the terminal, and the second request message includes information about the uplink data.

The second request message is for requesting the second network device to release a first data channel between the second network device and a core network device, or the second request message is for requesting the second network device to send a context of the terminal to the communication apparatus 90.

Optionally, the second request message is for requesting the second network device to release the first data channel between the second network device and the core network device, and the information about the uplink data is used by the second network device to determine whether to release the first data channel. Alternatively, the second request message is for requesting the second network device to send the context of the terminal to the communication apparatus 90, and the information about the uplink data is used by the second network device to determine whether to send the context of the terminal to the communication apparatus 90.

Optionally, the information about the uplink data includes at least one of the following: first indication information, second indication information, a data amount of the uplink data, or a source logical channel identifier corresponding to the uplink data, where the first indication information indicates that the uplink data arrives at the communication apparatus 90, and the second indication information indicates that the uplink data is not included in the first request message.

Optionally, the receiving unit 901 is further configured to receive a buffer status report from the terminal, where the buffer status report indicates a data amount of remaining uplink data, and the second request message further includes information about the data amount of the remaining uplink data.

Optionally, the second request message further includes third indication information, where the third indication information indicates that the communication apparatus 90 has a capability of configuring a grant for the terminal.

Optionally, the second request message is for requesting the second network device to release the first data channel between the second network device and the core network device. The receiving unit 901 is further configured to receive a first response message from the second network device, where if the data amount of the uplink data is greater than or equal to a first threshold, the first response message indicates that the second network device releases the first data channel; or if the data amount of the uplink data is less than or equal to a first threshold, the first response message indicates that the second network device keeps the first data channel.

Optionally, the second request message is for requesting the second network device to release the first data channel between the second network device and the core network device. The receiving unit 901 is further configured to receive a first response message from the second network device, where if the data amount of the remaining uplink data is greater than or equal to a second threshold, the first response message indicates that the second network device releases the first data channel; or if the data amount of the remaining uplink data is less than or equal to a second threshold, the first response message indicates that the second network device keeps the first data channel.

Optionally, the second request message is for requesting the second network device to release the first data channel between the second network device and the core network device. The receiving unit 901 is further configured to receive a first response message from the second network device, where the first response message indicates that the second network device releases the first data channel, or the first response message indicates that the second network device keeps the first data channel.

Optionally, the first request message includes a configured grant capability of the terminal, or the first response message includes a configured grant capability of the terminal.

Optionally, the first response message further includes traffic model information, and the traffic model information indicates at least one of the following parameters: a data arrival periodicity that is of the terminal and that is evaluated by the second network device, a transport block size that is of the uplink data and that is evaluated by the second network device, or an arrival timing that is of the terminal and that is evaluated by the second network device.

Optionally, the first response message is further for establishing a communication tunnel between the communication apparatus 90 and the second network device, the communication tunnel is for transmitting the uplink data, and there is a correspondence between the communication tunnel and the source logical channel identifier.

Figure 10:
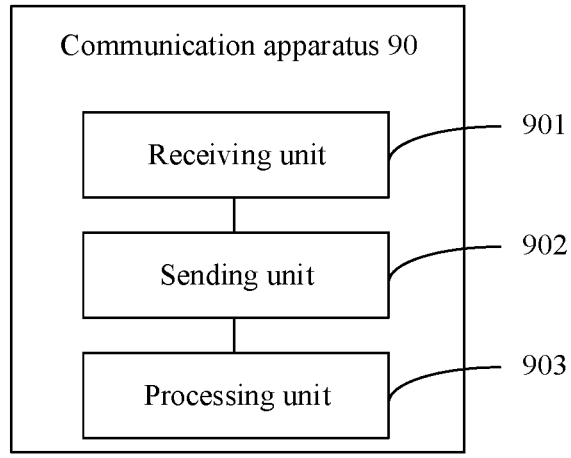
FIG. 10 is a second schematic diagram of a structure of a communication apparatus according to an embodiment of this application.

Optionally, as shown in FIG. 10, the communication apparatus 90 further includes a processing unit 903. If the data amount of the remaining uplink data is greater than or equal to the second threshold, the processing unit 903 is configured to establish an RRC connection to the terminal.

Optionally, the second request message is for requesting the second network device to send the context of the terminal to the communication apparatus 90. The receiving unit 901 is further configured to receive a second response message from the second network device, where the second response message includes a source packet data convergence protocol configuration and a source radio link control configuration.

Optionally, the first request message includes a configured grant capability of the terminal, or the second response message further includes a configured grant capability of the terminal.

Optionally, the second response message further includes traffic model information, and the traffic model information indicates at least one of the following parameters: a data arrival periodicity that is of the terminal and that is evaluated by the second network device, a transport block size that is of the uplink data and that is evaluated by the second network device, or an arrival timing that is of the terminal and that is evaluated by the second network device.

Optionally, the second response message further indicates to establish a communication tunnel between the communication apparatus 90 and the second network device, the communication tunnel is for transmitting the uplink data, and there is a correspondence between an identifier of the communication tunnel and the source logical channel identifier.

Optionally, the first request message and the uplink data are multiplexed in one message.

All related content of the operations in the foregoing method embodiments may be cited in function descriptions of the corresponding functional modules. Details are not described herein again.

In this embodiment, the communication apparatus 90 is presented in a form of functional modules obtained through division in the integrated manner. The "module" herein may be a specific ASIC, a circuit, a processor and a memory that execute one or more software or firmware programs, an integrated logic circuit, and/or another component that can provide the foregoing function. In a simple embodiment, a person skilled in the art may figure out that the communication apparatus 90 may be in a form shown in FIG. 2.

For example, the processor 201 in FIG. 2 may invoke the computer-executable instructions stored in the memory 203, to enable the communication apparatus 90 to perform the communication method in the foregoing method embodiments.

For example, the functions/implementation processes of the receiving unit 901, the sending unit 902, and the processing unit 903 in FIG. 10 may be implemented by the processor 201 in FIG. 2 by invoking the computer-executable instructions stored in the memory 203. Alternatively, the function/implementation process of the processing unit 903 in FIG. 10 may be implemented by the processor 201 in FIG. 2 by invoking the computer-executable instructions stored in the memory 203, and the functions/implementation processes of the receiving unit 901 and the sending unit 902 in FIG. 10 may be implemented by the communication interface 204 in FIG. 2.

The communication apparatus 90 provided in this embodiment can perform the foregoing communication method. Therefore, for technical effects that can be achieved by the communication apparatus 90, refer to the foregoing method embodiments. Details are not described herein again.

Figure 11:
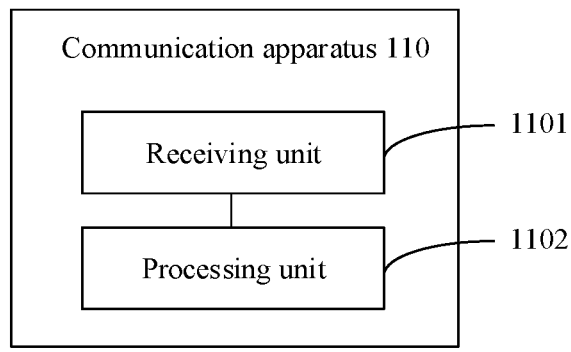
FIG. 11 is a third schematic diagram of a structure of a communication apparatus according to an embodiment of this application.

For example, when each functional module is obtained through division in an integrated manner, FIG. 11 is a schematic diagram of a structure of a communication apparatus 110. The communication apparatus 110 may be a second network device, a chip or a system-on-a-chip in the second network device, or another combined part, component, or the like that can implement a function of the second network device. The communication apparatus 110 may be configured to perform the function of the second network device in the foregoing embodiments.

In a possible implementation, the communication apparatus 110 shown in FIG. 11 includes a receiving unit 1101 and a processing unit 1102.

The receiving unit 1101 is configured to receive a second request message from a first network device, where the second request message includes information about uplink data, the second request message is for requesting the communication apparatus 110 to release a first data channel between the communication apparatus 110 and a core network device, and the communication apparatus 110 is a network device previously serving a terminal. The processing unit 1102 is configured to release the first data channel based on the second request message.

Alternatively, the receiving unit 1101 is configured to receive a second request message from a first network device, where the second request message includes information about uplink data, the second request message is for requesting the communication apparatus 110 to send a context of a terminal to the first network device, and the communication apparatus 110 is a network device previously serving the terminal. The processing unit 1102 is configured to send the context of the terminal to the first network device based on the second request message.

Optionally, the information about the uplink data includes at least one of the following: first indication information, second indication information, a data amount of the uplink data, or a source logical channel identifier corresponding to the uplink data, where the first indication information indicates that the uplink data arrives at the first network device, the second indication information indicates that the uplink data is not included in a first request message, and the first request message is used by the terminal to request the first network device to resume a suspended radio resource control RRC connection.

Optionally, the second request message further includes information about a data amount of remaining uplink data.

Optionally, the second request message further includes third indication information, where the third indication information indicates that the first network device has a capability of configuring a grant for the terminal.

Figure 12:
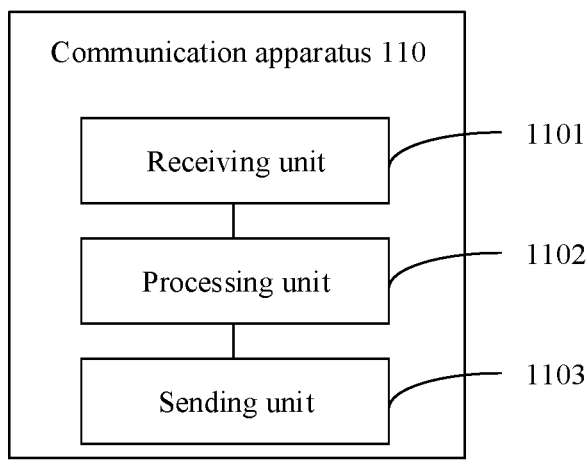
FIG. 12 is a fourth schematic diagram of a structure of a communication apparatus according to an embodiment of this application.

Optionally, as shown in FIG. 12, the communication apparatus 110 further includes a sending unit 1103. The second request message is for requesting the communication apparatus 110 to release the first data channel between the communication apparatus 110 and the core network device. The sending unit 1103 is configured to send a first response message to the first network device, where if the data amount of the uplink data is greater than or equal to a first threshold, the first response message indicates that the communication apparatus 110 releases the first data channel; or if the data amount of the uplink data is less than or equal to a first threshold, the first response message indicates that the communication apparatus 110 keeps the first data channel.

Optionally, the second request message is for requesting the communication apparatus 110 to release the first data channel between the communication apparatus 110 and the core network device. The sending unit 1103 is configured to send a first response message to the first network device, where if the data amount of the remaining uplink data is greater than or equal to a second threshold, the first response message indicates that the communication apparatus 110 releases the first data channel; or if the data amount of the remaining uplink data is less than or equal to a second threshold, the first response message indicates that the communication apparatus 110 keeps the first data channel.

Optionally, the second request message is for requesting the communication apparatus 110 to release the first data channel between the communication apparatus 110 and the core network device, and the sending unit 1103 is configured to send a first response message to the first network device, where the first response message indicates that the communication apparatus 110 releases the first data channel, or the first response message indicates that the communication apparatus 110 keeps the first data channel.

Optionally, the first request message includes a configured grant capability of the terminal, or the first response message includes a configured grant capability of the terminal.

Optionally, the first response message further includes traffic model information, and the traffic model information indicates at least one of the following parameters: a data arrival periodicity that is of the terminal and that is evaluated by the communication apparatus 110, a transport block size that is of the uplink data and that is evaluated by the communication apparatus 110, or an arrival timing that is of the terminal and that is evaluated by the communication apparatus 110.

Optionally, the first response message is further for establishing a communication tunnel between the first network device and the communication apparatus 110, the communication tunnel is for transmitting the uplink data, and there is a correspondence between an identifier of the communication tunnel and the source logical channel identifier.

Optionally, the second request message is for requesting the communication apparatus 110 to send the context of the terminal to the first network device, and the sending unit 1103 is configured to send a second response message to the first network device, where the second response message includes a source packet data convergence protocol configuration and a source radio link control configuration.

Optionally, the first request message includes a configured grant capability of the terminal, or the second response message further includes a configured grant capability of the terminal.

Optionally, the second response message further includes traffic model information, and the traffic model information indicates at least one of the following parameters: a data arrival periodicity that is of the terminal and that is evaluated by the communication apparatus 110, a transport block size that is of the uplink data and that is evaluated by the communication apparatus 110, or an arrival timing that is of the terminal and that is evaluated by the communication apparatus 110.

Optionally, the second response message is further for establishing a communication tunnel between the first network device and the communication apparatus 110, the communication tunnel is for transmitting the uplink data, and there is a correspondence between an identifier of the communication tunnel and the source logical channel identifier.

Optionally, the first request message and the uplink data are multiplexed in one message.

All related content of the operations in the foregoing method embodiments may be cited in function descriptions of the corresponding functional modules. Details are not described herein again.

In this embodiment, the communication apparatus 110 is presented in a form of functional modules obtained through division in the integrated manner. The "module" herein may be a specific ASIC, a circuit, a processor and a memory that execute one or more software or firmware programs, an integrated logic circuit, and/or another component that can provide the foregoing function. In a simple embodiment, a person skilled in the art may figure out that the communication apparatus 110 may be in a form shown in FIG. 2.

For example, the processor 201 in FIG. 2 may invoke the computer-executable instructions stored in the memory 203, to enable the communication apparatus 110 to perform the communication method in the foregoing method embodiments.

For example, the functions/implementation processes of the receiving unit 1101, the processing unit 1102, and the sending unit 1103 in FIG. 12 may be implemented by the processor 201 in FIG. 2 by invoking the computer-executable instructions stored in the memory 203. Alternatively, the function/implementation process of the processing unit 1102 in FIG. 12 may be implemented by the processor 201 in FIG. 2 by invoking the computer-executable instructions stored in the memory 203, and the functions/implementation processes of the receiving unit 1101 and the sending unit 1103 in FIG. 12 may be implemented by the communication interface 204 in FIG. 2.

The communication apparatus 110 provided in this embodiment can perform the foregoing communication method. Therefore, for technical effects that can be achieved by the communication apparatus 110, refer to the foregoing method embodiments. Details are not described herein again.

Figure 13:
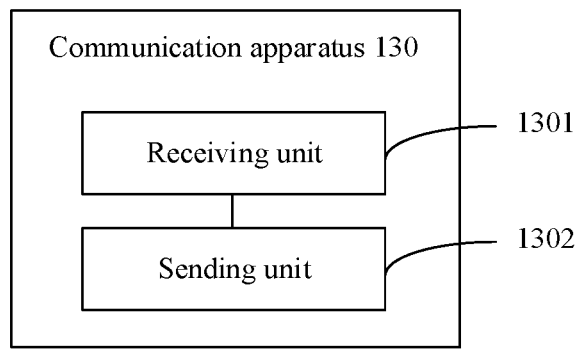
FIG. 13 is a fifth schematic diagram of a structure of a communication apparatus according to an embodiment of this application.

For example, when each functional module is obtained through division in an integrated manner, FIG. 13 is a schematic diagram of a structure of a communication apparatus 130. The communication apparatus 130 may be a first network element, a chip or a system-on-a-chip in the first network element, or another combined part, component, or the like that can implement a function of the first network element. The communication apparatus 130 may be configured to perform the function of the first network element in the foregoing embodiments.

In a possible implementation, the communication apparatus 130 shown in FIG. 13 includes a receiving unit 1301 and a sending unit 1302.

The receiving unit 1301 is configured to receive a first request message and uplink data from a terminal, where the first request message is for requesting to resume a suspended radio resource control (RRC) connection.

The sending unit 1302 is configured to send the first request message and information about the uplink data to a second network element based on the first request message and the uplink data.

Optionally, the information about the uplink data includes at least one of the following: first indication information, second indication information, a data amount of the uplink data, or a source logical channel identifier corresponding to the uplink data, where the first indication information indicates that the uplink data arrives at the communication apparatus 130, and the second indication information indicates that the uplink data is not included in the first request message.

Optionally, the receiving unit 1301 is further configured to receive a buffer status report from the terminal, where the buffer status report indicates a data amount of remaining uplink data. The sending unit 1302 is further configured to send information about the data amount of the remaining uplink data to the second network element.

Optionally, if the data amount of the remaining uplink data is greater than or equal to a threshold, the receiving unit 1301 is further configured to receive a first message from the second network element, where the first message indicates the communication apparatus 130 to establish an RRC connection to the terminal.

Optionally, the receiving unit 1301 is further configured to receive a second message from the second network element, where the second message includes a source radio link control configuration.

Optionally, the second message further includes indication information indicating a communication tunnel between the second network element and the communication apparatus 130, and the communication tunnel is for transmitting the uplink data.

Figure 14:
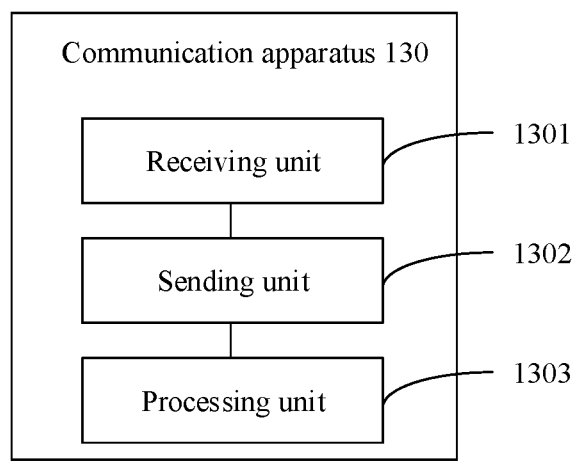
FIG. 14 is a sixth schematic diagram of a structure of a communication apparatus according to an embodiment of this application.

Optionally, as shown in FIG. 14, the communication apparatus 130 further includes a processing unit 1303. The receiving unit 1301 is further configured to receive a third message from the second network element, where the third message indicates the communication apparatus 130 to delete the uplink data. The processing unit 1303 is configured to delete the uplink data based on the third message.

Optionally, the first request message and the uplink data are multiplexed in one message.

All related content of the operations in the foregoing method embodiments may be cited in function descriptions of the corresponding functional modules. Details are not described herein again.

In this embodiment, the communication apparatus 130 is presented in a form of functional modules obtained through division in the integrated manner. The "module" herein may be a specific ASIC, a circuit, a processor and a memory that execute one or more software or firmware programs, an integrated logic circuit, and/or another component that can provide the foregoing function. In a simple embodiment, a person skilled in the art may figure out that the communication apparatus 130 may be in a form shown in FIG. 2.

For example, the processor 201 in FIG. 2 may invoke the computer-executable instructions stored in the memory 203, to enable the communication apparatus 130 to perform the communication method in the foregoing method embodiments.

For example, the functions/implementation processes of the receiving unit 1301, the sending unit 1302, and the processing unit 1303 in FIG. 14 may be implemented by the processor 201 in FIG. 2 by invoking the computer-executable instructions stored in the memory 203. Alternatively, the function/implementation process of the processing unit 1303 in FIG. 14 may be implemented by the processor 201 in FIG. 2 by invoking the computer-executable instructions stored in the memory 203, and the functions/implementation processes of the receiving unit 1301 and the sending unit 1302 in FIG. 14 may be implemented by the communication interface 204 in FIG. 2.

The communication apparatus 130 provided in this embodiment can perform the foregoing communication method. Therefore, for technical effects that can be achieved by the communication apparatus 130, refer to the foregoing method embodiments. Details are not described herein again.

Figure 15:
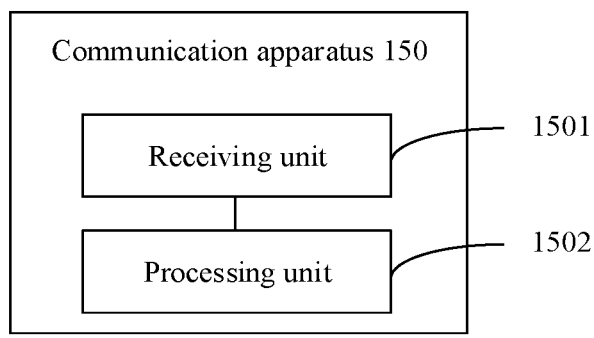
FIG. 15 is a seventh schematic diagram of a structure of a communication apparatus according to an embodiment of this application.

For example, when each functional module is obtained through division in an integrated manner, FIG. 15 is a schematic diagram of a structure of a communication apparatus 150. The communication apparatus 150 may be a second network element, a chip or a system-on-a-chip in the second network element, or another combined part, component, or the like that can implement a function of the second network element. The communication apparatus 150 may be configured to perform the function of the second network element in the foregoing embodiments.

In a possible implementation, the communication apparatus 150 shown in FIG. 15 includes a receiving unit 1501 and a processing unit 1502.

The receiving unit 1501 is configured to receive a first request message and information about uplink data from a first network element.

The processing unit 1502 is configured to obtain a context of a terminal based on the first request message and the information about the uplink data.

Optionally, the information about the uplink data includes at least one of the following: first indication information, second indication information, a data amount of the uplink data, or a source logical channel identifier corresponding to the uplink data, where the first indication information indicates that the uplink data arrives at the first network element, and the second indication information indicates that the uplink data is not included in the first request message.

Optionally, the receiving unit 1501 is further configured to receive information about a data amount of remaining uplink data from the first network element, where the information about the data amount of the remaining uplink data indicates the data amount of the remaining uplink data.

Figure 16:
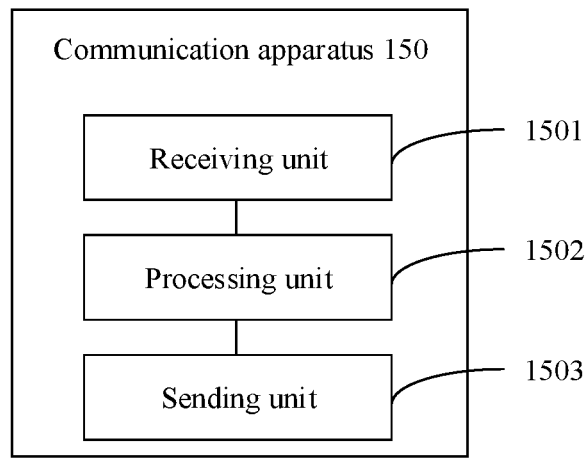
FIG. 16 is an eighth schematic diagram of a structure of a communication apparatus according to an embodiment of this application.

Optionally, as shown in FIG. 16, the communication apparatus 150 further includes a sending unit 1503. The sending unit 1503 is configured to: if the data amount of the remaining uplink data is greater than or equal to a threshold, send a first message to the first network element, where the first message indicates the first network element to establish a radio resource control RRC connection to the terminal.

Optionally, the context of the terminal includes a source packet data convergence protocol configuration and a source radio link control configuration.

Optionally, the sending unit 1503 is further configured to send a second message to the first network element, where the second message includes the source radio link control configuration in the context of the terminal.

Optionally, the second message further includes indication information indicating a communication tunnel between the communication apparatus 150 and the first network element, and the communication tunnel is for transmitting the uplink data.

Optionally, the communication apparatus 150 does not obtain the context of the terminal, and the sending unit 1503 is further configured to send a third message to the first network element, where the third message indicates the first network element to delete the uplink data.

Optionally, the first request message and the uplink data are multiplexed in one message.

All related content of the operations in the foregoing method embodiments may be cited in function descriptions of the corresponding functional modules. Details are not described herein again.

In this embodiment, the communication apparatus 150 is presented in a form of functional modules obtained through division in the integrated manner. The "module" herein may be a specific ASIC, a circuit, a processor and a memory that execute one or more software or firmware programs, an integrated logic circuit, and/or another component that can provide the foregoing function. In a simple embodiment, a person skilled in the art may figure out that the communication apparatus 150 may be in a form shown in FIG. 2.

For example, the processor 201 in FIG. 2 may invoke the computer-executable instructions stored in the memory 203, to enable the communication apparatus 150 to perform the communication method in the foregoing method embodiments.

For example, the functions/implementation processes of the receiving unit 1501, the processing unit 1502, and the sending unit 1503 in FIG. 16 may be implemented by the processor 201 in FIG. 2 by invoking the computer-executable instructions stored in the memory 203. Alternatively, the function/implementation process of the processing unit 1502 in FIG. 16 may be implemented by the processor 201 in FIG. 2 by invoking the computer-executable instructions stored in the memory 203, and the functions/implementation processes of the receiving unit 1501 and the sending unit 1503 in FIG. 16 may be implemented by the communication interface 204 in FIG. 2.

The communication apparatus 150 provided in this embodiment can perform the foregoing communication method. Therefore, for technical effects that can be achieved by the communication apparatus 150, refer to the foregoing method embodiments. Details are not described herein again.

Figure 17:
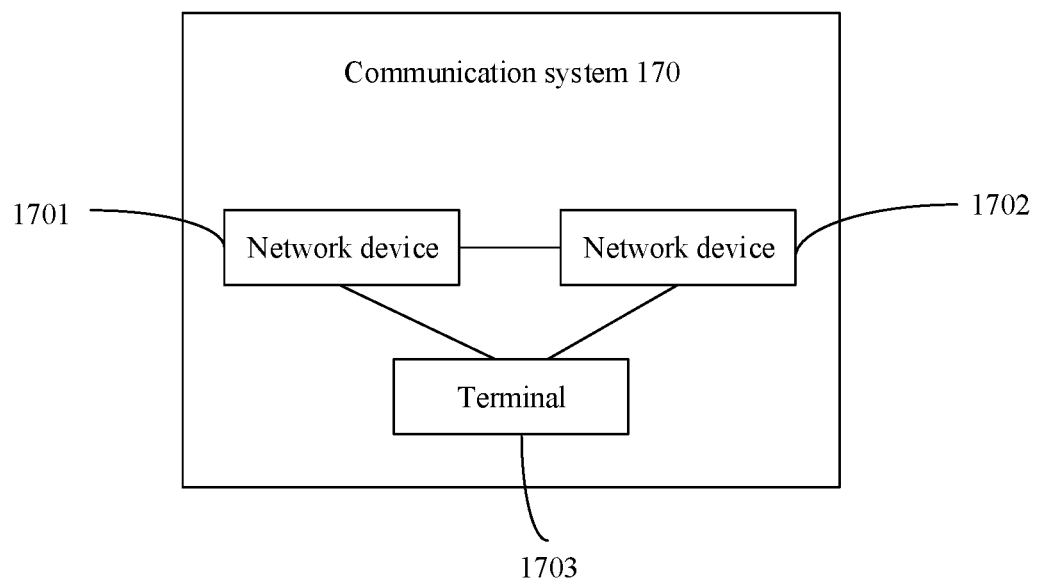
FIG. 17 is a first schematic composition diagram of a communication system according to an embodiment of this application.

FIG. 17 is a schematic composition diagram of a communication system. As shown in FIG. 17, the communication system 170 may include a network device 1701, a network device 1702, and a terminal 1703. It should be noted that FIG. 17 is merely an example of an accompanying drawing. Network elements included in the communication system 170 shown in FIG. 17 and a quantity of network elements are not limited in this embodiment of this application.

The network device 1701 has a function of the communication apparatus 90 shown in FIG. 9 or FIG. 10, and may be configured to: receive a first request message and uplink data from the terminal 1703, and send a second request message to the network device 1702 based on the first request message and the uplink data.

The network device 1702 has a function of the communication apparatus 110 shown in FIG. 11 or FIG. 12; and may receive the second request message from the network device 1701, and release a first data channel based on the second request message; or may receive the second request message from the network device 1701, and send a context of the terminal 1703 to the network device 1701 based on the second request message.

The terminal 1703 may be configured to send the first request message and the uplink data to the network device 1701.

It should be noted that all related content of the steps in the foregoing method embodiments may be cited in function descriptions of the corresponding network elements in the communication system 170. Details are not described herein again.

Figure 18:
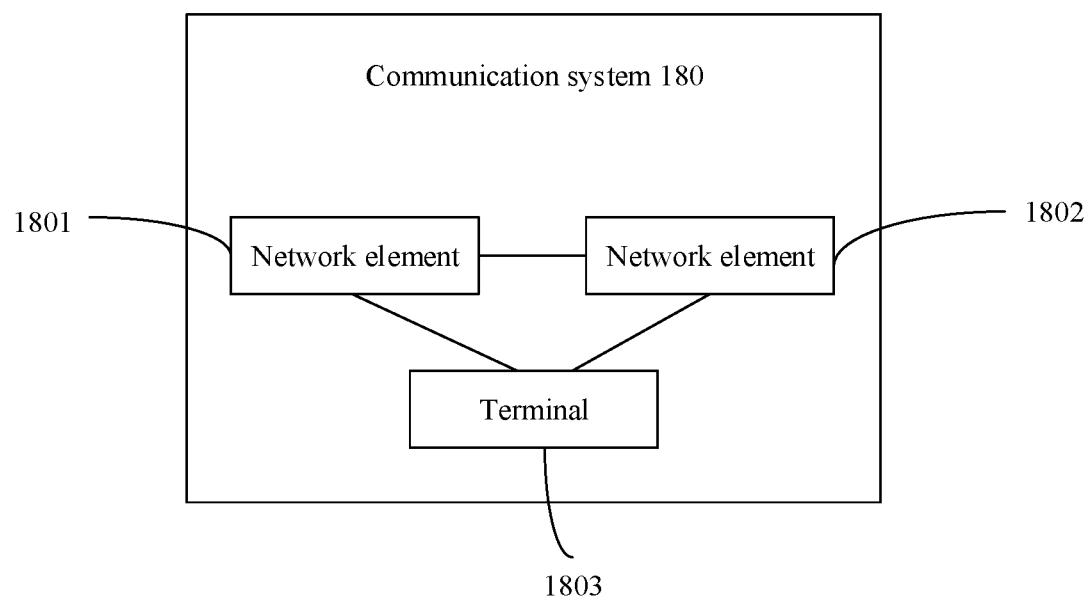
FIG. 18 is a second schematic composition diagram of a communication system according to an embodiment of this application.

FIG. 18 is a schematic composition diagram of a communication system. As shown in FIG. 18, the communication system 180 may include a network element 1801, a network element 1802, and a terminal 1803. It should be noted that FIG. 18 is merely an example of an accompanying drawing. Network elements included in the communication system 180 shown in FIG. 18 and a quantity of network elements are not limited in this embodiment of this application.

The network element 1801 has a function of the communication apparatus 130 shown in FIG. 13 or FIG. 14; and may receive a first request message and uplink data from the terminal 1803, and send the first request message and information about the uplink data to the network element 1802 based on the first request message and the uplink data.

The network element 1802 has a function of the communication apparatus 150 shown in FIG. 15 or FIG. 16; and may receive the first request message and the information about the uplink data from the network element 1801, and obtain a context of the terminal 1803 based on the first request message and the information about the uplink data.

The terminal 1803 may be configured to send the first request message and the uplink data to the network element 1801.

It should be noted that all related content of the steps in the foregoing method embodiments may be cited in function descriptions of the corresponding network elements in the communication system 180. Details are not described herein again.

All or some of the foregoing embodiments may be implemented by software, hardware, firmware, or any combination thereof. When a software program is used to implement embodiments, the embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variant of disclosed embodiments by viewing the accompanying drawings, the disclosed content, and the appended claims. In the claims, "comprising" does not exclude another component or another operation, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any or all of modifications, variants, combinations or equivalents that cover the scope of this application. It is clearly that a person skilled in the art can make various modifications and variants to this application without departing from the spirit and scope of this application. This application is intended to cover these modifications and variants of this application provided that they fall within the scope of protection defined by the following claims and their equivalent technologies.

What is claimed is:

1. A communication method, wherein the method comprises:

receiving, by a first network device, a first request message and uplink data from a terminal, wherein the first request message is for requesting to resume a suspended radio resource control (RRC) connection; and sending, by the first network device, a second request message to a second network device based on the first request message and the uplink data, wherein the second network device is a network device previously serving the terminal, and the second request message comprises information about the uplink data and capability information, the capability information indicating that the first network device has a capability of configuring a configured grant (CG) for the terminal, wherein the second request message is for requesting the second network device to release a first data channel between the second network device and a core network device, or the second request message is for requesting the second network device to send a context of the terminal to the first network device.

2. The method according to claim 1, wherein:

the second request message is for requesting the second network device to release the first data channel between the second network device and the core network device, and the information about the uplink data is used by the second network device to determine whether to release the first data channel; or the second request message is for requesting the second network device to send the context of the terminal to the first network device, and the information about the uplink data is used by the second network device to determine whether to send the context of the terminal to the first network device.

3. The method according to claim 1, wherein the information about the uplink data comprises at least one of the following: first indication information, second indication information, a data amount of the uplink data, or a source logical channel identifier corresponding to the uplink data, wherein the first indication information indicates that the uplink data arrives at the first network device, and the second indication information indicates that the uplink data is not comprised in the first request message.

4. The method according to claim 3, wherein the second request message is for requesting the second network device to release the first data channel between the second network device and the core network device, and the method further comprises:
   receiving, by the first network device, a first response message from the second network device, wherein:
      when the data amount of the uplink data is greater than or equal to a first threshold, the first response message indicates that the second network device releases the first data channel; or
      when the data amount of the uplink data is less than or equal to a first threshold, the first response message indicates that the second network device keeps the first data channel.

5. The method according to claim 4, wherein the first request message comprises a configured grant capability of the terminal, or the first response message comprises a configured grant capability of the terminal.

6. The method according to claim 5, wherein the first response message further comprises traffic model information, and the traffic model information indicates at least one of the following parameters: a data arrival periodicity that is of the terminal and that is evaluated by the second network device, a transport block size that is of the uplink data and that is evaluated by the second network device, or an arrival timing that is of the terminal and that is evaluated by the second network device.

7. The method according to claim 4, wherein the first response message is further for establishing a communication tunnel between the first network device and the second network device, the communication tunnel is for transmitting the uplink data, and there is a correspondence between the communication tunnel and the source logical channel identifier.

8. The method according to claim 1, wherein the method further comprises:
   receiving, by the first network device, a buffer status report from the terminal, wherein the buffer status report indicates a data amount of remaining uplink data, wherein the second request message further comprises information about the data amount of the remaining uplink data.

9. The method according to claim 8, wherein the second request message is for requesting the second network device to release the first data channel between the second network device and the core network device, and the method further comprises:
   receiving, by the first network device, a first response message from the second network device, wherein:
      when the data amount of the remaining uplink data is greater than or equal to a second threshold, the first response message indicates that the second network device releases the first data channel; or
      when the data amount of the remaining uplink data is less than or equal to a second threshold, the first response message indicates that the second network device keeps the first data channel.

10. The method according to claim 8, wherein the method further comprises:
    in response to determining that the data amount of the remaining uplink data is greater than or equal to a second threshold, establishing, by the first network device, an RRC connection to the terminal.

11. The method according to claim 1, wherein the second request message is for requesting the second network device to release the first data channel between the second network device and the core network device, and the method further comprises:
    receiving, by the first network device, a first response message from the second network device, wherein the first response message indicates that the second network device releases the first data channel, or the first response message indicates that the second network device keeps the first data channel.

12. The method according to claim 1, wherein the second request message is for requesting the second network device to send the context of the terminal to the first network device, and the method further comprises:
    receiving, by the first network device, a second response message from the second network device, wherein the second response message comprises a source packet data convergence protocol configuration and a source radio link control configuration.

13. The method according to claim 12, wherein the first request message comprises a configured grant capability of the terminal, or the second response message further comprises a configured grant capability of the terminal.

14. The method according to claim 12, wherein the second response message further comprises traffic model information, and the traffic model information indicates at least one of the following parameters: a data arrival periodicity that is of the terminal and that is evaluated by the second network device, a transport block size that is of the uplink data and that is evaluated by the second network device, or an arrival timing that is of the terminal and that is evaluated by the second network device.

15. The method according to claim 12, wherein the second response message further indicates to establish a communication tunnel between the first network device and the second network device, the communication tunnel is for transmitting the uplink data, and there is a correspondence between an identifier of the communication tunnel and a source logical channel identifier.

16. The method according to claim 1, wherein the first request message and the uplink data are multiplexed in one message.

17. A communication method, wherein the method comprises:
    receiving, by a second network device, a second request message from a first network device, wherein the second request message comprises information about uplink data and capability information, the capability information indicating that the first network device has a capability of configuring a configured grant (CG) for a terminal, the second request message is for requesting the second network device to release a first data channel between the second network device and a core network device, and the second network device is a network device previously serving the terminal; and releasing, by the second network device, the first data channel based on the second request message; or receiving, by a second network device, a second request message from a first network device, wherein the second request message comprises information about uplink data and capability information, the capability information indicating that the first network device has a capability of configuring a configured grant (CG) for the terminal, the second request message is for requesting the second network device to send a context of a terminal to the first network device, and the second network device is a network device previously serving the terminal; and sending, by the second network device, the context of the terminal to the first network device based on the second request message.

18. The method according to claim 17, wherein the information about the uplink data comprises at least one of the following: first indication information, second indication information, a data amount of the uplink data, or a source logical channel identifier corresponding to the uplink data, wherein the first indication information indicates that the uplink data arrives at the first network device, the second indication information indicates that the uplink data is not comprised in a first request message, and the first request message is used by the terminal to request the first network device to resume a suspended radio resource control (RRC) connection.

19. A communication apparatus, wherein the communication apparatus comprises:
at least one processor; and
one or more memories coupled to the at least one processor and storing programming instructions for execution by the at least one processor to:
  receive a first request message and uplink data from a terminal, wherein the first request message is for requesting to resume a suspended radio resource control (RRC) connection; and
  send a second request message to a second network device based on the first request message and the uplink data, wherein the second network device is a network device previously serving the terminal, and the second request message comprises information about the uplink data and capability information, the capability information indicating that the communication apparatus has a capability of configuring a configured grant (CG) for the terminal, wherein
  the second request message is for requesting the second network device to release a first data channel between the second network device and a core network device, or the second request message is for requesting the second network device to send a context of the terminal to the communication apparatus.

20. The communication apparatus according to claim 19, wherein:
the second request message is for requesting the second network device to release the first data channel between the second network device and the core network device, and the information about the uplink data is used by the second network device to determine whether to release the first data channel; or
the second request message is for requesting the second network device to send the context of the terminal to the first network device, and the information about the uplink data is used by the second network device to determine whether to send the context of the terminal to the first network device.

* * * * *